United States Patent [19]

Harris et al.

[11] Patent Number: 4,631,666

[45] Date of Patent: Dec. 23, 1986

[54] DATA TRANSFER NETWORK FOR VARIABLE PROTOCOL MANAGEMENT

[75] Inventors: Craig W. Harris, El Toro; Lyle O. Jevons, Jr., Mission Viejo; Richard A. Loskorn, Dana Point, all of Calif.

[73] Assignee: Burroughs Corporation, Detroit, Mich.

[21] Appl. No.: 436,710

[22] Filed: Oct. 25, 1982

[51] Int. Cl.⁴ ............................................. G06F 13/00
[52] U.S. Cl. .................................................... 364/200
[58] Field of Search ............... 364/200 MS File, 200, 364/900

[56] References Cited

U.S. PATENT DOCUMENTS

| | | | |
|---|---|---|---|
| 4,074,352 | 2/1978 | Cook et al. | 364/200 |
| 4,106,092 | 8/1978 | Millers, II | 364/200 |
| 4,189,769 | 2/1980 | Cook et al. | 364/200 |
| 4,254,462 | 3/1981 | Raymond et al. | 364/200 |
| 4,322,792 | 3/1982 | Baun | 364/200 |
| 4,346,440 | 8/1982 | Kyu et al. | 364/200 |
| 4,363,094 | 12/1982 | Kaul et al. | 364/200 |
| 4,415,986 | 11/1983 | Chadra | 364/900 |

Primary Examiner—Gareth D. Shaw
Assistant Examiner—John J. Salotto
Attorney, Agent, or Firm—Alfred W. Kozak; Nathan Cass; Kevin R. Peterson

[57] ABSTRACT

A data transfer network uses an I/O subsystem to support a main host computer in managing data transfers to and from remote data terminals. The I/O subsystem may constitute one or more units called a Line Support Processor. The Line Support Processor uses internal processor means to control a plurality of line adapters each of which has a data-comm line to a data set or data terminal. Control operations by said internal processor permit selected line adapters to operate selected types of protocols using synchronous or asynchronous transmission. Data communication information and commands in high level language data are loaded into auxiliary memories in the internal processor means and into each line adapter where the internal processor means acts to convert this language data into usable protocols.

5 Claims, 18 Drawing Figures

FIG.1A.
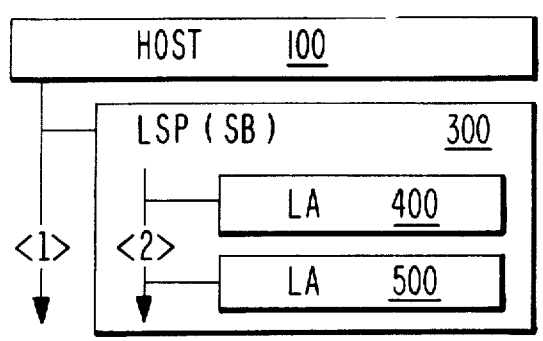
<1> MLI INTERFACE, <2> LSP INTERNAL INTERFACE - DLI
FIG.1B.
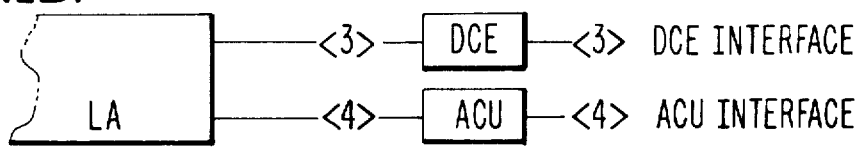
FIG.1C. LINE ADAPTER.
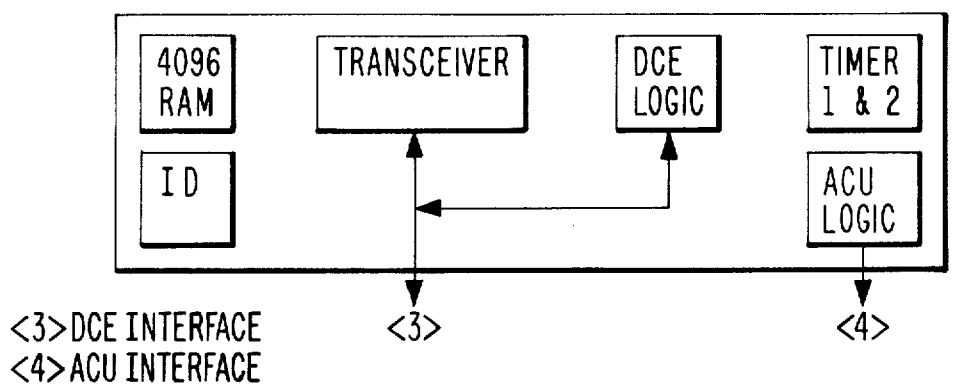
<3> DCE INTERFACE
<4> ACU INTERFACE
FIG.1D.
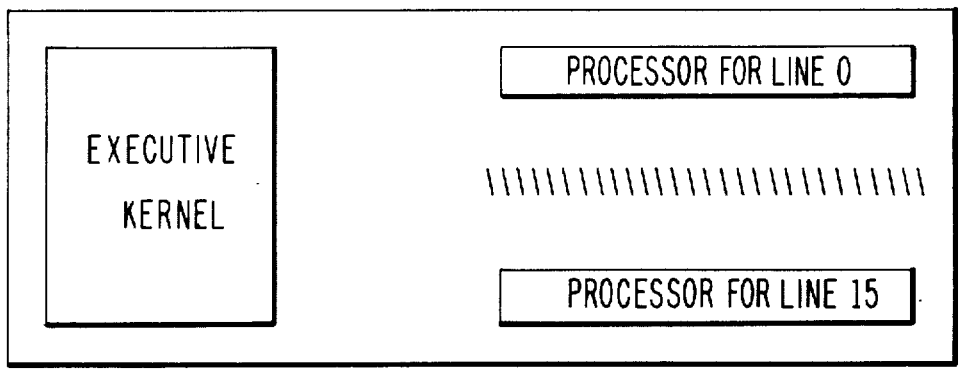

FIG. 3. DIALING SEQUENCE FOR TYPE 801 AUTOMATIC CALLING UNIT.

FIG. 7.    DLI INTERNAL DATAPATH

FIG. 8. DLP SEQUENCER BLOCK DIAGRAM.

DATA TRANSFER NETWORK FOR VARIABLE PROTOCOL MANAGEMENT

FIELD OF THE INVENTION

This disclosure relates to the field of data communications apparatus and is directed to a processing unit and system which provides an I/O subsystem unit between remote data sets and terminals, and a main host computer.

CROSS REFERENCES TO RELATED APPLICATIONS

This disclosure is related to the following applications which all have the same common assignee:

An application entitled "Bit-Oriented Line Adapter System", U.S. Ser. No. 355,134, filed Mar. 5, 1982, by inventors Richard A. Loskorn, Philip D. Biehl and Robert D. Catiller, now U.S. Pat. No. 4,455,622.

An application entitled "Byte-Oriented Line Adapter System", U.S. Ser. No. 355,135, filed Mar. 5, 1982, by inventors Richard A. Loskorn, Philip D. Biehl and Robert D. Catiller, now U.S. Pat. No. 4,514,824.

An application entitled "Component Selection System for a Multiple Line Adapter Organization", U.S. Ser. No. 363,592, filed Mar. 30, 1982, inventor Richard A. Loskorn, now U.S. Pat. No. 4,453,228.

An application entitled "Read Control Operations System for a Multiple Line Adapter Organization", U.S. Ser. No. 372,106, filed Apr. 27, 1982, inventor Richard A. Loskorn, abandoned and re-filed Feb. 21, 1984 as Continuation-In-Part of U.S. Ser. No. 580,292.

An application entitled "Automatic Calling Unit Control System", U.S. Ser. No. 386,409, filed June 8, 1982, inventors Richard A. Loskorn and Lyle O. Jevons, Jr., now U.S. Pat. No. 4,479,123.

SUMMARY OF THE INVENTION

A data transfer network includes a main host computer supported by an I/O subsystem which may include one or more Line Support Processor Units. The Line Support Processor units manage the transfer and storage of data to/from remote data terminals such that selected Line Adapters in the Line Support Processor Units can be controlled to handle not only a variety of transfer protocols but also both synchronous and asynchronous communications.

The host computer stores a network definition language (NDL) providing "S-operators" which are operation codes. These codes are loaded into the various line support processors (LSPs) of the system. Each of the line support processors is provided with a universal input output state machine which is provided with auxiliary extra memory storage for receiving the S-operators which the state machine can translate into specific instructions and operation execution to control multiple numbers of line adapters, each of which may have a different line discipline and protocol arrangement.

The S machine (FIGS. 1E, F, G) is a virtual machine which results from the high level S-operators provided by the host computer to the line support processors which are then translated into a lower level operating system for precise and definite instructions to each of the line adapters associated with a given line support processor.

The main host computer in the system is provided with a network definition language (NDL) which is processed through a compiler in order to generate S-operators. These S-operators are loaded into the auxiliary memories associated with each of the state machine processors of each of the line support processors wherein certain interpretive algorithms are used by the state machine processor such that the high level S-operators are converted to operating instructions by the state machine in order to handle the data comm requirements of each of the individual line adapters that go to make up the system.

The I/O subsystem designated as a Line Support Processor (LSP-Data Link Processor) can support up to 16 data-comm lines to remote data sets or data terminals for the transfer of data between a main host computer and multiple numbers of remote terminals. The LSP operates in a specialized environment where the LSP receives I/O commands and task-identifying Data Link words for execution and returns Result/Descriptor words back to the host to indicate completion/incompletion of each assigned task. The LSP is organized with slide-in cards in a Base Module which provide (a) a plurality of Line Adapters (one for each data comm line) where each Line Adapter includes a buffer memory, (b) a processor unit called a universal input/output (UIO) State Machine for executing I/O commands from the Host, and (c) a Data Link Interface Unit which connects the LSP to the Host Computer and provides logic for selection of desired Line Adapters and specific components thereon such as buffer memories, timers, USARTs or Bit-Oriented Controllers.

BRIEF DESCRIPTION OF THE DRAWINGS

FIG. 1A is a diagram showing the MLI interface to the host and the internal interface to the Line Adapters of the Line Support Processor; FIG. 1B shows the Line Adapter interfaces to direct-connect equipment and the use of an Automatic Calling Unit; FIG. 1C shows the basic elements of the Line Adapter of the Line Support Processor. FIGS. 1D, 1E, 1F, 1G are schematics showing the use of data structures within the Line Support Processor.

BACKGROUND

Figure 1:
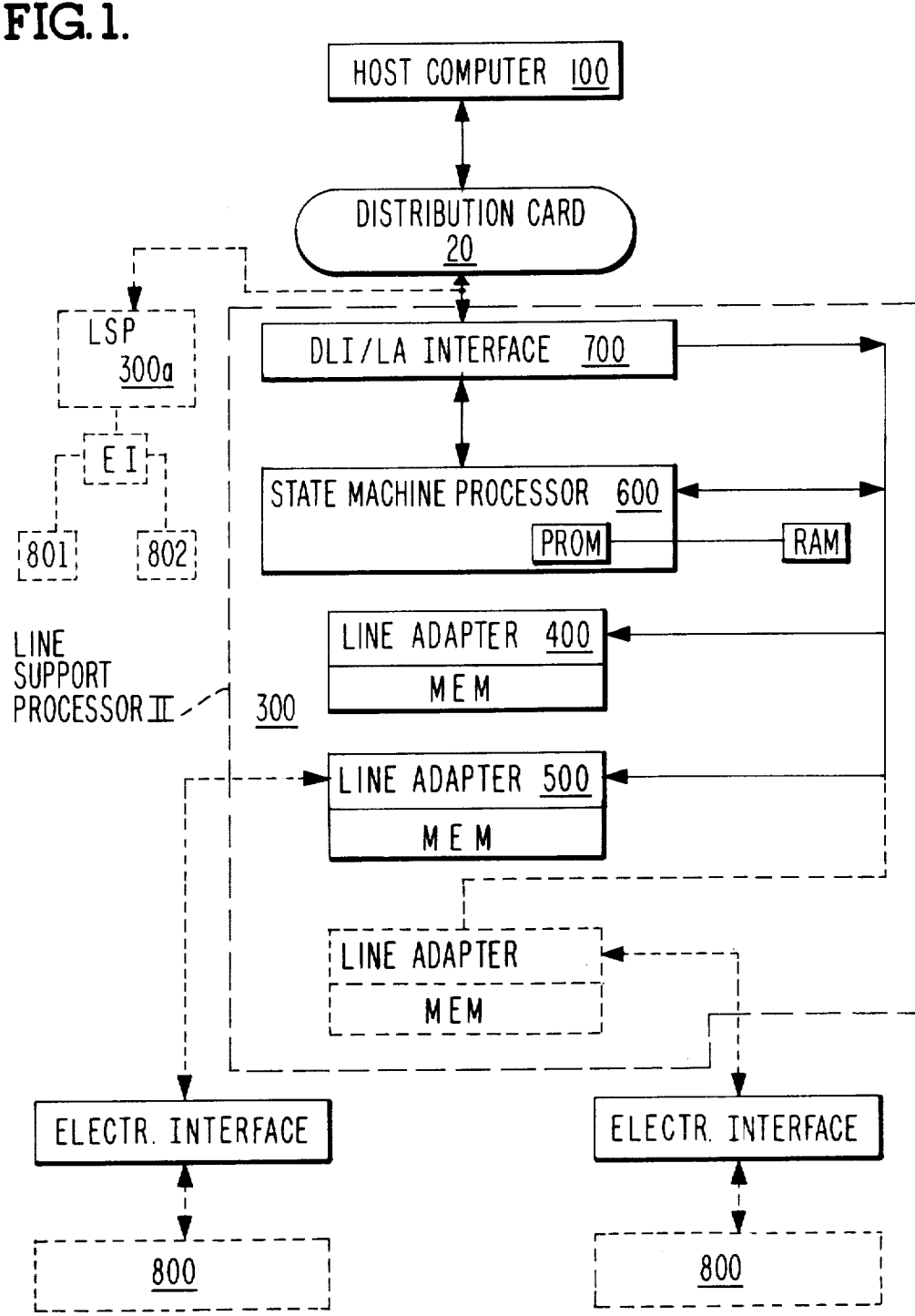
FIG. 1 is an overall data communications system drawing showing the relationship of the host computer to the Line Support Processor and the connection to the remote terminals.

The essence of data communication is the electronic transmission of encoded information or data from one point to another. In general the mechanisms of data communication physically require certain elements, these include: a transmitter or source of information, a message, a binary serial interface, a communication channel or link, and a receiver of transmitted information. In order to make the binary serial data compatible with the communication channel, there is usually required a data communications interface.

A communications channel or link is a path whereby electrical transmission can occur between two or more stations or terminals by means of, for example, a single wire, multiple wires, coaxial cable, radio frequency transmission, etc. The channel has the purpose of carrying information from one location to another, and these channels are ordinarily designated as simplex, half-duplex and full duplex in the data communication art.

A channel is characterized by its band width, such that the greater the band width of the channel, the higher the possible transmission speed. The speed is measured in terms of the number of bits per second transmitted and called the Baud rate.

Since the pulses transmitted over a communication line can be distorted by various factors, the optimum situation is such that the received signal will be an exact replica of the transmitted signal.

In that the voice telephone network in general uses "analog" transmission facilities to service data communications users, there is required an interfacing means to interface the analog channels to the digital terminals and computers. The interface unit is called a modem (modulated-demodulator) and is used to convert digital signals into analog signals or else analog signals back into digital signals. Thus, modems are devices that convert digital data from a computer or a digital terminal to a modulated carrier waveform (analog) required by the communication channel. One modem is needed at each end of the channel. It should be noted that modems are also called "data sets" and sometimes designated as DS. There are two broad categories of voice grade data sets or modems. These are "asynchronous" units and "synchronous" units. The "asynchronous" units operate at a rapid maximum data rate of 1800 bits per second over dial-up facilities and at 2,000 bits a second on preconditioned leased lines. "Synchronous" units operate generally at a maximum data rate of 4800 bits per second over dial-up lines and at 9600 bits per second on conditioned leased lines.

In asynchronous systems the transmission line is in a "Mark" (binary 1) condition in its "idle" state. As each character is transmitted, it is preceded by a start bit, or transition from mark to space (binary 0) which indicates to the receiving terminal that a character is being transmitted. The receiving device detects the start bit and the data bit that make up the character. At end of the character transmission, the line is returned to "Mark" condition by one or more stop bits and is ready for the beginning of the next character. The start and the stop bits permit the receiving terminal to synchronize itself to the transmitter on a character by character basis.

Synchronous transmission uses an internal clocking source within the modem to synchronize the transmitter and receiver. Once a synchronization character (SYN) has been sensed by the receiving terminal, data transmission then proceeds character by character without the intervening start and stop bits. The incoming stream of data bits is interpreted on the basis of the received clock supplied by the modem. This clock is usually derived from the received data through a phase locked loop. The receiving device accepts data from the modem until it detects a special ending character or a character terminal count at which time it knows that the message is over. The message block consists generally of one or two synchronization characters, a number of data and control characters, a terminating character and one or two error control characters. Between messages the communication line may idle in SYN characters or be held to "Mark".

Asynchronous transmission is advantageous when transmission is irregular; it is also less expensive due to simpler interface logic and circuitry required. However, synchronous transmission, since it eliminates the start and stop bits of each character, makes better timing use of the transmission facility. And synchronous modems offer higher transmission speeds even though they are more expensive since they require precisely synchronized clock and data.

When a number of I/O devices are required at one end of a communication channel, a multiplexor can be used to enable these devices to share one communication line, thus reducing costs. Multiplexors take low speed inputs from a number of terminals and combine them into one high speed data stream for simultaneous transmission on a single channel. At the other end of the channel a second multiplexor which operates as a "demultiplexor" reconverts the high speed data into a series of low speed inputs to the host computer.

The electrical and physical interface to the data terminal equipment is generally built to certain standards such as that established by the Electronics Industries Association such as EIA RS-232.

There are certain rules and modes which are required for the orderly and accurate transfer of data between digital units and these rules are called "protocols". For example, there are established data link control protocols (DLCs) which are rules necessary for communication between terminals and computers over the standard communication channels in order to move information accurately and efficiently. These data link control protocols provide the function of establishing and terminating a connection between two stations; insuring message integrity through error detection; providing requests for retransmission; providing positive or negative acknowledgments; providing identification of the sender and receiver by means of polling or selection; and providing special control functions such as "requests for status", "station reset", "reset acknowledge", "start", "start acknowledge", and "disconnect".

These data link control protocols can be classified in certain categories such as (i) byte control protocols (BCPs) and (ii) bit oriented protocols (BOPs). With the byte control protocols, a defined set of communication control characters monitors the orderly operation of the data link and these control characters are part of a character code set. Thus, the BCP messages are transmitted in blocks composed of a header or control field, a body or text field, and a trailer or error checking field with specialized characters used as field or block delimiters. One example of a byte control protocol is the Binary Synchronous Communications Protocol (BISYNC) developed by the IBM Corporation.

The "bit oriented" protocols (BOPs) may use only two or three specific control characters for monitoring operation of the data link. These characters are used to delimit the beginning (FLAG) and the end (FLAG, ABORT, GA) of a message frame. Upon receipt of the opening FLAG, there is a positional significance which is used to delineate the bit sequence that follows into specified fields which are designated as address, control, information, and frame check sequence fields.

In the "byte oriented" control protocol (BCP) the BCP messages are transmitted in units called "blocks". The header field contains information that identifies the address of the message destination (or source); the job number, if any; the type of message (data or control); the control action; and a positive or negative acknowledgment to ensure error-free reception of a previous message or messages. These control actions are used to reset or to initialize a secondary station, to acknowledge good or bad reception of blocks, to inquire why a response or acknowledgment has not occurred within a specific time period, or else to abort a transfer sequence. The control information is conveyed via special characters or character sequences.

The text or text field of the BCP message contains any data being transmitted.

An error check field (composed of the sequence of check bits called block check characters or BCCs) is generated and transmitted in order to ensure correct reception of information on a communication facility. BOP Messages: The "bit oriented protocol" messages are a little simpler than the byte oriented ones. The BOP messages are transmitted also in frames, and all the messages follow one standard frame of format. These bit oriented messages are independent of codes, line configurations and peripherals. They use positional significance instead of control characters or character counts that include one standard frame-format for all messages. Here a "frame" starts with an eight-bit FLAG sequence which is followed by sequences of: ADDRESS, CONTROL, INFORMATION, and FRAME CHECK, and this ends with another FLAG sequence.

When a primary station transmits, then the station ADDRESS sequence (usually one eight-bit field) designates which secondary station is to receive the balance of the transmitted frame. On the other hand, when a "secondary" station transmits, the ADDRESS then tells the primary station which secondary station originated the frame. To ensure the integrity of the data being transmitted, the ADDRESS sequence appears within each frame.

The CONTROL field of the primary station comes after the ADDRESS sequence and is generally composed of one or two eight-bit bytes. It determines the "type" of message, the send and the receive frame sequence counts, and a poll command from the primary station (or a final response from the secondary station). The primary station uses the CONTROL field to command the addressed secondary station what operation to perform. The secondary station uses the CONTROL field to respond to the primary station.

The INFORMATION field may vary in length, and the data may be configured in any code structure, such as straight binary, binary coded decimal, packed decimal, etc. Synchronization of Transmission: When using synchronous transmission, there may be four different types or methods of synchronization—bit, character, block and message. Bit synchronization is achieved through a received clock signal which is coincident with a received serial data stream. Character synchronization is accomplished by recognizing one or two "phasing" characters called SYN or sync characters.

Retransmission: The data link protocols include an error checking field to allow the receiving station to validate the message. When errors are detected, the receiving station can issue a request for "retransmission" (ARQ). There are two types of "request for transmission". These are: (i) stop and wait and (ii) continuous. Each of these provide methods for acknowledging correct "error free" reception of transmitted blocks of information.

In the "stop and wait" ARQ, the transmitter sends one block and then stops. The receiver acquires that block, subjects the block to an error check, and then sends an ACK control character back to the transmitter indicating that the block is correct, or else it sends a NAK control character to indicate an error occurred. If an ACK is returned, the transmitter sends the next block in sequence. If a NAK is returned, that particular block is retransmitted.

In the "continuous" ARQ the transmitter keeps sending one block after another without stopping. The receiver and transmitter retain individual counts of the blocks outstanding and provide buffer storage to retain those blocks. Only when an erroneous block is detected does the receiver then tell the transmitter to resend that block and all subsequent-in-transit blocks.

"Serial Data" Transmission: Serial data communication involves the use of a transmission line where "bits" of data are transmitted one after another in serial fashion. In computer systems, the serial data communication can occur in two fundamental modes. These are (i) asynchronous (not clocked) or (ii) synchronous (clocked).

Since the asynchronous mode does not use a block, it requires some other method to coordinate incoming data with the receiver's internal system. Thus typically, an asynchronous communication network keeps its communication line in an "idle" condition which is generally called a "Mark" or binary 1 condition. Then a "start" bit precedes each transmitted character to indicate that a new character is beginning and one or more "stop" bits signal the characters end and the return to the idle condition. This sequence of start bit-character data-stop bit is generally called a "frame".

In asynchronous usage the "character length" varies and may range from five to seven bits depending on the code used (BAUDOT, ASCII, and so on) and also error checking can be used on each character by using an additional bit called a "parity" bit. Thus, in the asynchronous communication of characters, much of the time consumed involves non-informational data but rather control bits such as the start bit and two stop bits.

Alternatively, the use of synchronous communication eliminates the high overhead of control bits but requires another method for achieving synchronization. Such synchronous communication networks transmit a clock signal along with the data bits in order to establish individual-bit synchronization between devices.

Certain standardized rules have been made to govern operation of networks and communication protocols are used to define the network's transmission format whether asynchronous or synchronous. Complex computer-to-computer terminal or terminal to terminal networks utilize synchronous data-communication protocols which are either character-oriented or bit-oriented.

The primary "character-oriented" protocol used as an industry standard is called Binary Synchronous Communication and is termed Bisync. This protocol requires certain control-character bit patterns (BEL, ETX, ITB, SOH, STX) in order to ensure proper network operation. Since these bit patterns constitute "control characters", they cannot also be used as a transmission of data. The Bisync protocol requires that transmission be half-duplex since receipt of a block must be "acknowledged" before another block can be transmitted.

This need for a half-duplex requirement is eliminated by the use of BOPs (bit oriented protocols). Here blocks received do not have to be acknowledged each time they are sent and thus full-duplex operation is possible in BOP networks.

There are several bit oriented protocols (BOPs) in current usage: Advanced Data Communication Control Procedure (ADCCP); High-Level Data-Link Control (HDLC); and Synchronous Data-Link Control (SDLC), and Burroughs Data Link Control (BDLC).

The most widely used bit protocol (of these types) is the SDLC. Here information is transmitted between stations in data groups termed "frames" whereby each frame comprises several fields and each field is eight or more bits long or organized in multiples of eight bits. The bits in each field of each frame are set with a specific meaning.

SDLC uses two types of stations desigated as a "primary" or "control" station and a "secondary" slave or "controlled" station. Here the protocol is code independent, and data to be transmitted must be contained in each frame's Information Field. The number of bits per character in any Information Field is limited to eight and the sending frames and the receiving frames are numbered independently. The SDLC's code independence permits full duplex operation. The organization of fields in the SDLC protocol constitutes a "frame" as shown hereinbelow.

TABLE B-1

| OPENING FLAG | ADDRESS FIELD | CONTROL FIELD | INFORMATION FIELD | FRAME CHECK SEQUENCE | CLOSING FLAG |
|---|---|---|---|---|---|
| 01111110 | N OCTETS | 8 OR 16 BITS | VARIABLE | 15 BITS | 01111110 |

Information fields used by the SDCL protocol come in multiple of eight bits. A series of such fields constitutes a frame.

The SDLC's code independence permits full duplex operation and the number of frames "previously sent" monitored in each frame's Control Field. A secondary (controlled) station can transmit back to the primary station the number of frames it has received and if this does not match the number of frames "sent", the secondary station can request a retransmission. However, the primary station need not halt transmission between blocks of data to wait for the secondary station to confirm the receipt of previous frames.

The SLDC Control Field frame is shown hereinbelow.

TABLE B-2

| B₀ | B₁ B₂ B₃ B₄ | B₅ B₆ B₇ |
|---|---|---|
| 0 | N(S) | N(R) |

N(S)=NUMBER OF FRAMES SENT
N(R)=NUMBER OF FRAMES RECEIVED

—The number of frames previously sent and received can be found in the SDLC control frame. When these two parameters don't match, the data can be retransmitted.

The SDLC protocol utilizes a flag concept; thus, an opening flag (01111110) and a "closiong flag (also 01111110) will indicate each frame's beginning and end. The closing flag of one frame can also be the opening flag of the following frame. Because the only protocol-derived control character is the flag, once an opening flag has been sent, the protocol requires that every time five "ones" are transmitted, a "zero" be inserted. This zero-bit insertion technique maintains code transparency. The receiver (after receiving five continuous "ones") strips out the next zero automatically.

Integrated circuit chips, as for example the American Microsystems, Santa Clara, Ca., type S6854, can be used to handle all three types of bit oriented protocols (BOPs). It can furnish such protocol handling features as: automatic flag detection and synchronization; zero bit insertion and deletion; extended address control and logical control fields; variable word-length information fields of 5, 6, 7, 8 bits; automatic frame-check sequence generation and checking.

In the frame-check sequence, the transmitting station looks at every bit that it transmits (ignoring opening and closing flags) and operates on each with a fixed algorithm that generates the 16 bit sequence. On the receiving end the receiver operates on every bit received, except the frame-check sequences. Upon receiving a closing flag, the receiver then compares the frame-check sequence that it has generated with the frame-check sequence that it has received. If the two match, then the transmission is verified; if they do not match, the receiver requests retransmission.

All of the bit-oriented protocols permit transmission to cease during a frame, provided that an "abort" sequence is sent. The protocols thus require that frames either be sent in their entirety or else aborted with the abort sequence. An IC chip (such as the AMI S6854) also allows the transmitter to go to "idle" state and yet maintain control of the transmission line by answering one of two idle modes. Likewise, a receiver must be able to detect an "idle" condition in order to be able to transmit (that is, turn the line direction around).

Data Network Overview

The present disclosure involves a network where a main host computer is supported by an I/O subsystem called a Line Support Processor (or a plurality of such processors) whereby many data-comm lines to remote terminals may be utilized for data transfers. These data transfers may be effectuated for several different types of protocols using both synchronous and asynchronous operations.

The use of a host computer with an I/O subsystem which uses particular commands called I/O descriptors, data link descriptors and result/descriptors, and an architecture where one (or a plurality of) base module(s) supports a plurality of data link processors (peripheral-controllers) is shown in several prior patents assigned to the same assignee as is this disclosure. These patents are listed hereinbelow and are included by reference:

U.S. Pat. No. 4,074,352 entitled "Modular Block Unit for Input/Output Subsystem".

U.S. Pat. No. 4,106,092 entitled "Interface System Providing Interfaces to Central Processing Unit and Modular Processor-Controllers for an Input-Output Subsystem".

U.S. Pat. No. 4,189,769 entitled "Input-Output Subsystem for Digital Data Processing System".

LINE SUPPORT PROCESSOR II (LSP II)-DATA LINK PROCESSOR

General Overview

In a typical standard configuration as seen in FIG. 1, the host computer 100 is connected to a Line Support Processor 300 (LSP) which provides, as part of its circuitry, a series of Line Adapters (400, 500), each of which controls the transmission operations for a particular telephone or other type line. The Line Adapter 300 further includes a State Machine Processor 600 and a Data Link Interface/Line Adapter 700 (DLI/LA).

The Line Support Processor 300 is used to control low to medium speed data communication lines which are generally designated as sub-broadband (SB). From one to 16 Line Adapters (FIG. 1A) can be built into the Line Support Processor and can be used to handle one to 16 full duplex or half duplex lines. The lines can be private or switched. The transmission modes used can be (i) asynchronous or (ii) synchronous, or (iii) bit-synchronous. Thus, the Line Support Processor can support a nominal maximum network of four to five half-duplex 9,600 baud lines connected to TD 830s or any other network of up to 16 lines which would represent an equivalent workload.

The Line Adapter(s) is a component portion of the Line Support Processor. The Line Adapter may be placed on a single slide-in card or it may be fabricated as a "Dual" line adapter whereby two complete line adapters are fabricated on one slide-in card, or there may be fabricated a "Quad" line adapter card which constitutes four complete line adapters built on to one slide-in card. Thus, the Line Support Processor can be organized to support 1–16 data comm lines.

The Line Adapter is connected to a data communications line via two kinds of external equipment, namely (i) Data Circuit-Terminating Equipment (DCE) and (ii) an optional Automatic Calling Unit (ACU). FIG. 1B illustrates the connections of each Line Adapter to a DCE and an ACU.

A Line Adapter (FIG. 1C) in its most comprehensive embodiment will basically contain the following components: (i) a 4,096 byte RAM (Line-Work Area) which is used to hold the information associated with that particular line; (ii) a transceiver (Line Transceiver); (iii) a field-engineer jumpered value line (Line ID) which indicates the physical characteristics of the line; (iv) a DCE-Interface logic unit; (v) ACU-Interface logic unit; and (vi) two program timers. There are illustrated in FIG. 1C.

The Line Support Processor can be looked upon as a "hierarchy" of processes. One process is called the "executive" kernel and is the root of the hierarchy (FIG. 1D). It manages the communications with the host computer, it initiates low-level processes, and performs LSP-oriented functions. The lower-level processes will perform line-oriented functions and are grouped by the line involved. FIG. 1D shows in schematic form the relationship of the "executive kernel" and the processes which are used for the 16 data communication lines designated line 0 to line 15. A "Line" is a logical construct which represents a particular line adapter and represents only the data structures associated with that adapter and are called "Line Data structures".

The highest-level line processes are the "executive processes". In general, the executive processes are initiated by the kernel in response to host-initiated operations on the line. The "lowest" level line processes are the "input and output" processes. The "Input Process" is used to control the input of a message from the data communications line. The "Output Process" is used to control the output of a message to the data communications line. These processes are part of a mechanism called the "S-machine" which will be discussed later hereinunder.

Line Data Structures: The Line Support Processor (LSP) maintains the following data structures for each line:

(i) Line ACU: this is a data structure which consists of the values of the ACU-interface signals for a particular line. The individual Line ACU signals are denoted by—Line.ACU. Signal $ Name—. ACU refers to an automatic calling unit.

(ii) Line.DCE: this is a data structure which consists of the values of the internal DCE-Interface signals for a particular line. The individual Line DCE signals are denoted by—Line.DCE. Signal $ Name—. The term DCE refers to data circuit termination equipment which is used on a data communication line.

(iii) Line Count: this is an integer which indicates the number of operations which are in progress on a particular line.

(iv) Line.ID: a data structure which indicates physical characteristics of a particular line. The individual Line.ID items are defined below and are denoted by 'Line.ID. (Item$Name)'. The designation ID refers to "identification" of line characteristics.

(v) Connect-Type: this enumeration indicates the connection method of the line as follows:
 (a) Private: the line is not switched.
 (b) Switched—No Auto Dial: the line is switched but has no auto-dial capabilities.
 (c) Switched—ACU Auto Dial: the line is switched and has an ACU for auto dial.
 (d) Switched—DCE Auto Dial: the line is switched and has a DCE with built-in auto-dial capabilities.

(vi) DCE-Disconnect-Detect: a TRUE value of this boolean indicates that the DCE for the line can detect a break in a switched connection and will report such a break by dropping the line.DCE.DSR. This represents the "data set ready" signal on the data comm line to the data circuit termination equipment.

(vii) Transceiver-Type: this enumeration indicates the transmission-mode capabilities of the transceiver for the line, as follows:
  (a) Character Oriented: the transceiver can support both asynchronous and synchronous modes.
  (b) Bit Oriented: the transceiver can support bit-synchronous mode.

(viii) Line.S: a data structure which represents the S-machine for a particular line.

(ix) Line.State: a data structure which indicates the logical state of a particular line. The individual Line.State items are listed below and are denoted by 'Line.State. (ItemSName)'. A particular Line.State value or set of values is denoted by a 3-tuple with the following order of item values: (Input Process State, Output Process State, Sequence). An '*' in a 3-tuple position denotes any value of the corresponding item.
  (a) Input-Process-State: this enumeration indicates the status of the Input Process for the line. The values of this enumeration are:
    (a1) Not Executing: there are no 'Execute Input Process' operations in progress for the line.
    (a2) Executing: there is one 'Execute Input Proces' operation in progress for the line.
    (a3) Executing and Queued: there are two 'Execute Input Process' operations in progress for the line, one of which is waiting for the completion of the other one.
  (b) Output-Process-State: this enumeration indicates the status of the Output Process for the line. The values of this enumeration are:
    (b1) Not Executing: there are no 'Execute Output Process' operations in progress for the line.
    (b2) Executing: there is one 'Execute Output Process' operation in progress for the line.
    (b3) Executing and Queued: there are two 'Execute Output Process' operations in progress for the line, one of which is waiting for the completion of the other one.
  (c) Sequence: this enumeration indicates the overall status of the line. The values of this enumeration are shown below. There is an integer function, called Limit, defined upon Sequence which is "4" for the values 'Enabled' and 'Enabled and Executing' and which is 1 for all other values.
    (c1) Uninitialized: there are no operations in progress for the line and the value of Line.S. Loaded is FALSE.
    (c2) Enabled: there are no operations in progress for the line and the value of Line.S.Loaded is TRUE.
    (c3) Initializing S-Machine: there is an 'Initialize S-Machine' operation in progress for the line.
    (c4) Updating S-Machine: there is an 'Update S-Machine' operation in progress for the line.
    (c5) Monitoring Ring: there is a 'Monitor Switched-Line' operation in progress for the line which is waiting for a ring indication.
    (c6) Monitoring End-of-Ring: there is a 'Monitor Switched-Line' operation in progress for the line which is waiting for an end-of-ring indication.
    (c7) Answering: there is an 'Answer Switched-Line' operation in progress for the line.
    (c7) Auto Dialing: there is an 'Auto-Dial Switched-Line' operation in progress for the line.
    (c8) Disconnecting: there is a 'Disconnect Switched-Line' operation in progress for the line.
    (c9) Enabled and Executing: there is at least one 'Execute Input Process' or 'Execute Output Process' operation in progress for the line.
    (c10) Dumping Data-Area: there is a 'Dump Data-Area' operation in progress for the line.
  (d) Line.Switched-State: this enumeration indicates the switched state of a particular line. The individual Line.Switched-State values are:
    (d1) Private: the value of Line.ID.Connect-Type is 'Private'.
    (d2) Disconnected: the value of Line.ID.Connect-Type is not 'Private'; the line does not have a switched connection, and Line.DCE.RI has been FALSE for at least 10 seconds. The symbol "RI" refers to the ring indicator which indicates that the telephone line is ringing.
    (d3) Ringing: the value of Line.ID.Connect-Type is not 'Private'; the line does not have a switched connection, and Line. DCE.RI has been TRUE within the last 10 seconds.
    (d4) Connected: the value of Line.ID.Connect-Type is not 'Private' and the line has a switched connection.

The following glossary list will briefly define the terms used in this specification.

TABLE B-3
Glossary of Terms

ACU = AUTOMATIC CALLING UNIT (See below).

ACU INTERFACE: A set of signals and an electrical signalling discipline which are used in communication between the line adapter for a particular line and an ACU.

ASYNCHRONOUS MODE: A transmission mode in which line suynchronization is maintained by framing each character with start and stop bits. It is used for low to medium speed transmission of character strings.

AUTOMATIC CALLING UNIT (ACU): An optional external unit which connects between a line adapter and a DCE. It can be used to originate outgoing calls on a switched data communications line and is supplied by a communications common carrier.

BAUD: A unit of signalling speed which is defined as the number of times the state of the signal changes per second. If each signal element represents one bit of information, the baud rate is equal to the bit rate of the signal.

BCS (see BLOCK-CHECK SEQUENCE).

BIT-SYNCHRONOUS MODE: A transmission mode in which line synchronization is maintained by operating all DCEs on the line at the same frequency and by keeping the DCEs in phase by framing each transmission with flag patterns. It is used for low to high speed transmission of arbitrary bit strings.

BLOCK-CHECK SEQUENCE (BSC): A horizontal-parity check sequence on a block of characters.

BOOLEAN: A data type which consists of the logicial values TRUE and FALSE.

BYTE: A data type which consists of the 8-bit wide binary values zero to 255. A byte can be used to represent a single EBCDIC character. The bits within a byte are numbered from 7 to zero, with 7 being the most significant bit. A single bit within a byte is denoted by a bit number contained in angle brackets; for example B$(6). A subfield of a byte is denoted by a starting bit and the width of the field (to the right of the starting bit) contained in angle brackets; for example: B$(6:3).

DATA CIRCUIT-TERMINATING EQUIPMENT (DCE): An external unit which connects a line adapter to a data-communications line. It is typically a data set or an electrical interface conversion circuit.

DCE: This refers to data circuit terminal equipment which is used to terminate a data communication line.

DCE INTERFACE: A set of signals and an electrical signalling discipline which are used in communication between the line adapter for a particular line and a DCE.

DESCRIPTOR LINK: A 32 bit job identifier which is sent by the host to the LSP along with an I/O descriptor to initiate an operation. It is returned by the LSP to the host in subsequent connections dealing with the same operation.

DLE CHARACTER: In transparent operation, the character sequence 'DLE SYN' is used by the transceiver to maintain line synchronization. This definition is the only meaning of the DLE character used herein. The symbol DLE refers to "delete".

FALSE: A boolean value denoted by a binary 0.

LSP (SB): Line Support Processor (Sub-Broadband). Formerly called a Frame Recognition Data Line Processor (FR-DLP).

HOST: That processing node which initiates LSP operations. It may be the mainframe or it may be a Subsystem-Controller LSP (SC-LSP).

INPUT PROCESS: An S-process which is used to control the input of a message from a data-communications line. The input process refers to the transfer of data which is received from a USART in the line adapter and transferred to the host computer. Similarly, the "output process" is where data is transferred from the host over to a selected USART in a selected line adapter.

INTEGER: A data type which consists of the 16-bit wide binary values, zero to 65,635. The bits within an integer are numbered from 15 to zero, with 15 being the most significant bit. A single bit within an integer is denoted by a bit number contained in angle brackets; for example: I$(13). A subfield of an integer is denoted by a starting bit and the width of the field (to the right of the starting bit) contained in angle brackets; for example: I$(13:3).

I/O DESCRIPTOR: A data structure which is sent by the host to the LSP along with a descriptor link to initiate an operation. It specifies the type of operation to be performed as well as various parametric information. LA (see LINE ADAPTER).

LIMIT: An integer function, defined upon Line.- State.Sequence, which is "4" for the values 'Enabled' and 'Enabled and Executing' and which is "1" for all other values.

LINE: Either a general reference to a particular line adapter (data-communications line) or a qualifier which is used as part of the naming convention for all of the data structures and hardware elements which are associated with a particular line adapter.

LINE ADAPTER (LA): A hardware unit which is used to connect a data-communications line to the LSP. It contains the following components: (1) a 4,096 byte RAM (Line.Work-Area) which is used to hold information associated with the line, (2) a transceiver (Line.Transceiver), (3) a field-engineer jumpered value (Line.ID) which indicates physical characteristics of the line, (4) DCE-Interface logic, (5) ACU-Interface logic, and (6) two programmatic timers.

LOOP OPERATION: In bit-synchronous mode, a method of line operation in which several stations are connected together in a loop such that each secondary station must pass on all frames which are not addressed to it.

MESSAGE-LEVEL INTERFACE (MLI): A set of signals and an electrical signalling discipline which are used in communication between the LSP and the host.

NDL=NETWORK DEFINITION LANGUAGE.

NETWORK DEFINITION LANGUAGE (NDL): A notation used to specify S-machine processes and their data.

NON-TRANSPARENT OPERATION: In synchronous mode, a method of line operation in which the text portion of a message may not contain line-protocol control characters.

OPERATION: One of the various functions which the LSP can be instructed to perform by the receipt of an I/O descriptor and a descriptor link from the host.

OUTPUT PROCESS: An S-process which is used to control the output of a message to a data-communications line.

PRIVATE LINE: A data-communications channel which is either (1) owned by the customer, (2) leased from a communications common carrier for the exclusive use of the customer, or (3) provided by a communications common carrier for customer access to a switched network other than the common telephone switched network (that is, a TELEX).

RESULT DESCRIPTOR: A data structure which is sent by the LSP to the host along with a descriptor link to terminate an operation. It indicates various information about the status of the operation including, but not limited to, exception conditions.

SWITCHED LINE: A data-communications channel which is provided by a communications common carrier for customer access to the common switched telephone network.

SYN CHARACTER: In non-transparent operation, the character sequence 'SYN SYN' is used by the transceiver to maintain line synchronization. This definition is the only meaning of the SYN character used herein.

SYNCHRONOUS MODE: A transmission mode in which line synchronization is maintained by operating all DCEs on the line at the same frequency and by keeping the DCEs in phase by starting each transmission with the character sequence 'SYN SYN' and embedding either 'SYN SYN' or 'DLE SYN' character sequences in the transmission. It is used for low to high speed transmission of character strings.

S-MACHINE: A special purpose, simulated machine which is tailored for performing information transfer across a data-communications line by suitable control of a transceiver.

S-OPERATOR: One of the operation codes which comprise the instruction set of the S-machine.

S-PROCESS: A process which runs on the S-machine.

TRANSCEIVER: A hardware/firmware unit which performs specialized data-communications functions.

TRANSPARENT OPERATION: In synchronous mode, a method of line operation in which the text portion of a message may contain any valid character including the line-protocol control characters.

TRUE: A boolean value denoted by a binary 1.

Further Data Communication Symbols Used:

S-RC: This refers to the receiver interface for the S-operators.

S-TC: This refers to the transmitter interface for the S-operators.

S-DATA: This refers to the S-operators for identifying a body of data to be transferred.

S-TRANSMIT: This refers to the S-operators used to enable the transmission of data.

S-CLASS: This refers to S-operators which define various types of parameters involving the data communication line such as line speed, transmission delays, receiver delays, time-out period for the line, cyclic redundancy checking, etc.

S-CLASS.DLE.CHARACTER: This is a parameter condition of the S-operator which is used for the "delete" of a character.

S-CLASS SYN CHARACTER: This refers to the operation where a synchronization character is to be transmitted on the line.

S-CLASS.VERTICAL PARITY: This refers to the S-operator which is used to determine whether the parity will be odd or even.

STC: This refers to the "status count" which is used in the type of I/O controllers known as data link processors and which has been described in the patents which were incorporated by reference.

STC TRANSPARENT: This is the operator which puts the line into a particular mode called transparent which enables the stripping out of a synchronization character.

STC FORCE DLE: This is the operator used in the transparent mode to provide a data link escape function. In a synchronous protocol situation this enables the sunchronization character to be stripped out from the other data.

STC COMMAND: This is a status count command which is used on the message level interface between the line support processor and the host computer, whereby certain set routines are accomplished according to the status count. This was described in the patents incorporated by reference.

LINE.DCE.TD: This represents a data communication line to the data circuit terminal equipment for the purpose of "transmitting data".

Figure 1E:
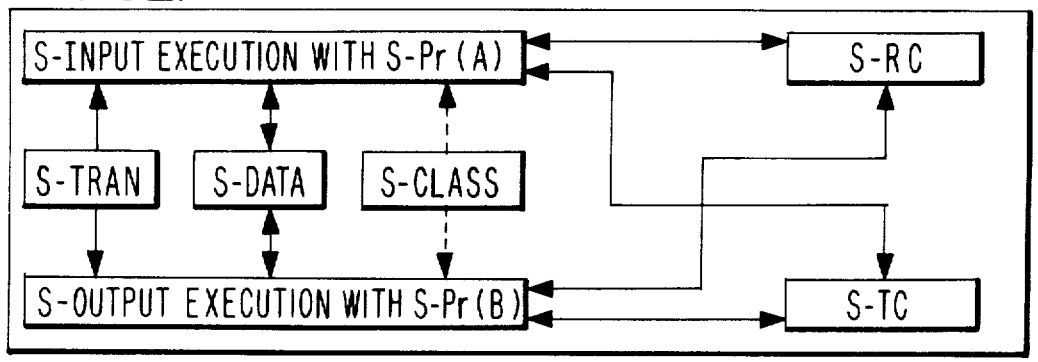

S-INPUT EXECUTION: As seen in FIG. 1E the S-operators handle the execution of inputs to a receiver with a first processor A and also handle the outputs to a transmitter with operators from a second processor B. These are all functions of the universal input output state machine in the line support processor.

THE S-MACHINE

The S-machine is a special purpose simulated machine designed for performing information transfer across a data-communications line by suitable control of a Transceiver such as Transceivers 408, 410, 412, 414, FIG. 4, or 508, 510, 512, 514, FIG. 5.

The S-machine consists of a set of major data structures which may be summarized as:

1. An input process code segment (S.Input)
2. An output process code segment (S.Output)
3. A data segment which is shared by the two previous processes (S.Data)
4. A translation table (S.TRAN)
5. A set of line parameters (S.Class)
6. Two simulated processors (S.PR)
b 7. A receiver interface (S.RC)
8. A Transmitter interface (S.TC)

FIG. 1E shows the relationship of these data structures.

Transceiver Interface: An S-machine interacts with a Transceiver by means of the following data structures:

1. A set of line parameters (S.Class)
2. A receiver interface (S.RC)
3. A transmitter interface (S.TC).

Figure 1F:
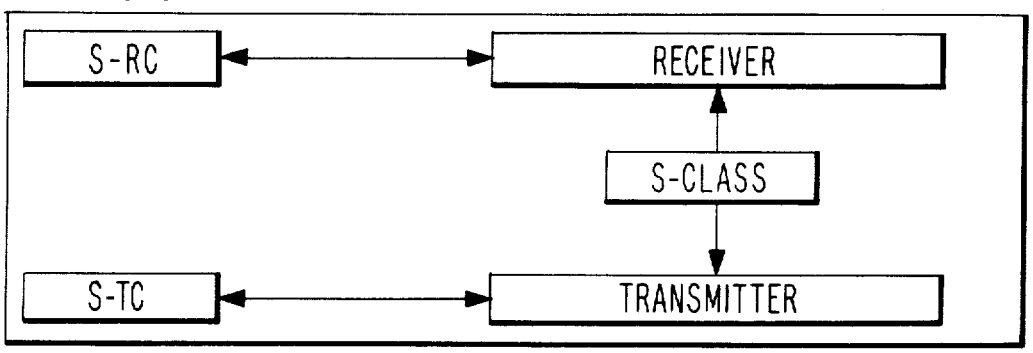

FIG. 1F shows the relationship of these data structures.

Figure 1G:
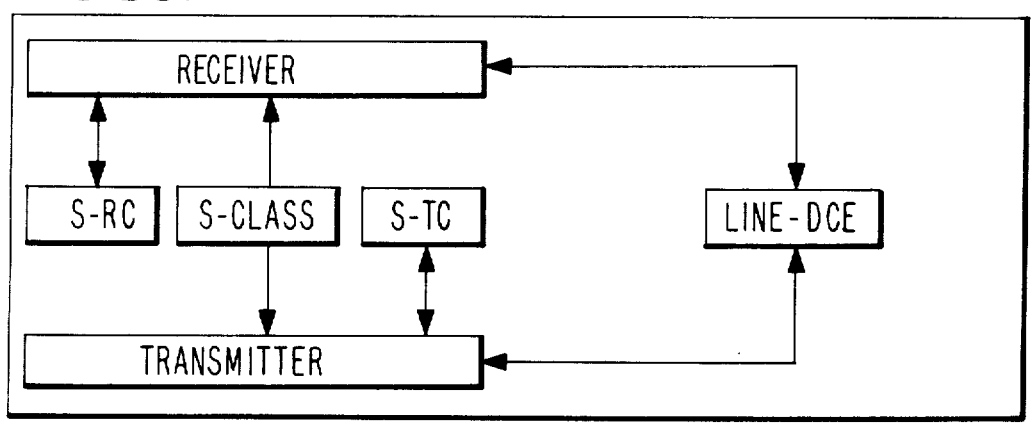

Transceiver: The transceiver is a hardware-firmware unit which performs specialized data communication functions. The transceiver consists of a receiver and a transmitter. It interacts with the S-machine via the S.Class, S.RC, and S.TC data structures. It interacts with a data communication line via the Line.DCE data structure. FIG. 1G shows the transmitter and receiver relationship to the data structures.

Receiver: The receiver accepts a serial bit stream from the DCE (data circuit termination equipment) via the Line.DCE.RD signal, and converts it into a sequence of characters. The rate at which the bits are expected are determined by the DCE in synchronous and bit-synchronous mode and by S.Class.Clock-Divisor in the asynchronous mode.

The receiver is enabled when S.RC.Enabled is set to TRUE. Each accumulated character is placed in the S.RC.Char and the S.RC.Byte-Present is set to TRUE. If S.RC.Byte-Present is not set to FALSE before another character is accumulated, the new character is placed in S.RC. Char and the S.RC.Error.Overrun is set to TRUE.

The number of bits assembled per "character" is determined by S.Tran.Char-Size (with the exception of the address and control field of each frame in the bit-synchronous mode). The assembled character is right-justified with zero fill.

Receiver Operation—Asynchronous Mode: Assembly of a character is initiated upon recognition of the first start bit following a preceding stop bit. The character assembled least-significant bit first. All start, stop and parity bits are deleted from the assembled character. If the final bit of a character is not followed by a stop bit, then S.RC.Error.Stop-Bit is set to TRUE; the absence of a stop bit in conjunction with a received character of all zeros will cause the S.RC.Frame-Abort to be set to TRUE also. If S.Class.Vertical-Parity specifies "Even" or "Odd" parity and the assembled character has bad parity, then S.RC.Parity is set to TRUE.

Receiver Operation—Synchronous Mode:

When S.RC.Enable is set TRUE, the receiver begins searching for two contiguous characters which match S.Class.SYN. Their recognition establishes "line synchronization". The receiver will then begin assembling characters from the line, least significant bit first. If S.TC.Transparent is FALSE and the S.Class.Vertical-Parity is "even" or "odd", each character is assumed to include a parity bit. If a character has bad parity, then S.RC.Parity is set to True. The parity bit is deleted from the assembled character.

If S.RC.Transparent is FALSE, the receiver will discard all assembled characters which match S.Class.-

SYN. If S.RC.Transparent is TRUE and an assembled character matches S.Class.DLE, the receiver will examine the next assembled character. If that character matches S.Class.SYN, the pair of characters is discarded. If that character matches S.Class.DLE, the second character is discarded.

Receiver Operation—Bit Synchronous Mode:

When S.RC.Enabled is set to TRUE, the receiver begins searching for a flag pattern (01111110). When the flag pattern is detected and the next 8 bits are another flag or an abort pattern (11111111), the search is re-initiated. Otherwise, the beginning of a frame is detected.

The receiver continues to assemble 8-bit characters until the address and control fields of the frame have been received; subsequent received bits are assembled, based upon S.Tran.Char-Size until either a flag or an abort is detected. The address field is terminated by the first assembled character in which the high-order is zero. The control field is a fixed one or two characters, as specified by S.Class.Control-Size. If S.Loop is TRUE and the first character of the address field is not all ones or does not match S.Class.Loop-Address, the frame is discarded and the receiver goes back to searching for the first flag of the next frame.

If the frame is terminated by an abort, the S.RC.Error.Frame-Abort is set to TRUE. If the frame is terminated by a flag, S.RC.End-Frame is set to TRUE, S.RC.Residue is set to indicate the number of bits in the last character and the flag and preceding 16-bits (the FCS) are discarded. If the final computed FCS (frame control signal) is not correct, then S.RC.BCS-Error is set to TRUE.

Within a given frame, a zero bit following five consecutive ones will be discarded.

Transmitter Operation: The transmitter accepts a sequence of commands and characters. This sequence results in a serial bit stream which is transmitted to the DCE (data circuit termination equipment) via the Line.DCE.TD signal. The rate at which bits are transmitted is determined by the DCE in synchronous and bit-synchronous modes and also by the S.Class.Clock-Divisor in the Asynchronous mode.

The transmitter is enabled when S.TC.Enabled is set to TRUE. The function to be performed is specified by the S.TC.Command. When the S.TC.Command is "Transmit Char" and the transmitter is ready to accept a new character, the S.TC.Byte-Request is set to TRUE. Within one character time, the next character must be loaded into S.TC.Char and the S.TC.Byte-Request must be set to FALSE: otherwise an underrun condition will occur. This is an error only in the bit-synchronous mode.

The number of bits transmitted per character is determined by S.Tran.Char-Size (with the exception of the address and control fields of the frame in bit-synchronous mode. These bits must be right-justified within the character).

Asynchronous Mode-Transmitter Operation: If S.TC.Command is set to "Transmit Char", each loaded character is converted into the following bit sequence:
(a) a start bit
(b) the bit-serial character (least significant bit first)
(c) a parity bit (if S.Class.Vertical-Parity is "even" or "odd")
(d) the number of stop bits is specified by the S.Class.Stop-Bits.

If the next character has already been loaded upon completion of the current character, the next character is begun immediately; otherwise the line is held in a "Mark" condition.

If S.TC.Command is set to "Transmit-Break", the transmitter will hold the line in a "Space" condition until either (1) the S.TC.Command is set to "Transmit Char" or (2) the S.TC.Enabled is set to FALSE.

Synchronous Mode—Transmitter Operation: If the S.TC.Command is set to "Transmit Char", each loaded character is converted into the following bit sequence;
(a) the bit-serial character (least significant bit first) followed by:
(b) a parity bit (if S.TC. Transparent is FALSE and the S.Class.Vertical-Parity is "even" or "odd").

If an underrun occurs and the S.TC.Transparent is FALSE, the transmitter will transmit the character specified by the S.Class.SYN. If an underrun occurs and the S.TC.Transparent is TRUE, the transmitter will transmit the pair of characters specified by S.Class.DLE and the S.Class.SYN.

Bit-Synchronous Mode-Transmitter Operation: If the S.Class.Loop is TRUE, the transmitter will delay all commands and automatically retransmit everything received by the receiver until the receiver detects the "go ahead" pattern (01111111); upon completion of each frame, the transmitter will transmit a "go-ahead" and return to loop operation until another "go-ahead" is received.

If the S.TC.Command is set to "Trans Flag", the transmitter will transmit continuous flags. If the S.TC.Command is set to "Transmit Abort", the transmitter will transmit continuous aborts.

If the S.TC.Command is set to "Transmit Char", the beginning of a frame is assumed. The transmitter will transmit 8-bit characters until the address and the control fields of the frame has been transmitted; subsequent characters are transmitted based upon the S.Tran.Char-Size. The address field is terminated by the first character in which the high-order bit is zero. The control field is a fixed one or two characters, as specified by the S.Class.Control-Size. If an underrun occurs, the transmitter will transmit an abort and set the S.TC.Error.Underrun to TRUE.

If the S.TC.Command is set to "Transmit End-Frame" the transmitter will apply the S.TC.Residue to the last character loaded, then transmit the FCS, and then transmit at least one flag.

Within a Frame, a zero bit is inserted after five consecutive ones.

The I/O descriptor words from the host computer when conveyed to the Line Support Processor will indicate what operations are to be accomplished such as: initializing the S-Machine; doing a manual dial or an automatic dial operation; executing input/outputs; disconnecting from the LSP; and other operational functions. The Result Descriptor Words which are sent back by the Line Support Processor to the host computer will indicate whether or not each instruction was executed or whether some type of incompletion of command was encountered.

Certain codes have been provided for the transmitter character size which will determine whether the character size is to be 5, 6, 7 or 8 bits per character.

Host Interface: Communication between the LSP and the host is accomplished via a set of signals and an electrical signalling discipline. These signals are called the Message-Level Interface (MLI).

Data Communications-Line Interface: As seen in FIG. 1B, the Line Adapter for a particular line is connected to the data-communications line via a Data Circuit-Terminating Equipment (DCE) and an optional Automatic Calling Unit (ACU).

DCE Interface: Communication between the Line Adapter for a particular line and a DCE is accomplished via a set of signals and an electrical signalling discipline called the "DCE Interface". A particular DCE-Interface signal for a particular line is denoted by 'Line.DCE.(Signal$Name)'. The table below lists the set of DCE-Interface signals.

TABLE B-4

| Direction | | Signal Name |
|---|---|---|
| LSP → DCE | DTR | Data Terminal Ready |
| LSP ← DCE | DSR | Data Set Ready |
| LSP → DCE | RTS | Request to Send |
| LSP ← DCE | CTS | Clear to Send |
| LSP → DCE | SO | Special Output |
| LSP ← DCE | SI | Special Input |
| LSP → DCE | DM | Dial Mode |
| LSP ← DCE | DCD | Data Carrier Detector |
| LSP ← DCE | RI | Ring Indicator |
| LSP ← DCE | SCT | Serial Clock Transmit |
| LSP ← DCE | SCR | Serial Clock Receive |
| LSP → DCE | TD | Transmitted Data |
| LSP ← DCE | RD | Received Data |

It is useful to distinguish between the "external" and "internal" DCE-Interface signals. An external signal is one of the physical data paths between the LSP and the DCE. An internal signal is an internal LSP data path which normally connects to one of the external signals.

ACU Interface: Communication between the Line Adapter for a particular line and an ACU is accomplished via a set of signals and an electrical signalling discipline called the "ACU Interface", as seen in FIG. 1B and FIG. 1C. A particular ACU-Interface signal for a particular line is denoted by 'Line.ACU.(Signal$Name)'. The table below lists the set of ACU-Interface signals.

TABLE B-5

| Direction | | Signal Name |
|---|---|---|
| LSP → DCE | CRQ | Call Request |
| LSP ← DCE | PWI | Power Indication |
| LSP ← DCE | PND | Present Next Digit |
| LSP → DCE | DPR | Digit Present |
| LSP → DCE | NB1 | Digit Signal 1 |
| LSP → DCE | NB2 | Digit Signal 2 |
| LSP → DCE | NB4 | Digit Signal 4 |
| LSP → DCE | NB8 | Digit Signal 8 |
| LSP ← DCE | DLO | Data Line Occupied |
| LSP ← DCE | ACR | Abandon Call and Retry |
| LSP ← DCE | DSS | Data Set Status |

OPERATIONS OVERVIEW

To initiate a data transfer or data communications operation, the host computer sends the Line Support Processor (also called a Data Link Processor, DLP) a coded signal called an I/O Descriptor and a coded job-identifier signal called a Descriptor Link. The I/O Descriptor specifies the type of operation to be performed as well as various other parameters of information.

After reception of an I/O Descriptor and the Descriptor Link, the LSP-DLP will make a transition to one of three states called message level interface (MLI) states; these are:

(i) Result Descriptor: this state transition indicates that the LSP-DLP is immediately returning a Result Descriptor coded word involving that particular operation (for example, because it detected either a vertical or a longitudinal parity error in the I/O Descriptor or in the Descriptor Link).

(ii) Disconnect: this state transition indicates both that the LSP-DLP cannot accept any more operations at this time and that the I/O Descriptor word and the Descriptor Link were received without parity errors.

(iii) Idle: this state transition indicates both—that the LSP-DLP cann accept another legal operation at this time and that the I/O Descriptor and the Descriptor Link were received without parity errors.

If the LSP-DLP should detect a vertical parity error on the first MLI word of the I/O Descriptor (which contains the "number of additional words" field), it will immediately make a transition to the state called the "I/O Descriptor LPW MLI state".

Upon the acceptance of an I/O Descriptor word (which is for a particular line), the LSP-DLP will increment the Line.Count by "one".

Upon termination of an operation, the LSP-DLP will return a Result Descriptor word (which contains information indicating the status of the operation including exception conditions) back to the host computer. If the operation was for a particular line only, the LSP-DLP will also decrement Line.Count by "one".

Figure 2:
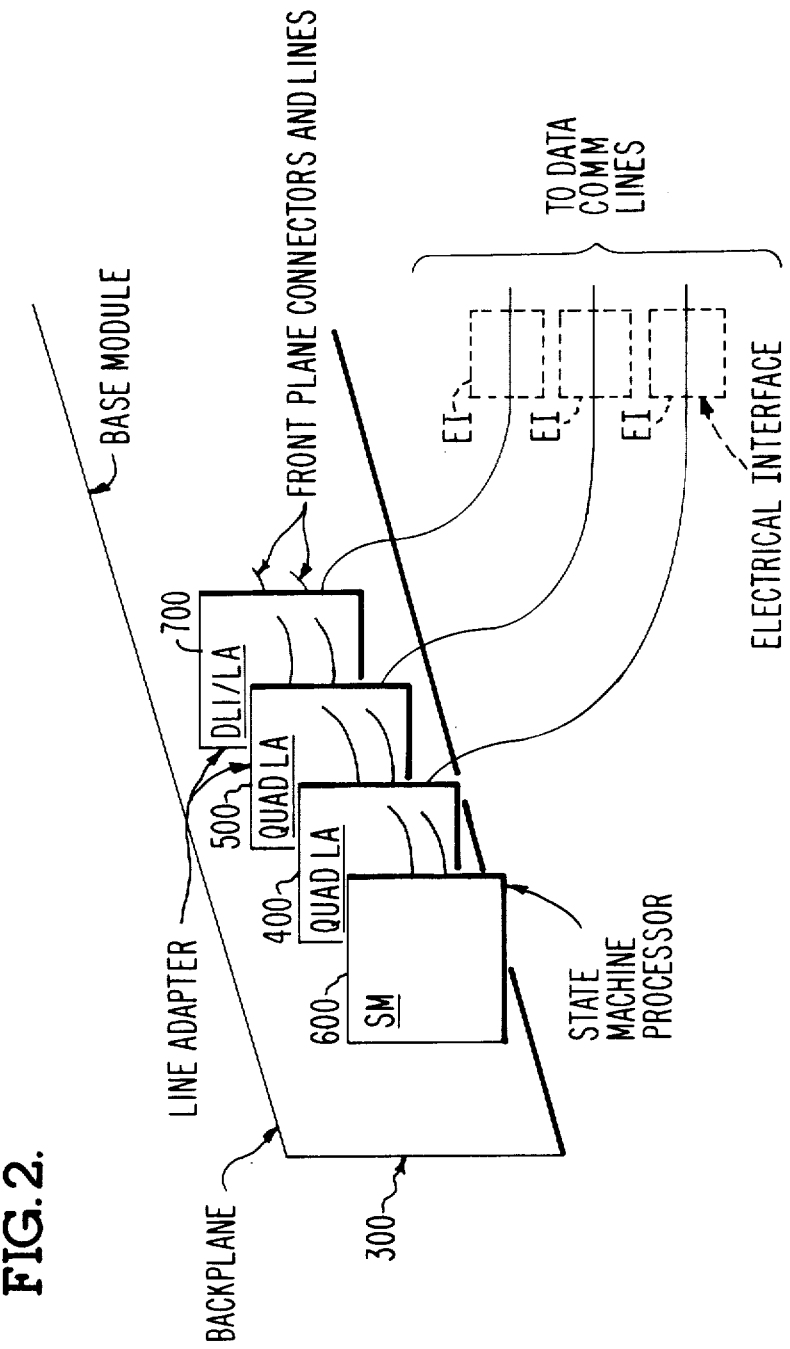
FIG. 2 is a schematic drawing showing the backplane of the Base Module and the slide-in cards which go to make up the Line Support Processor.

Referring to FIG. 2 the Line Support Processor is seen as being composed of a number of slide-in cards which slide into the Base Module. These slide-in cards consist of the State Machine Processor card 600, the Quad Line Adapters 400, 500 (which each consist of four line adapters on one card) and a DLI/LA card 700 which is an interface to the main host computer and also supports a single line adapter on the card. This unit is called a DLI or Data Link Interface.

As will be seen in FIG. 2, a series of frontplane connecting lines connect these slide-in cards one to another. The outputs of each of the line adapters are also frontplane output lines which connect to an electrical (EI) interface which connects to individual data communication lines.

STATE MACHINE PROCESSOR (UIO-SM) FIG. 6

The State Machine Processor, which is often designated as the UIO State Machine (to designate a Universal Input-Output Processor), resides on a circuit board of chips which can be inserted as a slide-in assembly into the Base Module (FIG. 2) where it connects to the backplane. The State Machine is connected to the application dependent logic (located on other slide-in cards) through its frontplane connectors as is seen in FIG. 2.

The description and the drawings of the UIO State Machine have been discussed in several prior patents which are included herein by reference. These patents are:

U.S. Pat. No. 4,293,909 entitled "Digital System for Data Transfer Using Universal Input-Output Microprocessor", inventors Robert D. Catiller and Brian K. Forbes.

U.S. Pat. No. 4,291,372 entitled "Microprocessor System with Specialized Instruction Format", inventors Robert D. Catiller and Brian K. Forbes.

U.S. Pat. No. 4,292,667 entitled "Microprocessor System Facilitating Repetition of Instructions", inventors Robert D. Catiller and Brian K. Forbes.

The use of a host working in conjunction with an I/O Subsystem using I/O Descriptors, Data Link Descriptors and Result Descriptors is shown in U.S. Pat No. 4,189,769, Feb. 19, 1980, to Darwen J. Cook and Donald A. Millers, II entitled "Input-Output Subsystem for Digital Data Processing System", and this patent is included herein by reference.

As discussed in the referenced patents the UIO State Machine implements a variety of general purpose operators which include:
Arithmetic OPs;
Logical OPs;
Read/Write Memory OPs;
PUT/GET OPs;
Programmed Stack OPs (Branch, Call, Return).

The PUT OP writes a 16 bit word from the I/O bus of the State Machine Processor into a register useful in an external application. The PUT OP can address one of some 32 such application dependent registers. The GET OP reads a 16 bit word from an application dependent register into a selective accumulator register on the State Machine or into data memory through the I/O bus. The GET OP can also address one of the 32 application dependent registers.

The UIO State Machine Processor 600 has the ability to repeat certain OPs (PUT's, GET's and certain logical OPs) by the use of a Repetition Counter 42 along with the Memory Reference Register 40 (MRR) which is used as a counter, after having been loaded with the starting address of the data block to be used in the repeated OP.

Figure 6:
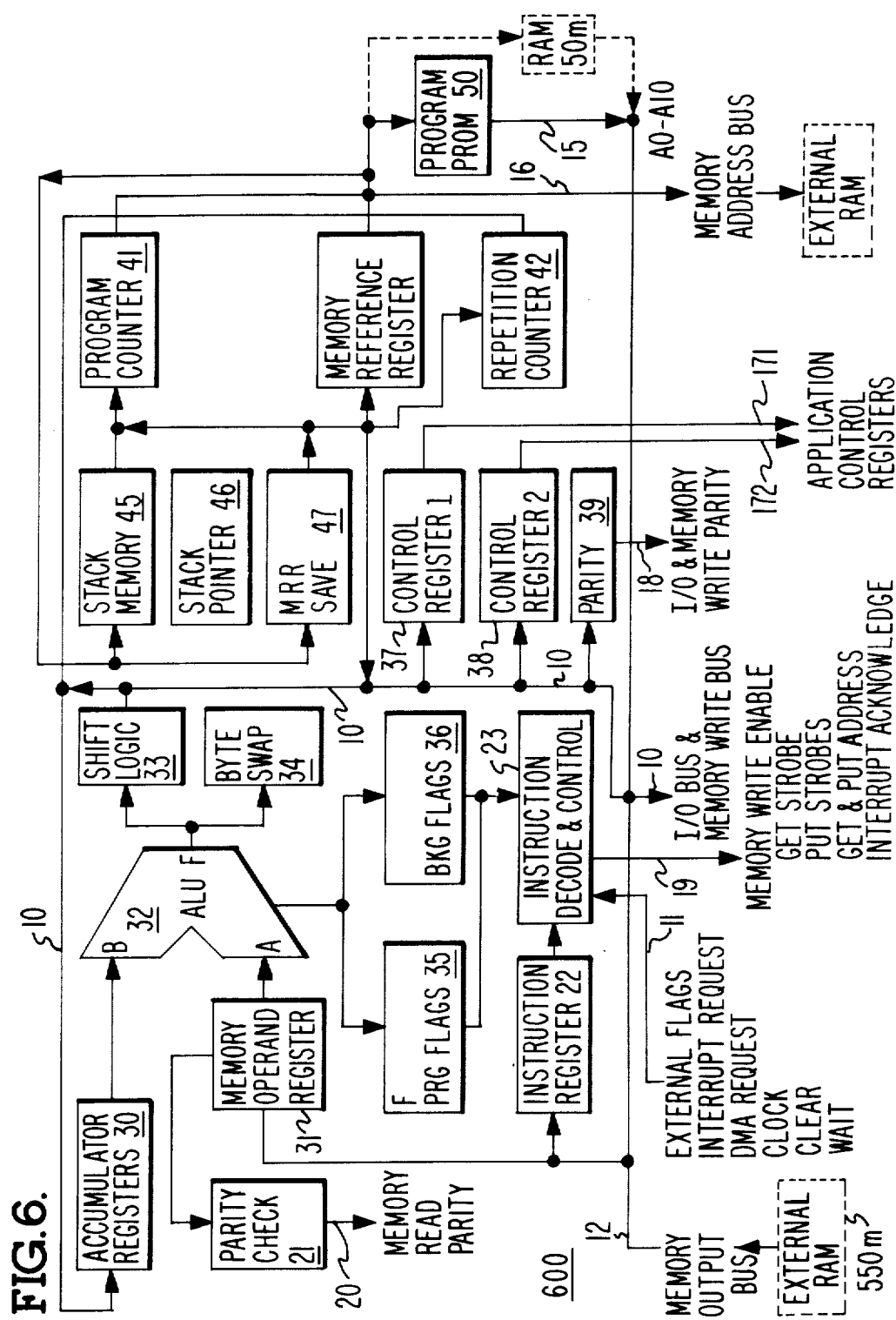
FIG. 6 is a block diagram of the State Machine Microprocessor and often abbreviated as the UIO-SM.

For the purpose of holding "PUT Data" for a longer period of time than can occur directly off of the I/O bus, two eight-bit registers (a First Control Register 37 and a Second Control Register 38) have been placed on the I/O bus 10 of the State Machine Processor (FIG. 6). The strobing of these registers is under the control of the Application Dependent Logic.

A "WAIT" line has been implemented into the State Machine Processor such that when "slow memory" is addressed, the "slow memory" can force the State Machine Processor to wait however long is required for the Read or Write operation to be valid. This line can also be used to "halt" the machine.

I/O Descriptor-Result Descriptor Notation: I/O Descriptors and Result Descriptors are data structures which contain multiple component fields. These fields are mapped into a sequence of MLI words. An MLI word is 16 bits wide. The mapping between fields and MLI words is shown below:

TABLE B-5

| A A A A B B B B C C C C D D D D |
| 8 4 2 1 8 4 2 1 8 4 2 1 8 4 2 1 |
|---|
| Word # Field-Name Line |
| Field-Letter / Field-Value Line |

A particular field is defined by the following notation:
w: 'Field Name': Word (x) (y:z)

| w: | The letter 'w' is used to cross-reference the verbal description of the field with its position in the associated diagram. Subfields of fields are not assigned individual field letters. |
| Field Name: | The name assigned to the field. |
| Word (x): | The field is contained within (or starts in) MLI word number 'x'. |
| (y:z): | The field starts at the bit labelled |

TABLE B-5-continued

'y' and is 'z' bits wide.

Portions of MLI words which are marked as either '(Not Used)' or '(NU)' must be zero. Integer fields are binary with the left-most bit (in the sense of the diagrams in this document) being the most significant bit. Common I/O-Descriptor Fields: Except for a few common fields, I/O-descriptor fields are different for the individual operation types. The meaning of common fields is shown below.

TABLE B-6

Common I/O-descriptor field definition:

| A A A A | B B B B | C C C C | D D D D |
| 8 4 2 1 | 8 4 2 1 | 8 4 2 1 | 8 4 2 1 |
|---|---|---|---|
| Data Tr | Op Type | # Additional Words | |
| a a a a | b b b b | c c c c c c c c | |

| Line Number | | Optn Sel | Ex Op Typ |
|---|---|---|---|
| d d d d d d d d | | e e e e | f f f f |

| Data Length |
|---|
| g g g g g g g g g g g g g g g g |

The fields in these words are described below as items a, b, c, d, e, f, g:

a: Data Transfer: Word (1) (A8:4)—This enumeration specifies the nature of the data transfer which may occur as part of the operation. The encoding of this field is listed in the table below.

TABLE B-7

| Data Transfer | Code |
|---|---|
| Read: LSP → Host | 1000 |
| Write: Host → LSP | 0100 |
| Test: None | 0010 | b: Operation Type: Word (1) (B8:4)—This enumeration specifies which LSP operation is to be performed. The encoding of this field is listed in the table below.

TABLE B-8

| Operation Type | Code |
|---|---|
| Extended Op Type | 0000 |
| Initialized S-Machine | 0001 |
| Update S-Machine | 0010 |
| Monitor Switched-Line | 0011 |
| Answer Switched-Line | 0100 |
| Auto-Dial Switched-Line | 0110 |
| Disconnect Switched-Line | 0111 |
| Execute Input Process | 1000 |
| Execute Output Process | 1001 |
| Discontinue | 1010 |
| Soft-Clear Line | 1011 |
| Test LSP ID | 1100 |
| Test Line | 1101 |
| Dump Data-Area | 1110 | c: Number of Additional Words: Word (1) (C8:8)— This integer specifies the number of additional MLI words in the I/O Descriptor and it can range in value from 0 to 23.

d: Line Number: Word (2) (A8:8)—This integer specifies the number of the line/line adapter to be used in the operation and it can range in value from 0 to 15. It does not apply to the 'Test LSP ID' operation.

e: Option Selector: Word (2) (C8:4)—This enumeration specifies an option selection which depends upon the operation type. It does not apply to all operation types.

f: Extended Operation Type: Word (2) (D8:4)—If the value of 'Op Type' is 'Extended Op Type', this enumeration specifies which LSP operation is to be performed. The encoding of this field is listed in the table below.

TABLE B-9

| Extended Operation Type | Code |
|---|---|
| (Non extended Op Type) | 0000 | g: Data Length: Word (3) (A8:16)—This integer specifies either the maximum or the required number of bytes of data transfer for the operation. It does not apply to all operation types.

Operation Summary: The operation types of the LSP are summarized below followed by a table and FIGS. 1E, 1F, which summarize the LSP I/O descriptors.

(1) Initialize S-Machine: An operation of this type is used to initialize any one of the following items in the S-machine for the specified line: (1) Line.S.-Class, (2) Line.S.Data, (3) Line.S.Code, or (4) Line.S. Tran.

(2) Update S-Machine: An operation of this type is used to reinitialize either of the following items in the S-machine for the specified line: Line.S.Class or Line.S.Tran.

(3) Monitor Switched-Line: An operation of this type is used to monitor the specified line for either a ring or an end-of-ring indication.

(4) Answer Switched-Line: An operation of this type is used to answer an incoming call on the specified line.

(5) Auto-Dial Switched-Line: An operation of this type is used to automatically originate an outgoing call on the specified line.

(6) Disconnect Switched-Line: An operation of this type is used to break a switched connection on the specified line.

(7) Execute Input Process: An operation of this type is used to cause the LSP to interpretively execute the S-machine input process on the specified line.

(8) Execute Output Process: An operation of this type is used to cause the LSP to interpretively execute the S-machine output process on the specified line.

(9) Discontinue: An operation of this type is used either to (1) force termination of a 'Monitor Switched-Line' operation, (2) conditionally force termination of all 'Execute Input Process' operations, or (3) conditionally force termination of all 'Execute Output Process' operations on the specified line.

(10) Soft-Clear Line: An operation of this type is used to unconditionally clear the specified line.

(11) Test LSP ID: An operation of this type is used to determine the type and configuration ID of the LSP.

(12) Test Line: An operation of this type is used to determine the physical and logical state of the specified line.

(13) Dump Data-Area: An operation of this type is used to obtain a dump of Line.S.Data for the specified line.

The following Table B-10 summarizes the I/O Commands used by the Host to direct the operations of the Line Support Processor.

TABLE B-10

| I/O Descriptor: Operation Type | Word 1 | | | | Word 2 | | | | Word 3 | | | | 4 - N | | | |
|---|---|---|---|---|---|---|---|---|---|---|---|---|---|---|---|---|
| | A | B | C | D | A | B | C | D | A | B | C | D | A | B | C | D |
| (1) Initialize S-Mach | 4 | 1 | 0 | 3 | d | d | e | 0 | g | g | g | g | h | h | h | h |
| (2) Update S-Machine | 4 | 2 | 0 | 3 | d | d | e | 0 | g | g | g | g | h | h | h | h |
| (3) Monitor | 2 | 3 | 0 | 1 | d | d | e | 0 | — | — | — | — | — | — | — | — |
| (4) Answer | 2 | 4 | 0 | 1 | d | d | 0 | 0 | — | — | — | — | — | — | — | — |
| (5) Auto-Dial | 4 | 6 | 0 | 2 | d | d | 0 | 0 | g | g | g | g | — | — | — | — |
| (6) Disconnect | 2 | 7 | 0 | 1 | d | d | 0 | 0 | — | — | — | — | — | — | — | — |
| (7) Execute Input | a | 8 | c | c | d | d | 0 | 0 | g | g | g | g | h | h | h | h |
| (8) Execute Output | a | 9 | c | c | d | d | 0 | 0 | g | g | g | g | h | h | h | h |
| (9) Discontinue | 2 | A | 0 | 1 | d | d | e | 0 | — | — | — | — | — | — | — | — |
| (10) Soft-Clear Line | 2 | B | 0 | 1 | d | d | e | 0 | — | — | — | — | — | — | — | — |
| (11) Test LSP ID | 2 | C | 0 | 0 | — | — | — | — | — | — | — | — | — | — | — | — |
| (12) Test Line | 2 | D | 0 | 1 | d | d | 0 | 0 | — | — | — | — | — | — | — | — |
| (13) Dump Data-Area | 8 | E | 0 | 2 | d | d | 0 | 0 | g | g | g | g | — | — | — | — |

N = The last I/O-descriptor word (48 maximum).
0 = 9, A-F = The corresponding hexadecimal digit.
— = The word does not apply to the operation type.
a = Execute Input (8 or 2); Execute Output (4 or 2).
c = The total number of I/O-descriptor words minus one.
d = The line number.
e = An operation-type dependent option selector.
g = The number of bytes of data.
h = Depends on the operation type.

Individual Operation Types:

The operations of Table B-10 can be summarized as follows:

(1) Initialize S-Machine: An "Initialize S-Machine" operation is used to initialize any one of the following items in the S-Machine for the specified line: (i) Line.-Class, (ii) Line.S.Data, (iii) Line.S.Code, (iv) Line.S.-Tran. It will be accepted only when Line.State.Sequence is "uninitialized".

The MLI data representation on Line.S.Class is defined under the subject of S-Machine Data Structures. If Class.Code is either "asynchronous" or "synchronous", then the "Data Length" must be 20 bytes; otherwise, it must be 22 bytes.

(2) Update S-Machine: An "Update S-Machine" operation is used to reinitialize certain items in the S-Machine for the specified line; these are: Line.S.Class or Line.S.Tran. It will be accepted only when Line.State.Sequence is "enabled".

(3) Monitor Switched-Line: A "Monitor Switched-Line" operation is used to monitor the specified line for either a ring or an end-of-ring indication. It will be accepted only when Line.State.Sequence is "enabled" and Line.Switched-State is either "Disconnected" or "Ringing". ("Answer Switched-Line" operation is used to answer an incoming call on the specified line. It will be accepted only when Line.State.Sequence is "enabled" and Line.Switched-State is "Ringing".

(5) Auto-Dial Switched-Line: An "Auto-Dial Switched-Line operation is used to automatically originate an outgoing call on the specified line. It will be accepted only when Line.State.Sequence is "Enabled" and Line.Switched-State is "Disconnected".

(6) Disconnect Switched-Line: A "Disconnect Switched-Line" operation is used to break a switched connection on the specified line. It will be accepted only when the Line.State.Sequence is "Enabled" and Line.Switched-State is "Connected".

(7) Execute Input Process: An "Execute Input Process" operation is used to cause the Line Support Processor (LSP) to interpretively execute the S-Machine input process on the specified line. It will be accepted only when Line.State is (i) "Not Executing", "Enabled"; (ii) "Not Executing", "Enabled and Executing"; (iii) "Executing".

An execution of the input process consists of a dynamic path through the static lists of S-operators which comprise the code of the input processor.

(8) Execute Output Process: An "Execute Output Process" operation is used to call the Line Support Processor to interpretively execute the S-machine output process on the specified line. It will be accepted only when Line.State is one of the following: (i) "Not Executing", "Enabled"; (ii) "Not Executing", "Enabled and Executing"; (iii) "Executing".

An execution of the output process consists of a dynamic path through the static list of S-operators which comprise the code of the output processor.

(9) Discontinue: A "Discontinue" operation is used to either (i) force termination of a "Monitor Switched-Line" operation; (ii) conditionally force termination of all "Execute Input Process" operations; or (iii) conditionally force the termination of all "Execute Output Process" operations on the specified line. It will be accepted only when one of the listed operations is in progress on the line.

Upon receipt of an I/O descriptor for an operation of this type, the Line Support Processor (LSP) will not make a transition to the "Idle" MLI State until and before it has returned a Result Descriptor for the operation.

(10) Soft-Clear Line: A "Soft-Clear Line" operation is used to unconditionally clear the specified line. It will be accepted any time. Upon receipt of an I/O Descriptor for an operation of this type, the Line Support Processor will not make a transition to the "Idle" MLI state until and before it has returned a Result Descriptor for the operation.

(11) test LSP ID: A "Test LSP ID" operation is used to determine the type and configuration identity (ID of the Line Support Processor (LSP)). It is common to all LCPs and will be accepted any time. Again, upon receipt of an I/O descriptor for an operation of this type, the LSP will not make a transition into the "Idle" MLI state until and before it has returned a Result Descriptor for the operation.

(12) Test Line: A "Test Line" operation is used to determine the physical and logical state of the specified line. It will be accepted at any time. Upon receipt of an I/O descriptor for this type of operation, the LSP will not make a transition to "Idle" MLI state until it has returned a Result Descriptor for the operation.

(13) Dump Data-Area: A "Dump Data-Area" operation is used to obtain a dump of Line.S.Data for the specified line. It will be accepted only when Line.State.Sequence is either "Uninitialized" or else "Enabled".

(14) Spontaneous Line Events: The Line Support Processor responds to the following events regardless of the operations which are in progress on the line: (i) Ring Indication—if Line.Switched-State is "Disconnected" and the DCE raises Line.DCE.RI, the LSP will set Line.Switched-State to "Ringing"; (ii) End-of-Ring Indication—if Line.Switched-State is "Ringing" and the DCE does not raise Line.DCE.RI within 10 seconds of the last time it raised Line.DCE.RI, then the LSP will set Line.Switched-State to "Disconnected"; (iii) Disconnect Indication—if Line.Switched-State is "Connected" and either (a) Line.ID.DCE-Disconnect-Detect is TRUE and the DCE drops Line.DCE.DSR, or (b) Line.S.Class.Loss-of-DCD-Disconnect is TRUE and the DCE drops Line.DCE.DCD, the LSP will set the Line.Switched-State to "Disconnected".

RECEIVER/TRANSMITTER
OPERATIONS—FIGS. 1E, 1F, IG:

Receiver Operation: The Receiver accepts a serial bit stream from the DCE (Data Circuit Termination Equipment) via the signal "Line.DCE.RD", and converts it into a sequence of characters. The rate at which the bits are expected is determined by (1) S.Class.Clock-Divisor in the asynchronous mode; (2) either S.Class.Clock-Divisor or the DCE in bit-synchronous mode; and (3) by the DCE in the synchronous mode.

The Receiver is enabled when S.RC.Enabled is set to TRUE. Each accumulated character is placed in S.RC.Holding and S.RC.Byte-Present is set to TRUE. If S.RC.Byte-Present is not set to FALSE before another character is accumulated, the new character is placed in S.RC.Holding and S.RC.Error.Overrun is set to TRUE.

The number of bits assembled per character is determined by S.RC.Char-Size (with the exception of some fields in the bit-synchronous mode). The assembled character is right-justified with zero fill. Asynchronous Mode-Receiver: Assembly of a character is initiated on recognition of the first "start bit" following a preceding "stop bit". The character is assembled least-significant bit first. All start, stop and parity bits are deleted from the assembled character. If the final bit of a character is not followed by a "stop bit", then S.RC.Error.Stop-Bit is set to TRUE. The absence of a stop bit" in conjunction with a received character of all zeros will cause S.RC.Error.Frame-Abort to be set to TRUE as well. If S.Class.Vertical-Parity specifies "even" or "odd" parity and the assembled character has bad parity, then S.RC.Error.Parity is set to TRUE.

Synchronous Mode-Receiver: When S.RC.Enabled is set to TRUE, the receiver begins searching for two contiguous characters which match S.Class.SYN. Their recognition establishes line synchronization. The receiver will then begin assembling characters from the line, least significant bit first. If S.RC.Transparent is FALSE, and S.Class.Vertical-Parity is "even" or is "odd", each character is assumed to include a parity bit. If a character has bad parity, then S.RC.Error.Parity is set to TRUE. The parity bit is deleted from the assembled character.

Bit-Synchronous Mode-Receiver: When S.RC.Enabled is set to TRUE, the Receiver begins searching for a flag pattern (01111110). When one is detected and the next eight-bits are another flag or are an abort pattern (11111111), the search is reinitiated. Otherwise the "beginning of a frame" is detected.

The Receiver continues to assemble eight-bit characters until the address and control fields of the frame have been received. Subsequent received bits are assembled based upon S.RC.Char-Size until either a flag or an abort is detected. If S.Class.Address-Mode is "Basic", the address field consists of one character; otherwise, the address field is terminated by the first assembled character in which the low-order bit is "1". If S.Class.-Control-Mode is "Basic", the control field consists of one character; otherwise, it consists of two characters. If S.Class.Function is "secondary", the Receiver compares the first-received address character with both the global address (11111111) and the S.Class.Secondary-Address. If a match occurs, the Receiver accepts the frame; otherwise, the Receiver skips the frame and begins searching for the next frame.

If the frame is terminated by a flag, S.RC.End-Frame is set to TRUE.

S.RC.Residue is set to indicate the number of residue bits in the I-field, and the FCS is checked and discarded. If the final computed FCS is not correct, S.RC.Error.BCS-Error is set to TRUE. If the frame is terminated by an abort, then S.RC.Error.Frame-Abort is set to TRUE. Within a frame a zero bit following five consecutive 1's will be discarded.

Transmitter Operation: The Transmitter accepts a sequence of commands and characters. This sequence results in a serial bit stream that is transmitted to the DCE via the Line.DCE.TD signal. The rate at which the bits are transmitted is determined by (1) S.Class.-Clock-Divisor in the asynchronous mode; (2) either S.Class.Clock-Divisor or the DCE in the bit-synchronous mode; and (3) by the DCE in the synchronous mode.

The Transmitter is enabled when S.TC.Enabled is set to TRUE. The function to be performed is specified by the S.TC.Command. When S.TC.Command is "transmit Char" and the Transmitter is ready to accept a new character, then S.TC.Byte-Request is set to TRUE. Within one character time the next character must be loaded into S.TC.Char and S.TC.Byte-Request must be set to FALSE; otherwise, an underrun condition will occur. Underrun is an error only in bit-synchronous mode.

The number of bits transmitted per character is determined by S.TC.Char-Size (with the exception of some fields in the bit-synchronous mode). These bits must be right-justified within the character.

Transmitter-Asynchronous Mode: If S.TC.Command is set to "Transmit Char", then each loaded character is converted to the following bit sequence: (i) Start bit; (ii) The bit-serial character (least significant bit first; and (iii) A parity bit (if S.Class.Vertical-Parity is "even" or "odd") and the number of stop bits is specified by S.Class.Stop-Bits.

If the next character has already been loaded upon completion of the current character, the next character is begun immediately; otherwise, the line is held in a "Mark" condition.

If S.TC.Command is set to "Transmit Break", the Transmitter will hold the line in a "Space" condition until either (a) S.TC.Command is set to "Transmit Char" or (b) the signal S.TC. Enabled is set to FALSE. Transmitter-Synchronous Mode: When S.T.C.Enabled is set to TRUE, the Transmitter enters "non-transparent" mode and will transmit continuous S.Class.SYN characters until a character is loaded. At least four S.Class.SYN characters will be transmitted.

Each loaded character is converted into the following bit sequence: (i) the bit-serial character (least significant bit first) followed by (ii) a parity bit, in non-transparent mode, when S.Class.Vertical-Parity is "even" or "odd". If S.TC.Force-DLE is TRUE and S.TC.Transparent is TRUE, the Transmitter will: (a) enter transparent mode if it is currently in non-transparent mode, (b) reset S.TC.Force-DLE, (c) transmit the S.Class.-DLE character, and (d) transmit the loaded character.

If an underrun occurs in non-transparent mode, the Transmitter will transmit the S.Class.SYN character. If an underrun occurs in transparent mode, the Transmitter will transmit the S.Class.DLE character followed by the S.Class.SYN character.

Transmitter-Bit-Synchronous Mode: If S.TC.Command is set to "Transmit $ Flags", the Transmitter will transmit continuous flags until either (a) S.TC.Command is set to some other value or (b) the Transmitter is disabled. The Transmitter will set S.TC. Command-ACK to TRUE after the first flag has been transmitted.

If S.TC.Command is set to "Transmit $ Ones" the Transmitter will transmit continuous one bits until either (a) S.TC.Command is set to some other value or (b) the Transmitter is disabled. The Transmitter will set S.TC.Command-ACK to TRUE after the first eight "1" bits have been transmitted.

If S.TC.Command is set to "Transmit $ Char", the "beginning" of a frame is assumed. The Transmitter will transmit loaded characters until either S.TC.Command is set to "Transmit End-Frame" or an underrun occurs. The address and the control fields are transmitted eight-bits per character. I-field characters are transmitted based upon S.TC.Char-Size. If S.TC.Command is set to "Transmit $ End-Frame", the Transmitter will (a) if S.TC.Residue is non-Zero and the frame has an I-field, transmit the specified number of residue bits from the last I-field character loaded, (b) transmit the FCS, (c) transmit one flag, (d) set S.TC.Command-ACK to TRUE and (e) transmit continuous flags until either S.TC.Command is set to some other value or the Transmitter is disabled. If an underrun occurs, the Transmitter will transmit an Abort followed by continuous flags and set S.TC.Error.Underrun to TRUE. Within a frame, a zero bit is inserted after five consecutive "ones".

Diagnostic Operation: When S.TC. Diagnose is set to TRUE, the transceiver (FIG. 1C) enters into an internal diagnostic mode in order to check out the operations of the transceiver.

A line adapter selection means is designed to be used as part of a line support processor (also often called a frame recognition-data link processor) and as part of a data comm I/O subsystem.

FIGS. 1 and 2 show such a data comm I/O subsystem wherein a state machine processor card 600 works in coordination with various types of line adapters. A single line adapter card 700 may be used as well as Quad line adapters such as that shown in cards 400 and 500. These Quad line adapters constitute units of four addressable line adapters, and each line adapter can handle a single data communications line terminal through an electrical interface.

Figure 9:
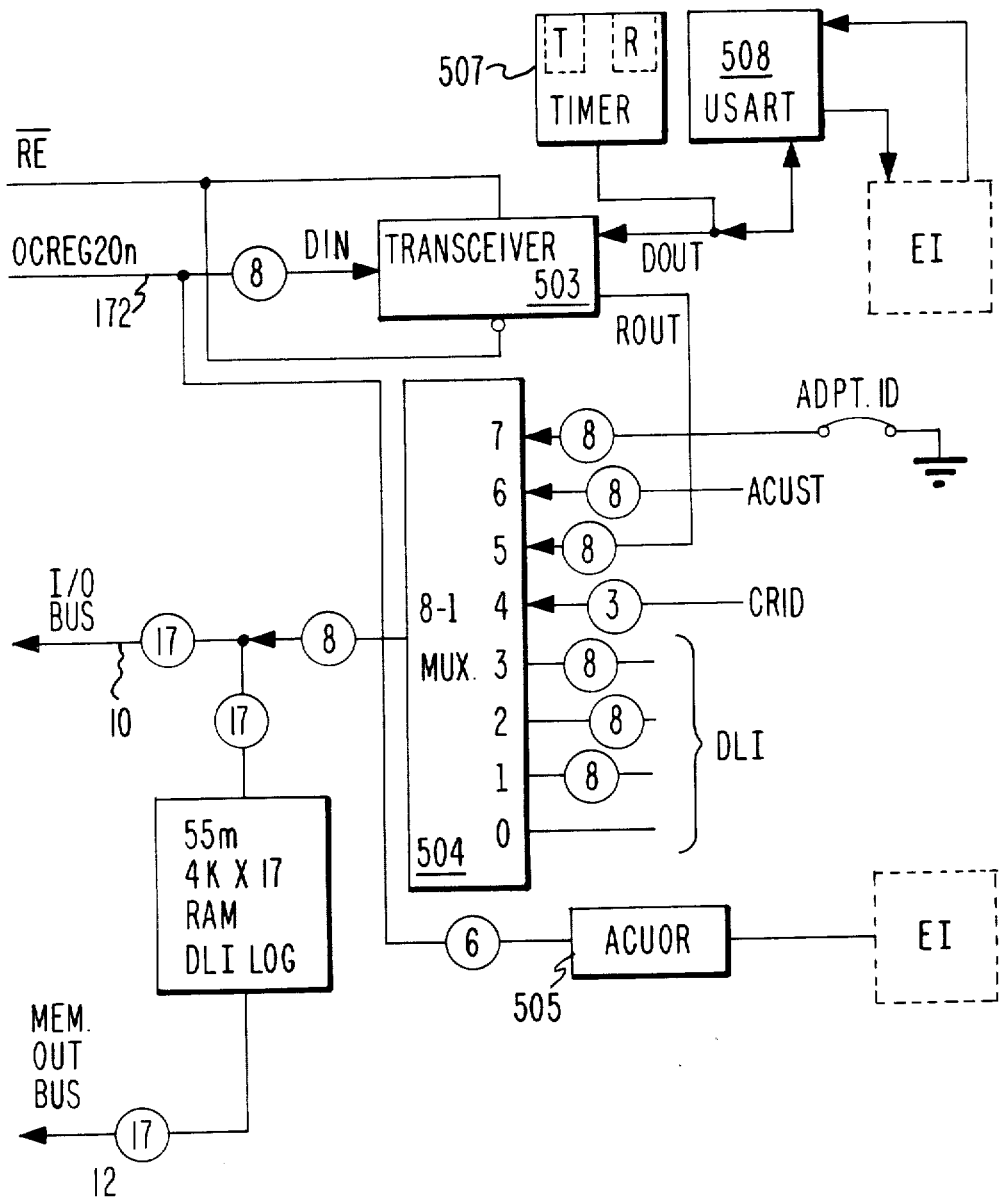
FIG. 9 is a block diagram of the data bus structure of a single Line Adapter which is part of the DLI/LA card.

FIG. 9 shows a block diagram of a "Single" byte oriented line adapter system. A remote data set or data terminal may be connected to input/output circuit means which includes timer 507 and USART 508. This input output circuit connects to a transceiver bus-controller 503 which can route the data to a multiplexor 504 for conveyance along I/O bus 10 to the start machine processor 600 or into a RAM buffer $550_m$. Data in the state machine processor can be routed from the state machine's output control register (38, FIG. 6) along bus $17_2$ into the transceiver bus controller 503 for transmission to the input-output circuit means. The multiplexor 504 receives control signals from the data link interface unit 700 of FIG. 1 in addition to other control signals which identify units within the line adapter system. Also provided is an automatic calling unit output register 505 which can receive signals useful for dialing remote terminals on telephone lines.

Figure 5:
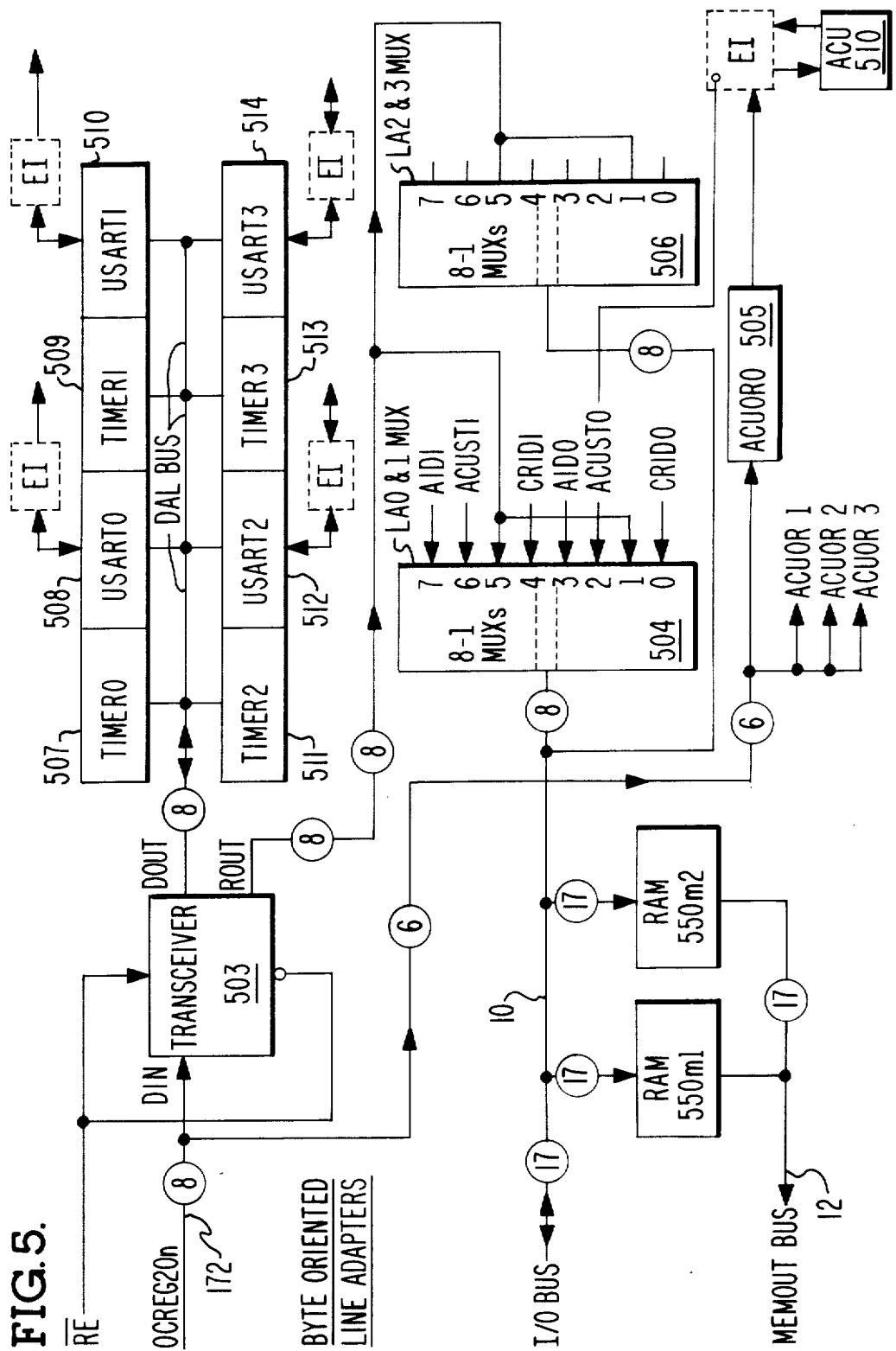
FIG. 5 is a block diagram of a Byte-Oriented Line Adapter in the Quad configuration of four Line Adapters on one slide-in card.

FIG. 5 is a block diagram of a "Quad" Line Adapter used for byte oriented protocol operations. The input output circuit means which connect to remote terminals is composed of four basic units such as 507, 508 (timer 0 and USART 0). Likeise, input output service to a remote terminal is provided by timer 509 and USART 1 designated 510. Likewise, units 511, 512 constitute an operating unit for another remote terminal as do units 513 and 514 for yet another remote terminal.

As discussed under FIG. 9, the Line Adapter uses a transceiver bus controller 503 and a set of multiplexors 504. It should be noted that the multiplexors such as 504 and 506 are in essence dual operating multiplexor sets in that they receive control signals from two different input-output units.

Corresponding to the Automatic Calling Unit Output Register of FIG. 9, the Quad Line Adapter of FIG. 5 uses four such ACU output registers. Also in the Quad Line Adapter there is provided an extra set of RAM buffer memories designated as $550_{m1}$ and $550_{m2}$.

FIG. 6 is a block diagram of the State Machine Microprocessor which is used to control the single line adapter or multiple configurations of line adapters. The State Machine Processor (sometimes designated as UIO State Machine) resides on a circuit board of chips which can be inserted as a slide-in card into the base module (FIG. 2) where it connects to the backplane. The State Machine connects to the application dependent logic through the frontplane connectors as seen in FIG. 2.

A detailed description of the elements and use of the UIO State Machine has been the subject of several prior patents which are included herein by reference. These patents are:

U.S. Pat. No. 4,293,909 entitled "Digital System For Data Transfer Using Universal Input-Output Microprocessor", inventors Robert D. Catiller and Brian K. Forbes.

U.S. Pat. No. 4,291,372 entitled "Microprocessor System with Specialized Instruction Format", inventors Brian K. Forbes and Robert D. Catiller.

U.S. Pat. No. 4,292,667 entitled "Microprocessor System Facilitating Repetition of Instructions", inventors Robert D. Catiller and Brian K. Forbes.

The use of a host computer working in conjunction with an I/O subsystem which uses peculiar commands called I/O descriptors, data link descriptors, and result descriptors is shown in U.S. Pat. No. 4,189,769, Feb. 19, 1980, to Darwen J. Cook and Donal A. Millers, II, and entitled "Input-Output Subsystem for Digital Data Processing System" and this patent is also included herein by reference.

Figure 10:
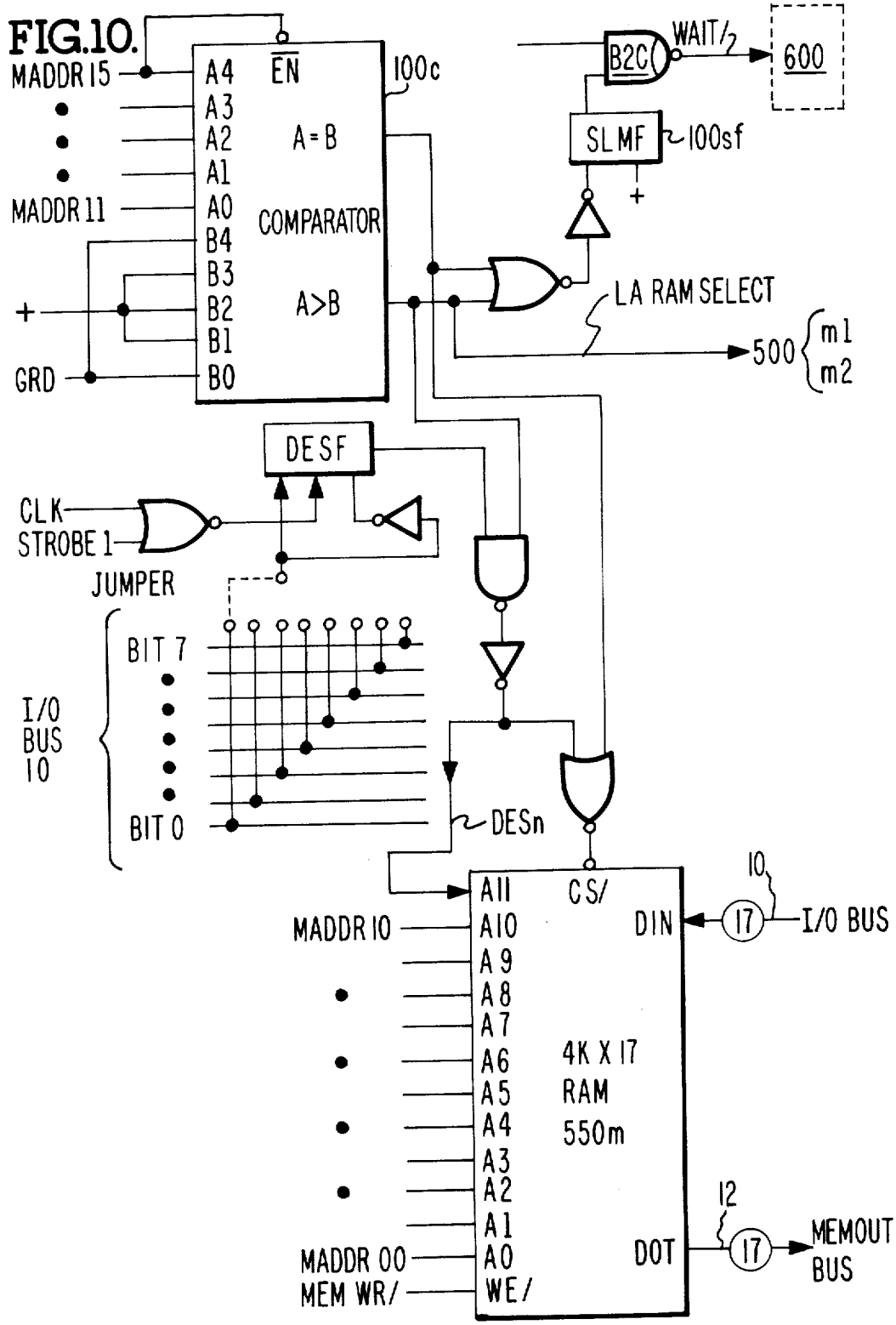
FIG. 10 is a block diagram of the memory and memory logic portion of the DLI/LA card.

FIG. 10 is a diagram of certain logic on the DLI/LA card 700 which is used to select or "Designate" the RAM buffer memory of the single Line Adapter card or a selected memory of a specific one of the four line adapter memories on the Quad line adapter card. Shown as RAM storage means $550_m$ in FIG. 10 is the particular memory used for the single Line Adapter. However, in the "multiple" Line Adapter situation, each Line Adapter has a similar selection system for selecting the particular memory associated with that Line Adapter.

In FIG. 10, address lines from the State Machine Processor 600 (MADDRnn) connect to a comparator $100_c$ and also to the RAM buffer $550_m$. A chip select signal CS/ is activated to the buffer memory $550_m$ by means of logic signals from the Comparator $100_c$ and the Designate Flip-Flop (DESF). A unique jumper bit provides input to the Designate Flip-flop from the I/O bus 10 in order to particularly identify any given selected buffer memory in the system. The particular bit line of the I/O bus 10, which is to be chosen, is set by the State Machine Microprocessor 600, FIG. 6.

"BYTE ORIENTED" LINE ADAPTER

A functional section of the Line Support Processor (also called the Frame Recognition-Data Link Processor and/or Line Support Processor-DLP) is the Line Adapter called the "Byte Oriented Line Adapter". This is sometimes also called a "Character Oriented" Line Adapter.

The data comm Line Adapter is basically a device which interfaces on one end to a data communication line (FIG. 2) "electrical interface", and on the other end interfaces to a processor which has been designated as the UIO State Machine 600 (UIOSM). The primary function of the Line Adapter is to serialize "bit" information to/from "byte" information, to provide timing, to generate service requests, to supply a RAM memory, to provide automatic calling interfacing and to provide connection to level changers which will match the data communication lines. The Byte-Oriented Line Adapter is also built in two basic configurations designated as (i) Quad Line Adapter and (ii) the Single Line Adapter. The single Line Adapter is part of the Line Support Processor and the Single Line Adapter shares the same board with the Data Link Interface (DLI) circuitry 700. The Line Adapter is required regardless of the quantity of lines controlled by the Line Support Processor. The Quad Line Adapter contains essentially four (4) Line Adapters on one board. These boards are typical 10 inch by 13 inch boards which plug into the backplane of the Base Connection Module, FIG. 2.

As seen in FIG. 2 each of the Line Adapter cards 400, 500 connect both to the State Machine Processor 600 and to the DLI/LA 700 (Data Link Interface-Single Line Adapter).

As seen in FIGS. 5 and 9, connection to the data communications line is through an electrical interface (EI) which connects to the Line Adapter. There are various types of electrical interface boards which exist and which may be mounted in different combinations on the Quad Line Adapters. Thus, depending on the electrical characteristics of the data comm line, the only change required is that of the electrical interface, while the Line Adapter remains as is.

From one to eight Line Adapters may variously be addressed by the State Machine Processor 600; thus, each Line Adapter is jumpered uniquely in order to identify its address. The Line Adapter must be "designated" for the State Machine Processor to communicate with it. Several addressable components are contained on a Line Adapter which the State Machine Processor may communicate with, in the form of Write/Read data or "Status" or "Control" signals.

The addressable components of the Byte Oriented Line Adapter are:
(i) USART (508, 510, 512, 514, FIG. 5)
(ii) Timer (507, 509, 511, 513, FIG. 5)
(iii) Auto Call Output Registers (ACUOR$_{0,1,2,3}$, FIG. 5)
(iv) Auto Call Status for each ACU
(v) Component Requestors (units in USART's and/or in Timers)
(vi) Memory (RAM) in each card unit.

The USART (Universal Synchronous/Asynchronous Receiver/Transmitter) accepts data "bytes" from the State Machine Processor 600 and converts them into serial "bits" for transmission; it also receives serial bit data and converts this to parallel data bytes. The USART device is initialized by "writing" into its two internal control registers which specify the manner in which it operates. The USART internal control registers are discussed hereinafter.

A typical USART preferred for this purpose is manufactured by Western Digital Corporation, 3128 Redhill Avenue, Newport Beach, Calif. 92663, and is designated as UC1671 and described in a Technical Manual dated August 1978 as UC1671 Asynchronous/Synchronous Receiver/Transmitter.

Various bits of the internal control registers of this USART unit specify such things as: synchronous/asynchronous mode; bits per character; parity; transparent mode; Echo mode. The Timer used on the Byte Oriented Line Adapter serves two basic functions: (i) as program timers and (ii) as baud rate generators for asynchronous operation. Three independent internal timers are contained in each chip, two of which are used by the software for timing purposes relative to the line operations for "transmit" and for "receive" operation. The third timer is used to generate a square wave clock which is used by the USART for asynchronous operation. Each timer is initialized independently, which indicates the "mode" in which it is to operate. The two program timers are capable of activating a Flag signal to the State Machine Processor 600 when a pre-determined timing value has been reached.

The Auto Call Output Register (ACUOR 505) is a register which is loaded by the State Machine Processor with "dial digit" and control information. The output of this register drives level-changer chips which convert the logic signals to EIA RS-232 voltages. These signals drive an automatic calling unit (ACU) such as a Bell 801, which provides dial-out capabilities.

Auto Call Status (ACUST 0,1,2,3 of FIG. 5) is a means of providing the condition or state of input lines from the automatic calling unit (ACU) to the State Machine Processor 600. Lines from the ACU are received by level-changer chips which convert the EIA voltages to TTL logic levels. These logic levels may be read by the State Machine Processor to determine the present status.

The Component Requestors from a Line Adapter are as follows: (i) USART; (ii) Program Timer 1; (iii) Program Timer 2.

These three components are capable of generating "service requests" independently of each other at unique times relative to its initialization. The "service requests" activate a flag signal to the State Machine Processor which indicates that Line Adapters require servicing. After the State Machine determines which Line Adapters are requesting service, it must then determine which "component" on a particular Line Adapter is requesting service.

Memory on the Line Adapter consists of 2,048×17-bit words of RAM for each line. Therefore, each Quad Line Adapter card actually contains 8,192×17-bit words of RAM. The Single Line Adapter card (FIGS. 9, 10) contains 4,096 words of RAM 550$_m$, one half for the data comm line and the remainder for DLI 700, FIG. 2. The RAM is used by the software for transmit/receive message buffering, for tables and for statements associated with the line operation.

BYTE ORIENTED LINE ADAPTER—OPERATION

Designate: When the State Machine Processor 600 executes code relative to an addressable component on a Line Adapter (LA), the LA must be "designated". Each Line Adapter contains a Flip-flop, whose input is jumpered to a specific bit of the I/O bus, FIG. 10. In order to "designate" a Line Adapter, the State Machine Processor must execute a PUT OP with Strobe No. 1 and the corresponding bit of the I/O bus must be equal to 1. Executing the same OP with the I/O bus bit equal to 0 will reset the Designate Flip-Flop shown typically as "DESF" on FIG. 5.

Flag Operation: The various components of a Line Adapter are capable of producing "service requests". These "service requests" are basically ORed together in order to drive a common FLAG line for all Line Adapters. A signal line, FLAG 2/, when being low active, notifies the State Machine Processor that some Line Adapters are requesting service. The State Machine Processor can determine which Line Adapters are requesting service by executing a GET OP with the variant field V-FLD (4:5) equal to 00001. The Line Adapter does not need to be "designated" for execution of this OP.

"Register address" (REGADRn) signals in the Line Adapters are the five V-FLD signals from the State Machine Processor.

Figure 11:
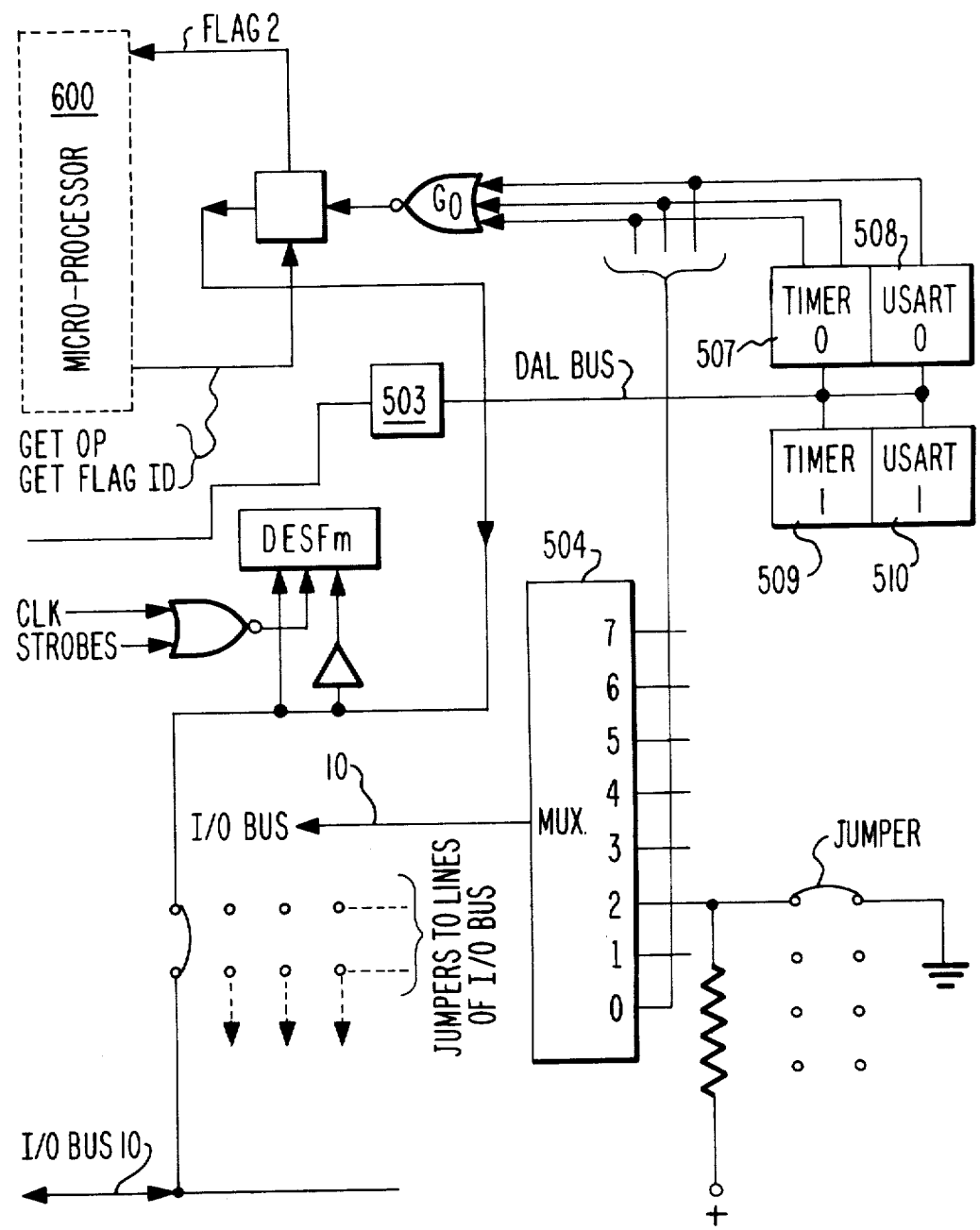
FIG. 11 is a schematic drawing of the circuitry for identifying sub-components on a selected line adapter.

Flag operation, with reference to FIG. 11, is accomplished by the FLAG 2/ line which when low active notifies the State Machine Processor that a Line Adapter is requesting service. For example in FIG. 11, if Line Adapter 0 requests service, then NOR Gate G$_0$ is activated to provide a signal (low) on the FLAG 2/ line.

Upon receiving this signal the State Machine Processor will initiate a GET OP on the GET FLAG ID line. This will send the output signal of Gate G$_0$ to a particular line of I/O bus (which is dedicated to a particular one of the Line Adapters) which, when read by the State Machine 600 will identify the particular Line Adapter involved, in this case, the Line Adapter 0.

Similarly each Line Adapter as 1, 2, 3, etc. will have a Gate $G_1$, $G_2$ or $G_3$ to activate the FLAG 2/ line and cause the State Machine to "read" the particular "jumper" connection to the line on the I/O bus associated with that Line Adapter.

Data Bus Structures: With the exception of the RAM (FIG. 10), memory $550_{m1, m2}$, all data sent to addressable components on the Line Adapter originate from the Second Output Control Register 38 (FIG. 6) in the State Machine Processor. With the exception of RAM, all data "read" by the State Machine Processor from addressable components on the Line Adapter will go to the State Machine Processor via the I/O bus 10.

With reference to FIG. 9 (DLI/LA data bus structure), the Single Line Adapter data bus structure is shown.

As seen in FIG. 9, the Second Output Control Register 38 (FIG. 6) lines $17_2$ (OCREG 20n) connect directly to the inputs of the Auto Call Unit Output Register 505 (ACUOR); and they also connect directly to the Transceiver Bus Controller chip 503 which provides bidirectional bus drivers.

The Auto Call Unit Output Register 505 (FIG. 9) is a six bit "D" type flip-flop register (DR6n). When the clock input is enabled, data from the Second Output Register 38 (FIG. 6) will be strobed into ACUOR 505.

Data sent to both the Timer 507 and to the USART 508, FIG. 9, originate from the Second Output Register 38 in the State Machine Processor (FIG. 6) and is sent through the Transceiver bus controller 503; then is sent to the addressed component. The data lines for the Timer component are HI active and for the USART component they are LO active. Being as both components share the same data bus, data to one of the components must be inverted. The Timer 507 is used to receive the "inverted" data, that is, $1=0$ and $0=1$, while the USART 508 receives the conventional format. Thus, a "one" bit from the Second Output Register 38 in the State Machine Processor (FIG. 6) will appear as a "one" bit to the USART (active low) and as a "zero" bit to the Timer. The Transceiver bus controller 502, although being a three-state device, is not used in its third or high impedance state. It is used for driving either DIN (data in) to DOUT (data out) or DOUT to ROUT depending on the state of the RE signal which originates from bit 4 of the First Output Control Register 37 in the State Machine Processor 600, FIG. 6. When bit 4 of Register 37 is ON, the signal RE is positive and "enables" the DIN to DOUT direction through the Transceiver bus controller 503.

Reading of information (except RAM read) from a Line Adapter is performed by decoded GET OPs, and the read information is available on the least significant 8 bits of the I/O bus 10. The 8-1 multiplexor 504 is the source of the read information.

On the "Single" Line Adapter (FIG. 9) four of the eight inputs to MUX 504 are used by the Line Adapter and the remainder are used by the Data Link Interface (DLI). The multiplexors (MUX's) are chip selected (low level) during a GET OP when the V-FLD (3:2) is equal to "11" and either V-FLD (4:1) equal 0 (DLI GET) or the Designate Flip-Flop (DESF) is ON (LA GET).

On the "Quad" Line Adapter cards (FIG. 5) there are 16 multiplexors, each having an eight-one ratio. There are 8 multiplexors for each "pair" of Line Adapters.

As seen in FIG. 9, the eight input lines to MUX 504 are divided in half such that four lines connect to the DLI (Data Link Interface), and four lines connect to the Line Adapter. Similar in FIG. 5, in the Quad Line Adapter, the eight input lines of each group of eight multiplexors is divided in half, similar to the Single Line Adapter, thereby making four groups. Any group of four input lines is selected by its "Designate Flip-flop" (DESF, FIG. 10) being ON. The selection of any one of four lines of any such group is performed by the two least significant bits of the V-FLD of a GET OP.

Data to be "written into" RAM memory in a Line Adapter (FIGS. 5, 10) is sent via the I/O bus in 16 bits plus parity format. The data "read from" RAM memory in a Line Adapter is placed on the MEMOUT bus 12 with 16 bits plus parity.

Component Addressing: As seen in FIG. 9, the outputs of components to be "read" are routed to the inputs of the 8-1 multiplexor 504 which then drive the I/O bus 10. There are five components on a Line Adapter which may be "read" by the State Machine Processor, these are:

Component Requestor ID (CRID)
USART (508)
Timer (507)
Automatic Calling Unit Status (ACUST)
Adapter Type ID (ADPT.ID)

Although these five components on a Line Adapter may be read, the USART 508 and the Timer 507 share the same input line (ROUT) to the multiplexors. Selection of one of the four inputs in either group (of inputs to the 8-1 multiplexors) is performed by the two least significant bits of the V-FLD of the GET OP. V-FLD (3:4) equal 11XX and selection of one of the four inputs is determined as shown in Table Y-1.

TABLE Y-1

| V1(x) | V0(x) | Component Addressed |
|---|---|---|
| 0 | 0 | Component Requestor ID |
| 0 | 1 | USART/Timer |
| 1 | 0 | ACU Status |
| 1 | 1 | Adapter Type - ID (Identification) |

In FIG. 9 the Single Line Adapter multiplexor 504 allows three components on a Line Adapter to be written into (not including RAM). These are: Automatic Calling Unit Output Register 505 (ACUOR), the USART 508 and the Timer 507. The addressing of these three components occurs in two distinct fashions: decode of the V-FLD of PUT OPs and the decode of bits from the First Output Control Register 37 in the State Machine Processor (FIG. 6).

Referring to FIG. 9 and the multiplexor 504, there will be seen a series of input bus connections at inputs marked 0, 1, 2, 3, 4, 5, 6, 7. The use of these input busses will be discussed hereinbelow and it should be understood that multiplexor 504 is a representation of a total of eight separate multiplexors, each of which provides its output to the I/O bus 10.

(a) the input 7 of 504, FIG. 9, involves 8 lines which connect to 8 jumpers (of which only 1 representative jumper is shown). When a jumper is inserted, it grounds the normally positive voltage to change the level from a "true" to a "false" signal. Thus, this signal is used as an "Adapter ID" signal which will identify the adapter as: (i) bit oriented; (ii) byte oriented; (iii) connected to a private line or to a switched line; (iv) connected to an ACU (Automatic Calling Unit).

(b) the input pin 6 designated ACUST refers to "ACU Status". It informs the MUX 504 of various states such as: PND (present next digit); Power on-off indication; ACR (abandon call and retry); DSS (data set status).

(c) the input pin 5 presents a data or a control signal (i) from the timer or the USART of a byte-oriented line adapter or (ii) from the timer and the synchronous controller of a bit-oriented line adapter.

(d) the input pin 4 is designated CRID (component requestor identification). The signal input here is involved when a component requests attention (Interrupt) from the State Machine Processor 600 and the signal identifies the requesting component as (i) transmitter time or (ii) receiver timer or (iii) USART unit (byte-oriented); (iv) synchronous controller (bit-oriented).

(e) the input pin 3 comes from the DLI card 700 (FIGS. 7, 8) and it signals the status of the data-link processor (peripheral controller) to the State Machine Processor 600.

(f) the input 2 receives signals from the DLI Counter $100_{ct}$ (FIG. 7) for transmittal to Processor 600.

(g) the input 1 represents signals from 8 ID jumpers which are used to identify the Data Link Processor (peripheral-controller) as distinct from other DLP's.

(h) the input 0 is not used.

The ACUOR 505 is addressed when a one-of-eight decoder chip decodes the PUT OP V-FLD (4:5) equal 01111 and the Strobe No. 2 is sent from the State Machine Processor. This decoding is performed only on the Single Line Adapter card and is sent to other Line Adapter cards via the frontplane connector. This decoded signal is received by a three input NOR gate (not shown) in each Line Adapter (whose other inputs are Clock and Designate FF). The output of this gate drives the clock input of the six bit ACU output register.

Data from the Second Output Control Register 38 (FIG. 6) will then be strobed into the ACUOR 505 (FIG. 9).

Chip Selecting: Addressing a USART or Timer on a designated Line Adapter is the same as "chip selecting" the component. This is accomplished with bits 0 and 1 of the First Output Control Register 37 in the State Machine Processor along with the Designate Flip-Flop in a Line Adapter.

Each Line Adapter will "AND" its Designate FF with bits 0 and 1 in order to provide a UCS (USART Chip Select) or a TCS (Timer Chip Select) for its USART or Timer.

The use of bits 0 and 1 in the First Output Control Register 37 is as follows:

TABLE Y-2

| Register Bit and Value | Signal Designation |
|---|---|
| Bit 0 = 1 | USARTCS = Chip Select-UCS |
| Bit 1 = 1 | TMRCS = Timer Chip Select-TCS |

The remaining bits of Register 37 are used for control signals, primarily for the USART and Timer.

Random Access Memory ($550_m$, FIG. 5): Each data comm line has 2,048 words of RAM available for its use. A word is equal to 16 data bits plus one parity bit. In FIG. 5 the RAM chip $550_m$ is a 4,096×1 bit static RAM with a Read Access time of 180 nanoseconds and is arranged with 17 chips making 4,096 words. On the DLI/LA card, 2,048 words are for the "Single" Line Adapter and 2,048 words are for the Data Link Interface. The "Quad" Line Adapter card (FIG. 5) provides 34 memory chips or 8,192 words of which 2,048 words are available for each line.

The data comm Line Adapter memory (for any line) is "pointed at" by the memory address lines, MADDR (15:5) equal 01110. This can be seen in FIG. 10 which shows the Data Link Interface/Line Adapter RAM. A five bit Comparator $100_c$ on the DLI/LA card compares (for an "equal" condition) for (i) DLI memory selection; or for a "greater than" condition (MADDRnn 01110) provides for (ii) Line Adapter RAM selection. The signal "LARAMSEL" (Line Adapter RAM Select) will go to all Line Adapter cards via the frontplane cable to select the "designated" Line Adapter RAM memory. If memory address lines MADDR (15:5) equals 0001x (DLI or LA Select) then a slow memory flip-flop (SLMF) $100_{sf}$ will be set equal to 1. The Flip-Flop $100_{sf}$ output drives an open collector NAND gate whose output connects to the WAIT/ frontplane signal line to the State Machine Processor. This signal (WAIT/), when low, will force the State Machine Processor to "wait" until the signal goes "high". Using a RAM chip whose Read Access time is 180 nanoseconds requires the State Machine Processor to wait for one clock time, thereby when the DLI memory ($550_m$, FIG. 10) or any Line Adapter memory is selected, the SLMF (slow memory flip-flop) will be "on" for one clock and then toggle off.

Selection of the RAM memory $550_m$ on the DLI/LA card is done via MADDR (15:5) equal to 01110 or else if MADDR (15:5) equal 01111 and the Designate Flip-Flop being ON, then a particular RAM is selected. This logic controls the chip-select input on the RAM chips. The selection of RAM for DLI or for Line Adapter memory is handled by controlling the "A-11" (FIG. 10) address pin, as for example on the RAM $550_m$ chip. FIG. 10 illustrates the typical setup for each Line Adapter RAM in the system having its own A-11 input from its own Designate Flip-Flop, DESF. If MADDR (15:5) is equal to 01111 and the Line Adapter Designate Flip-Flop (DESF) is ON, the RAM is chip selected and the A-11 address input is TRUE.

The "Quad" Line Adapter card (FIG. 5) contains two groups of memory chips ($550_{m1}$, $550_{m2}$) wherein Data-Comm (D.C.) lines 0 and 1 on the card share the same group of RAM chips and Data-Comm lines 2 and 3 share the other group of RAM chips. The signal LARAMSEL (Line Adapter RAM Select, FIG. 10) goes to all Line Adapters and is then essentially ANDed with appropriate Designate conditions to allow the desired RAM group to be chip selected. A "division" of RAM for the first or second data-comm line on a Quad Line Adapter is handled by controlling the "A-11" address pin (FIG. 10) on the RAM chip (signal DESn where n=1) and for the third and fourth line, the "A-11" pin on the second group of RAM chips is controlled by DESn (FIG. 10) where n=3.

Clear: There are two methods of clearing used to clear the Line Adapters; these are "Power Up" Clear and "Designate" Clear.

The Power Up Clear is a signal which occurs during the power-up sequence for the cabinet housing the Line Adapters. The signal comes from the backplane of the Base Module cabinet and is active Low.

The Designate Clear is a function controlled by the State Machine Processor, and only the Line Adapters which are designated are the ones that get cleared. The Clear signal originates from bit 7 of the First Output Control Register 37 of the State Machine Processor (FIG. 6). The "Power-up" Clear operates to clear three components on the Line Adapter. These are: the Designate Flip-Flop the Auto Call Output Register; and the USART.

The "Designate" Clear signal clears two comonents on the Line Adapter. These are: Auto Call Unit Output Register (ACUOR); and the USART.

USART Organization and Operation: The USART is a MOS/LSI device housed in a 40-pin Dual-in-line package and is TTL compatible on all inputs and outputs. The USART performs the functions of interfacing a "serial" data communications channel to a parallel digital system and is capable of full duplex communications with synchronous or asynchronous systems.

One preferred embodiment of the USART is that manufactured by Western Digital Corporation, 3128 Redhill Avenue, Newport Beach, Calf. 92663 and is designated as Model UC1671 Asynchronous/Synchronous Receiver/Transmitter and described in their Technical Data Publication of August 1978 which includes a block diagram showing the various registers, controls and components which are briefly described herein below.

(i) Receiver Register (RR): this is an eight bit shift register which inputs the received data at a clock rate determined by an internal control register. The incoming data is assembled to the selected character in length and then transferred to the Receiver Holding Register with logic zeroes filling out any unused high-order bit positions. At this time the INTR (Interrupt) output is made active for informing the State Machine (600, FIG. 6) that the Receiver Holding Register contains valid data.

(ii) Receiver Holding Register (RHR): this is an 8-bit parallel buffer register which presents assembled receiver characters to the DAL (Data Access Line) bus lines (FIG. 5) when requested through a Read operation.

(iii) Comparator: the 8-bit comparator is used in the Synchronous Mode to compare the assembled contents of the Receiver Register and the SYN register or the DLE register. A "match" between the registers sets up the stripping of the received character (when programmed) by preventing the data from being loaded into the Receiver Holding Register. A bit in an internal Status Register is set when stripping is performed. The comparator output also enables character synchronization of the Receiver on two successive matches with the SYN register.

(iv) SYN Register: this is an 8-bit register which is loaded from the DAL (Data Access Line) lines (FIG. 5) by a Write operation and it holds the synchronization code used to establish receiver character synchronization. It serves as a fill character when no new data is available in the Transmitter Holding Register during transmission. This register cannot be read onto the DAL lines. It must be loaded with logic zeroes in all unused high-order bits.

(v) DLE Register: this is an eight bit register which is loaded from the DAL lines by a Write operation and holds the "DLE" (Delimiter) character used in the Transparent Mode of operation, in which an idle transmit period is filled with the combination DLE/SYN pair of characters rather than a single SYN character. In addition, the USART may be programmed to force a single DLE character prior to any data character transmission while in the "transmitter transparent mode".

(vi) Transmitter Holding Register (THR): this is an eight-bit parallel buffer register which holds parallel transmitted data transferred from the DAL lines by a Write operation. This data is transferred to the Transmitter Register (TR) when the transmitter section is enabled and the Transmitter Register is ready to send new data. During this transfer, the signal interrupt (INTR) is made active for informing the Line Support Processor that the Transmitter Holding Register is empty.

(vii) Transmitter Register: this is an eight-bit shift register which is loaded from the THR (transmitter Holding Register), the SYN register, or the DLE register. The purpose of this register is to serialize data and present it to the transmitted Data Output lines.

(viii) Control Register: there are two eight-bit control registers (CR 1, CR 2) in the USART which hold device programming signals such as: mode selection, clock selection, interface signal control, and data format. Each of the control registers can be loaded from the data access lines (DAL) by a Write operation, or else read into the DAL lines by a Read operation. By designation "CR 16" would represent bit 6 of Control Register 1; and "CR 23" would represent bit 3 of Control Register 2.

Operation of USART of Byte Oriented Line Adapter:

ASYNCHRONOUS MODE: The framing of asynchronous characters is provided by a Start Bit (logic low) at the beginning of a character, and by one or more Stop Bits (logic high) at the "end" of a character. Reception of a character is initiated on recognition of the first Start Bit by a positive transition of the receiver clock, right after a proceeding Stop Bit. The Start and Stop bits are "stripped off" while assembling the serial bit input into a parallel character.

The character assembly is completed by the reception of the Stop Bit after the reception of the last character bit. If this bit is a logic "high", the character is determined to have "correct" framing and the USART is prepared to receive the next character. If the Stop Bit is logic "low", the Framing Error Status flag is set and the Receiver assumes this bit to be the Start Bit of the next character. Character assembly continues from this point if the input is still a logic "low" when sampled at the theoretical center of the assumed Start Bit. As long as the Receiver input is "spacing" (i.e., receiving a "Space" rather than a Mark), then all zero characters are assembled, and error flags and data received interrupts are generated so that line breaks can be determined. After a character of all zeroes is assembled along with a zero in the Stop Bit location, the first-received logic "high" is determined as a Stop Bit and this resets the receiver circuit to a "Ready" state for assembly of the next character.

In the Asynchronous Mode the character transmission occurs when information contained in the THR (Transmitter Holding Register) is transferred to the TR (Transmitter Register). Transmission is initiated by the insertion of a Start Bit, followed by the serial output of the character (least significant bit first) with parity, if enabled, following the most significant bit; then there is the insertion of the 1-, 1.5-, or 2-bit length Stop condition. If the THR (Transmitter Holding Register) is full, the next character transmission starts after the transmission of the Stop Bit of the present character in the TR (transmitter register). Otherwise, the "Mark" (logic high) condition is continually transmitted until the THR (Transmitter Holding Register) is loaded.

SYNCHRONOUS MODE: The synchronization of messages is carried out by a special Synchronization Character Code (SYN) transmitted at the beginning of a block of characters. The Receiver, when enabled, searches for two contiguous characters matching the bit pattern contained in the SYN register. During the time that the Receiver is searching, data is not transferred to the THR (Transmitter Holding Register) and status bits are not updated; and the Receiver interrupt is not activated. After the detection of the first SYN character, the Receiver assembles subsequent bits into characters whose length is determined by the contents of the USART internal control register. If, after the first SYN character detection, a second SYN character is present, the Receiver enters the Synchronization Mode until the Receiver Enable Bit is turned "off". If a second successive SYN character is not found, then the Receiver reverts back to the Search Mode.

In the Synchronous Mode, a continuous stream of characters are transmitted once the Transmitter is enabled. If the THR (Transmitter Holding Register) is not loaded at the time the Transmitter Register has completed the transmission of a character, this "idle" time will be filled by a transmission of a character contained in the SYN register in the Non-Transparent Mode, or filled by the characters contained in the DLE and the SYN registers respectively (while in the Transparent Mode of operation). RECEIVER OPERATION: The Receiver data input is clocked into the Receiver Register by a 1× Receiver clock from a modem Data Set, or by a local 32× bit rate clock (asynchronous) selected from one of four input pins. When using the 1× Receiver Clock, the Receiver data is sampled on the positive transition of the clock in the Synchronous Modes. When using A 32× clock in the Asynchronous Mode, the Receive Sampling Clock is phased to the "Mark-To-Space" transition of the Received Data Start Bit and defines (through clock counts) the center of each received Data Bit at the positive transition 16 clock periods later. When the complete character has been shifted into the Receiver Register, it is transferred to the RHR (Receiver Holding Register); the unused, higher number bits are filled with zeroes. At this time the "Receiver Status bits" (Framing Error/Sync Detect, Parity Error/DLE Detect, Overrun Error, and Data Received) are updated in the Status Register and the Data Received "interrupt" is activated. Parity Error is set if encountered while the Receiver Parity Check is "enabled" in the internal control register. Overrun Error is set if the Data Received Status Bit is not cleared through a Read Operation by an external device when a new character is ready to be transferred to the RHR (Received Holding Register). This error flag indicates that a character has been lost, that is, new data is lost, and the old data and its status flags are saved.

The characters assembled in the Receiver Register that match the contents of the SYN or the DLE register are not loaded into the RHR (Receiver Holding Register), and the DR (Data Received) interrupt is not generated if bit 3 of USART control register 2 (CR 23=SYN Strip) or Bit 4 of USART control register 1 (CR 14=DLE Strip) are set respectively. The SYN-DET and the DLE-DET status bits are set with the next non-SYN or DLE character. When both control register bits CR 23 and CR 14 are set (Transparent Mode), the DLE-SYN combination is stripped. The SYN comparison occurs only with the character received after the DLE character. If two successive DLE characters are received, only the first DLE character is stripped. No parity check is made in this mode.

TRANSMITTER OPERATIONS: Information is transferred to the THR (Transmitter Holding Register) by a Write operation. Information can be loaded into this THR at any time, even when the Transmitter is not enabled. Transmission of data is initiated only when the Request-to-Send Bit is set to a logic "one" in the USART control register and the Clear-to-Send input is at a logic "low". Information is normally transferred from a THR to the Transmitter Register when the latter has completed transmission of a character. However, information in the DLE register may be transferred prior to the information contained in the THR if the Force-DLE signal condition is enabled (CR 15=Force, DLE and CR 16=TX Transparent and set to a logic "one"). The control bit CR 15 must be "set" prior to loading of a new character in the THR to insure forcing the DLE character prior to transmission of the data character. The Transmitter Register output passes through a Flip-Flop which delays the output by one clock period. When using the 1× clock generated by the modem Data Set, the output data changes state on the negative clock transition and the delay is one bit period.

When the Transmitter is enabled, a Transmitter "interrupt" is generated each time the THR is empty. If the THR is empty when the Transmitter Register is ready for a new character, the Transmitter enters an "idle" state. During this idle time, a logic "high" will be presented to the Transmitted Data Output in the Asynchronous Mode or the contents of the SYN register will be presented in the Synchronous Non-Transparent Mode (CR 16=0). In the Synchronous Transmit Transparent Mode (enabled by bit-6 of USART control register 1=Logic 1), the idle state will be filled by a DLE-SYN character transmission in that order. When entering the Transparent Mode, the DLE-SYN fill-in will not occur until the first forced DLE.

If the Transmitter section is disabled by a reset of the Request-to-Send signal (RTS), any partially transmitted character is completed before the Transmitter section of the USART is disabled. As soon as the CTS signal (Clear-to-Send) goes high, the transmitted data output will go high.

When the Transmit Parity is enabled, the selected Odd or Even parity bit is inserted into the last bit of the character in place of the last bit of the Transmitter Register. This limits transfer of character information to a maximum of 7-bits plus parity or 8-bits without parity. Parity cannot be enabled in the Synchronous Transparency Mode.

INPUT/OUTPUT OPERATION OF USART: All Data, Control and Status words are transferred over the Data Access Lines (DAL0-7) as seen in FIG. 5, DAL.

Additional input lines provide controls for addressing a particular unit and regulating all input and output operations. Other lines provided interrupt capability to indicate to a controller that an input operation is requested by the USART. All input/output terminology is referenced to the Bus Controller-Transceiver 503, FIG. 5, so that a "Read" or Input takes data from the USART and places it on the DAL lines to the Transceiver 503, while a "Write" or an Output places data from the Transceiver 503 onto the DAL lines and into the USART. The following input/output terminology discussed below is referenced to the Bus Controller-Transceiver 503.

(i) READ: A Read operation is initiated by the placement of an 8-bit address from State Machine 600 on the DAL Bus (FIG. 5) by the Bus Controller 503. When the Chip Select signal goes to a logic "low" state, the USART (as 508) compares bits 7–3 of the DAL with its hard-wired ID code (on USART Pins 17, 22, 24, 25, 26) and becomes selected on a "Match" condition. Bits 2–0 of the address are used to select the USART registers to "read from" as follows:

TABLE Y-3

| Bits 2-0 | Selected Register of USART |
|---|---|
| 000 | Control Register 1 |
| 010 | Control Register 2 |
| 100 | Status Register |
| 110 | Receiver Holding Register |

When the Read Enable (RE) input line of the USART is set to a logic "low" condition by the State Machine 600, the USART gates the contents of the addressed register onto the DAL bus. The Read operation terminates, and the devices become unselected, and both the Chip Select and Read Enable return to the logic "high" condition. Reading of the Receiver Holding Register clears the DR (Data Received) status bit. Bit zero must be a logic "low" in Read or in Write operations.

(ii) WRITE: A Write operation is initiated by making a Chip Select input go to the logic "low" state. Bits 2–0 of the address are used to select USART registers which are written into as follows:

TABLE Y-4

| Bits 2-0 | Selected Register of USART |
|---|---|
| 000 | Control Register 1 |
| 010 | Control Register 2 |
| 100 | SYN and DLE Register |
| 110 | Transmitter Holding Register |

When the Write Enable (WE) line is set to a logic "low" condition by the State Machine, the USART gates the data from Transceiver 503 onto the DAL bus and into the addressed register. If data is written into the Transmitter Holding Register (THR), the THRE (THR empty) Status Bit is cleared to a logic zero.

The "100" address loads both the SYN and DLE registers. After writing into the SYN register, the device is conditioned to write into the DLE register if followed by another Write pulse which has the "100" address. Any intervening Read or Write operation with another address resets this condition such that the next "100" will address the SYN register.

(iii) INTERRUPTS: The following conditions will generate interrupts:

1. Data Received (DR)—indicates transfer of a new character to the Receiver Holding Register (RHR) while the Receiver is enabled.
2. Transmitter Holding Register Empty (THRE)—indicates that the THR register is empty while the Transmitter is enabled. The first interrupt occurs when the Transmitter becomes enabled if there is an "empty" THR, or after the character is transferred to the Transmitter Register, thus making the THR empty.
3. Carrier On—this indicates the Carrier Detector input has gone "low" when DTR is "on". (DTR=Data Terminal Ready).
4. Carrier Off—indicates that the Carrier Detector input has gone "high" when DTR is "on".
5. DSR On—indicates the Data Set Ready input has gone "low" when DTR is "on".
6. DSR Off—indicates the Data Set Ready input has gone "high" when DTR is "on".
7. Ring On—indicates the Ring Indicator input has gone "low" when DTR is off.

Each time an Interrupt Condition exists, the INTR output from the USART is made a logic "low". The State Machine then acknowledges the Interrupt Request by setting the CS (Chip Select) and Interrupt Acknowledge Input (IACK) to the USART to a "low" state, otherwise the Interrupt Condition (INTR) would never get reset.

Auto Call Operation: (For Operations Using an 801 Auto Call Unit)

The 801 ACU has a 4-bit interface for receiving digits of the call number to be dialed. This interface is defined by the EIA Standard RS-366 and involves the following signals:

TABLE Y-5

| Call Request | CRQ |
|---|---|
| Data Line Occupied | DLO |
| Present Next Digit | PND |
| Digit Present | DPR |
| Data Set Status | DSS |
| Abandon Call and Retry | ACR |
| NB 8 Digit | |
| NB 4 Digit | |
| NB 2 Digit | |
| NB 1 Digit | |

Figure 3:
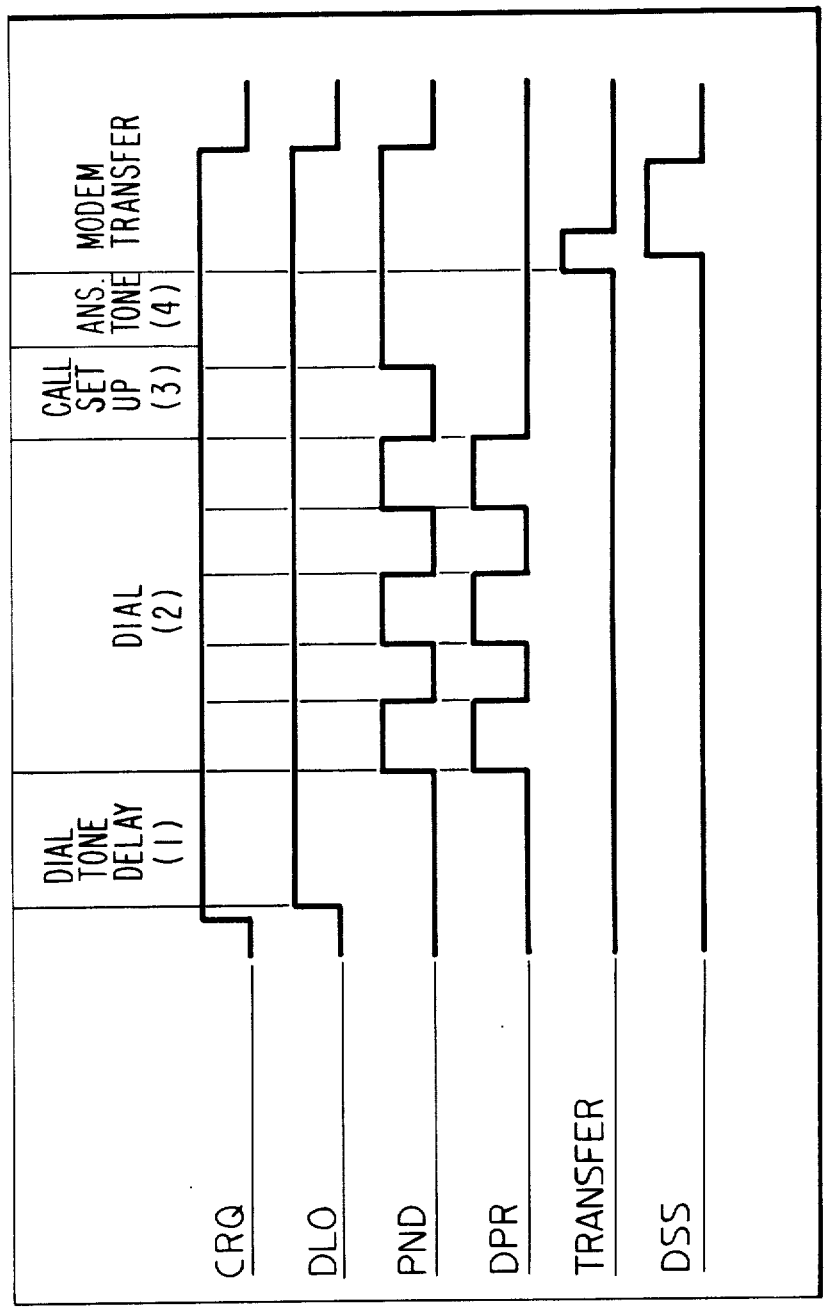
FIG. 3 shows a dialing sequence for a type 801 Automatic Calling Unit.

The dialing sequence shown in FIG. 3 operates as follows:

The Line Adapter turns CRQ "on" provided that the DLO is "off". After detection of the dial tone, which is done by the 801, the digits are transferred one at a time to the 801. The 801 converts the digits to signals which duplicate the function of a rotating dial-pulse or a touch-tone frequency compatible signal. These signals are transmitted to the phone line. At call completion, DSS comes "on" to signify receipt of answer tone from the called Data Set. Receipt of DSS allows the line to be transferred to the ACU associated data set. If DSS fails to come "on", the Abandon Call and Retry (ACR) timer begins timing out.

With pulse dialing, a typical 10 digit number takes 15 seconds to dial; for touch-tone dialing the same number requires approximately one second. The answer sequence begins sometime after the last digit has been sent by the 801.

Interface Operation (Data-Comm Line-Adapter/State Machine):

The UIO Data-Communication Line-Adapter is an application dependent device which is controlled by the UIO State Machine Processor 600. Two basic types of Line Adapters are available—these are the "Character Oriented" Line Adapter and the "Bit Oriented" Line Adapter, each of which may have a variety of electrical interfaces to the data communication lines.

One to eight Line Adapters may be serviced by one State Machine Processor on an individual basis. Each Line Adapter contains components which are addressable and are serviced by the State Machine Processor with PUT or GET instructions. The components on the Line Adapter are serviced with one or a series of instructions which, in some cases, provide sequential control of the component. The "communication" between the State Machine Processor and the Line Adapter can be separated into two basic groups:

(i) Undesignated
(ii) Designated

The "Undesignated" operations do not require the Line Adapter to be designated to execute those instructions. "Designated" Type operations require the Line Adapter to be designated or "identified" to execute those instructions or series of instructions.

The following operations (except for ACUOR) in addition to requiring the Line Adapter to be "Designated" will use the First Control Register 37 in the State Machine Processor 600 for control purposes to components on a Line Adapter. With the exception of the Clear OP, all other operations will be a series of PUT/GET OPs to provide the necessary sequential control.

"Data" outputted to the Line Adapter for these operations will originate from the Second Output Control Register 38 of the State Machine in FIG. 6.

The bits of the First Output Control Register 37 of the State Machine (FIG. 6) are organized for control functions as follows:

TABLE Y-6

| Bit | Signal | Output Control Register Bits For First Control Register 37 |
|---|---|---|
| 0 | UCS | USART Chip Select - This bit must be a "1" when the USART requires a chip select. |
| 1 | TCS | Timer Chip Select - This bit must be a "1" when the Program Timer/Baud Rate Generator requires a chip select. |
| 2 | IACKI | Interrupt Acknowledge In - This bit must be a "0" acknowledge an interrupt from a designated and chip selected USART. |
| 3 | WE | Write Enable - This bit must be "0" to enable writing to the USART or Timer. |
| 4 | RE | Read Enable - This bit must be "0" to enabe reading from the USART or Timer. |
| 5,6 | A0,A1 | Address Bit 0 or 1 - These two bits select a register within the Timer. |
| 7 | CLR | Clear - This bit must be "1" to provide a clear to the Line Adapter. |

USART Interfacing: Three procedures are used when communicating with a USART on a Line Adapter; these are:
(i) Interrupt Acknowledge Procedure
(ii) Read Procedure
(iii) Write Procedure Timer/Baud Rate Generator Interfacing:

Two basic procedures are used when communicating with the timer components; these are: (i) Write Procedure and (ii) Read Procedure.

Five control signals originating from unique bits of the First Output Control Register 37 are used for the Timer. These are:
TCS—Timer Chip Select
A0, A1—Register Addressing Lines
WE—Write Enable
RE—Read Enable Baud Rate Generator:

The "character" oriented UIO Data Comm Line Adapters will use a USART which requires an input clock that is 32 times faster than the bit-time of the Asynchronous line it is communicating with. To obtain this X32 clock it is preferred to use an Intel 8253 programmable timer chip, whose squarewave output is connected to the USART. This timer is driven by a crystal controlled clock whose frequency is 1.2288 megahertz. After initializing the Timer, a divisor value must be loaded which will produce the necessary X32 clock.

BIT ORIENTED LINE ADAPTER: DESCRIPTION

The "Bit-Oriented" Line Adapter (FIG. 4) is a device which is used to perform the function of interfacing a parallel digital system to a serial data communications channel employing HDLC/SDLC/BDLC line protocol. HDLC refers to High Level Data Link Control as developed by the International Organization for Standardization (ISO). SDLC refers to Synchronous Data Link Control as developed by IBM Corp. The term BDLC refers to Burroughs Data Link Control as developed by the Burroughs Corp., Detroit, Mich.

The Line Adapter is operated under the control of the State Machine 600 of the Line Support Processor (LSP). (The LSP is also sometimes called a Frame Recognition-Data Link Processor, FR-DLP).

The major elements of the Bit Oriented Line Adapter are; (FIG. 4):
(a) 2048 words of RAM
(b) A Bit-Oriented Controller (BOC) chip
(c) A Timer chip which generates time references as required by the Line Support Processor and the clocks required by the Bit-Oriented Controller (BOC).
(d) Logic Circuitry to implement the automatic dialing function.
(e) A Transceiver.

The Bit Oriented Line Adapter can exist in two versions: (i) a "Quad" version (FIG. 4) which contains four complete adapters on one profile card of chips, and (ii) a "Dual" or single version which is simply a diminished quad card.

Each adapter section of a Quad card or a Dual-Quad card is cabled to a "line interface card" (Electrical Interface, EI, FIG. 4) which converts the TTL level of the adapter to the levels required by the communications channel. A unique line interface card type exists for each kind of electrical interface.

Figure 4:
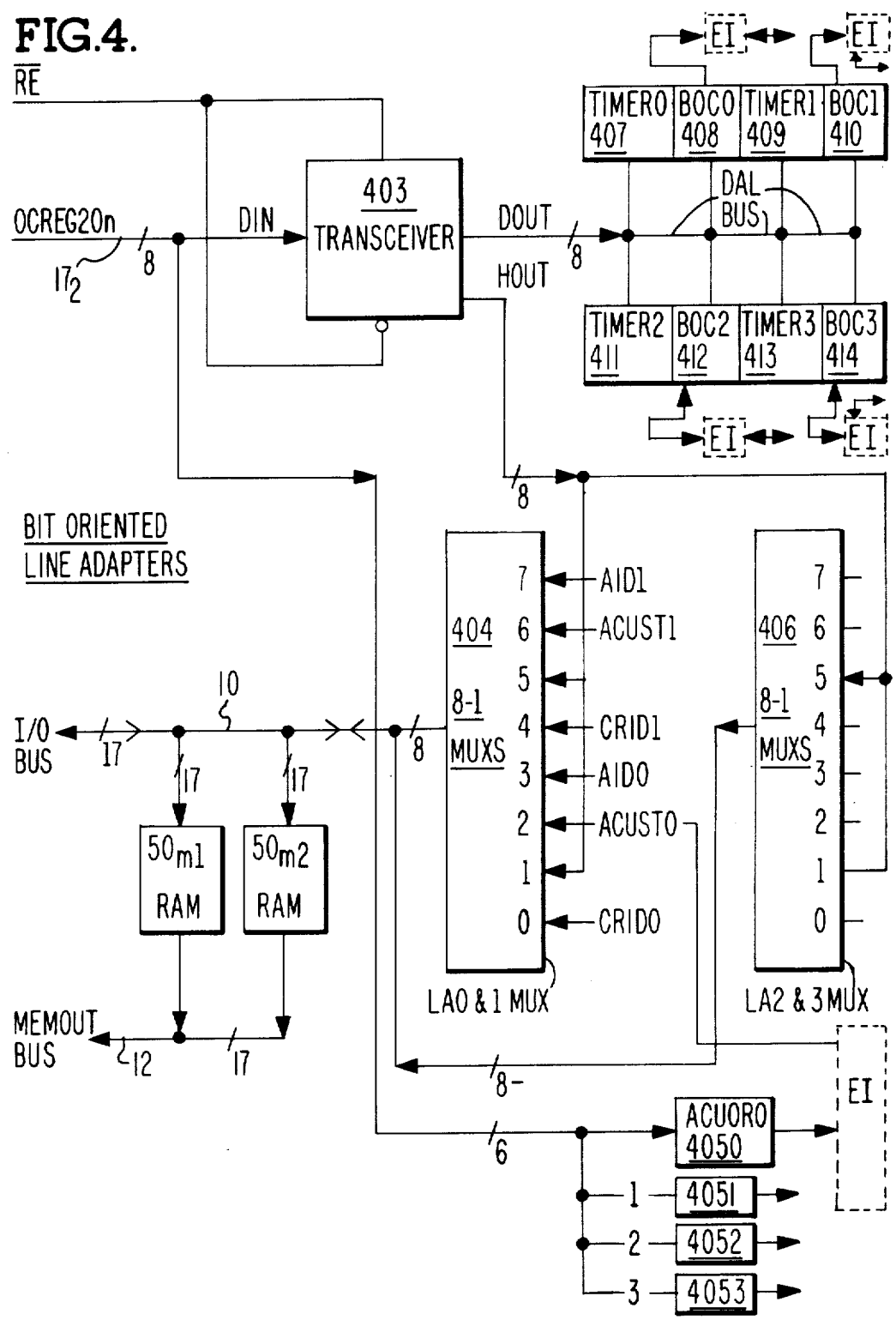
FIG. 4 is a block diagram of a bit-oriented Line Adapter in the Quad version whereby four Line Adapters are configured on one slide-in card.

Line Adapter Organization:

FIG. 4 is a block diagram of the "Bit Oriented" Line Adapter 400 in the version called the Quad Line Adapter card.

A transceiver 403 receives input data on line $17_2$ which is designated as the DIN or data input line. This line comes from the second Output Control Register 38 of the State Machine Processor 600 shown in FIG. 6.

Since this Line Adapter is a "Quad", there are four BOC's or Bit Oriented Controllers 408, 410, 412, and 414, each connecting to a separate electrical interface EI (each of which connects to its own data comm line or modem or data set). Likewise, there are four Timers 407, 409, 411 and 413 which operate with the respective Bit Oriented Controllers. The Bit Oriented Controllers have a data access line (DAL) bus which connects to the Transceiver 403 by means of line DOUT (data out line).

Also connecting to the Transceiver 403 is the Read Enable signal (RE) from the State Machine Processor 600. The Transceiver 403 also has an output line designated ROUT (Read-Out) which line provides input to multiplexors 404 and 406. Since this is a Quad Line Adapter unit, the element 404 represents two multiplexors while the element 406 represents two more multiplexors for a total of four. The I/O bus 10 of the State Machine Processor connects, in FIG. 4, to "external" RAM memories $50_{m1}$ and $50_{m2}$ in addition to both multiplexors 404 and 406. The output of the RAM memory $50_{m1}$, $50_{m2}$ connects to the Memory Out bus 12, which enters the State Machine Processor of FIG. 6.

The data from the Second Control Register 38 of the State Machine Processor 600 enters on line $17_2$ and also connects to the Automatic Calling Unit Output Registers (ACUOR) $405_{0,1,2,3}$. Since this is a Quad Line Adapter, there are actually four ACU registers designated 0, 1, 2, 3 on FIG. 2. The output of each of these Automatic Calling Unit registers feeds to electrical interface units (EI) which connect to an individual Automatic Calling Unit.

In FIG. 4 the ROUT line feeds input data to multiplexors 404 and 406. In addition, multiplexors 404 and 406 receive a series of input control signals which are associated with each separate data communication line.

The Transceiver 403 consists of four pairs of 3-state logic elements which are configured as Quad bus drivers/receivers along with separately buffered Receiver Enable and Driver Enable lines. A typically preferred integrated circuit package which embodies these features is built by the Signetics Company of Sunnyvale, Ca. and designated as the 8T26 3-state Quad Bus Transceiver.

Random Access Memory:

In the Bit-Oriented Line Adapter in the Quad versions of FIG. 4, the Quad BOC (bit-oriented controller) as 8,192 words of RAM (memory) which are portioned equally among the four adapter sections. The memory consists of 34 static RAM ICs (each of 4,096×1) which provide a total of 8,192 words of memory or 2,048 words per each adapter section. Each word is 17-bits long and includes one parity bit.

The Random Access Memory $50_{m1}$, $50_{m2}$ (RAM) is used to hold programs, tables and data required by the Line Support Processor (LSP) to service each adapter. Except for the Line Adapter Designate Logic, FIG. 10 (which is used to select a 2,048 word page of RAM as well as to select other addressable elements associated with a particular adapter section) the memory is essentially independent of the remaining logic on the card. Since the 180 nanosecond read-access time of the RAM exceeds the 125 nanosecond clock period, the memory operations require two clock periods.

Bit-Oriented Controller (BOC):

The BOC is a MOS/LSI device housed in a 40 pin Dual-In-Line package and is TTL (Transister-Transister Type Logic) compatible on all inputs and outputs. In the Quad Line Adapter of FIG. 4, there are four Bit-Oriented Controllers 408, 410, 412 and 414. The BOC is composed of registers, receivers, transmitters, and command registers which are described and illustrated in a Western Digital Corp. brochure entitled SD 1933 Synchronous Data Link Controller. These elements will be summarized hereinafter.

The BOC implements the BDLC/SDLC (Burroughs Data Link Control/Synchronous Data Link Control) protocol including zero insertion and deletion, FCS (Frame Check Sequence) generation and checking, automatic detection of special control characters (e.g., FLAG, ABORT, INVALID and IDLE). The following Table is a brief description of the particular "Frame", which is the basic unit of information transfer in HDLC/SDLC/BDLC:

TABLE I-1

| FLAG | AD-DRESS | CON-TROL | INFO FIELD | FRAME CHECK SEQUENCE | FLAG |
|------|----------|----------|------------|---------------------|------|

Where:
FLAG = 01111110
Address field—one or more 8 bit bytes defining the particular station
Control field—one or two 8 bit bytes
Information field—Any number of bits (may be zero bits)
Frame check Sequence—16 bit error checking field Automatic zero insertion on transmission prevents the occurrance of more than five consecutive "ones" between flags. Inserted "zeros" are deleted by the Receiver. The major elements of the Bit-Oriented Controller (BOC) are:

(i) Receiver Register;
(ii) Receiver Holding Registers;
(iii) Comparator;
(iv) Transmitter Holding Register;
(v) Transmitter Register;
(vi) Command Register.

These six elements of the Bit-Oriented Controller are discussed hereinbelow:

(i) Receiver Register:

This is an 8-bit register which inputs the received data at a clock rate determined by the Receiver clock. The incoming data is assembled to a 5, 6, 7 or 8-bit "character length" and then transferred to the Receiver Holding Register (RHR). At this time the Data Request Input (DRQI) is made active thus informing the State Machine 600 at the Line Support Processor (LSP) that the Receiver Holding Register (RHR) contains data.

(ii) Receiver Holding Register; (RHR):

This is an 8-bit parallel register which presents assembled receiver "characters" to the data bus lines when activated via a "Read" operation. When the Receiver Holding Register is read by the State Machine, then the DRQI is made inactive (DRQI is the Data Request Input signal).

(iii) Comparator:

This is an 8-bit Comparator which is used to compare the contents of the Address Register (in BOC chip, with the address field of the "incoming frame". This feature is enabled by a bit in the Command Register (vi). If it is enabled and there is a match, then the received frame is inputted and DRQI's are generated. If enabled and there is no match, the received frame is discarded. If not enabled, all received frames are inputted to the State Machine of the Line Support Processor (LSP).

(iv) Transmitter Holding Register:

This is an 8-bit register which is loaded with data from the data bus by a "Write" operation. DRQO (Data Request Output) is also reset by the "Write" operation. The data is transferred to the Transmitter Register when the transmitter section is enabled, and the Transmitter Register is ready for new data. During this transfer, data register output (DRQO) is made active in order to inform the State Machine that the Transmitter Holding Register (THR) is again empty.

(v) Transmitter Register:

This is an 8-bit register which is loaded from the Transmitter Holding Register (THR) and which is serially shifted out to the Transmit Data Output. An ABORT or a FLAG may be loaded into this register under program control.

(vi) Command Register:

The command register consists of three 8-bit registers which define the command which is presently in process (e.g., DATA, ABORT, FLAG OR FCS) and it also specifies various other factors defined hereinbelow.

(vi-1) Command Register #1: This is the first of three 8-bit registers which is organized according to bits 10–17 as shown in the Table below.

TABLE I-2

COMMAND REGISTER 1

| CR17 | CR16 | CR15 | CR14 | CR13 | CR12 | CR11 | CR10 |
|---|---|---|---|---|---|---|---|
| ACT REC | ACT TRAN | TC1 | TC0 | TBL1 | TBL0 | DTR | SPCL OUT |

Bit #17 of the Command Register "1" is designated CR17 and is used as "activate Receiver" bit. This bit when set activates the Receiver which begins searching for frames.

The bit designated CR16 is called "activate Transmitter". This bit, when set, activates the Transmitter and sets RTS (Request to Send). Transmission begins when CTS (Clear to Send) is received. In the "Go-Ahead" mode, the Transmitter waits for a Go-Ahead (0 followed by 7 ones) before executing the command. At the completion of any transmitter command, RTS will drop coincident with the start of the last transmitted bit. To insure that the last transmitted bit clears the data set, RTS is delayed 1-bit-time by means of logic external to the BOC.

The Command Register #1 bits 14 and 15 are Transmitter Commands (TC) which indicate the type of data to be sent according to the Table shown below:

TABLE I-3

| CR15 | CR14 | | |
|---|---|---|---|
| TC1 | TC0 | COMMAND | ACTION |
| 0 | 0 | DATA | DRQO . . . Data Request-out |
| 0 | 1 | ABORT | INTRQ . . . ⎫ |
| 1 | 0 | FLAG | INTRQ . . . ⎬ Interrupt Request |
| 1 | 1 | FCS | INTRQ . . . ⎭ |

Explanation of Table:
DATA: While this command is active, the Transmitter Holding Register (THR) is transferred into the TR (if the THR is loaded and the TR is done shifting out any previous data). When the THR data is transferred to the TR, a DRQO is generated indicating that the THR is empty. If the THR has not been loaded with a new byte by the time the TR is shifted out, then an INTRQ with the XMIT-Underrun Error bit set is generated and ABORTs are sent without subsequent INTRQs.
When the DATA command is executed while not in a frame and TABLE I-3-continued the THR is not loaded, continuous FLAGs without INTRQs will be sent if the AUTO FLAG option is chosen; otherwise continuous ABORTs without INTRQs will be sent until the command is changed or until the THR is loaded.
ABORT: Upon receipt of this command, an ABORT sequence (8 ones) is loaded into the TR and XMIT operation complete is generated (INTRQ = 1). After the interrupt has been serviced, the command may change. If a new command has not been received by the time the last bit is out of the TR, then another ABORT sequence is loaded into the TR and another interrupt is generated. This sequence continues until the command is changed.
FLAG: Upon receipt of this command, a FLAG (01111110) is loaded into the TR (transmitter register) and "XMIT operation complete" is generated (INTQ = 1). After the interrupt has been serviced, the command may change. If a new command has not been received by the time the last bit is out of the TR, then another FLAG is loaded into the TR and another interrupt is generated. This sequence continues until the command is changed.
Frame Check Sequence (FCS): Upon receipt of this command, the Residual Byte (which the chip automatically transfers into the Transmitter Holding Register, THR) will be sent provided RES2-RES0 NEQ = 0. Following the Residual Byte there will come the FCS, then a FLAG along with an INTRQ (XMIT operation complete) thus ending the frame. After the interrupt has been serviced, the command may change. If the FCS command is executed while not in a frame, and if AUTO FLAG is not chosen, the Transmitter will send ABORTs without INTRQs. If AUTO FLAG is chosen, continuous FLAGs with INTRQs will be sent.

The Command Register #1 bits 13 and 12 are used as shown in the Table below. The Command Register bit 12 is designated as "Transmitter Byte Length" (TBL) and these bits designate the number of bits per data byte. Each data byte may be 5, 6, 7 or 8 bits long.

TABLE I-4

| (CR13) TBL1 | (CR12) TBL0 | Bits Per Data Byte |
|---|---|---|
| 0 | 0 | 8 |
| 0 | 1 | 7 |
| 1 | 0 | 6 |
| 1 | 1 | 5 |

The Command Register #1 bit 11 designated CR11 is the DTR command; this bit controls the "Data Terminal Ready" (DTR) signal. The DTR, as seen at the data set, will be "on" when bit CR11 is "set" except when the Self-Test mode is selected (that is, when bit CR21 of Command Register #2 is set).

Bit 10 designated CR10 is the "Special Out" bit: this bit controls the Special Out line to the Line Interface card where its name is then changed to Dial Mode (DM). Dial Mode is used in conjunction with DTR for dialing with a Burroughs Auto-Dialing Data Set. DM will be "on" when CR10 is set.

(vi-2) Command Register #2:

This Command Register is illustrated by the Table below:

TABLE I-5

COMMAND REGISTER 2

| CR27 | CR26 | CR25 | CR24 | CR23 | CR22 | CR21 | CR20 |
|---|---|---|---|---|---|---|---|
| CONTROL BYTES | ADDR COMP | EXT ADDR | RBL1 | RBL0 | GA | SELF TEST | AUTO FLAG |

The bit 27 designated as Command Register bit 27 (CR27) represents the number of control bytes. This bit defines the number of control bytes per frame: a "1" specifies two control bytes while a "0" specifies one control byte.

The bit 26 designated CR26 is an "Address Compare Enable" bit. This bit when "set" causes the Receiver to inspect the first incoming address byte. If there occurs: (1) a match with the address register or (2) the address is all ones, then the rest of the frame is inputted. Otherwise the Receiver searches for a new frame. If not set, then all frames are inputted.

The bit 25 designated CR25 is the "Extended Address Enable" bit. This bit will cause the receiver to input another address byte if the least significant bit of the current address byte is "zero".

The bits of CR24 and CR23 are the "Receiver Byte Length" bits (RBL). These bits specify the byte size of a received I-frame. The I field bytes may be 5, 6, 7 or 8 bits long.

TABLE I-6

| (CR24) RBL1 | (CR23) RBL0 | Bits Per Byte |
|---|---|---|
| 0 | 0 | 8 |
| 0 | 1 | 7 |
| 1 | 0 | 6 |
| 1 | 1 | 5 |

In Table I-5, the bit CR22 is the "GO-AHEAD" bit. This bit when "set" causes the BOC to work in the "Go-Ahead" mode as used in a loop type configuration. "Loop operation" (in the bit-synchronous mode) is a method of line operation in which several stations are connected together in a loop, such that each secondary station must "pass on" all frames which are not addressed to it.

The 21-bit designated as CR21 is the "Self-Test Mode" bit. This bit, when set, deactivates the DTR and causes the Transmitter output to be connected to the Receiver input internally within the BOC chip. This data is also seen at the transmitted data line.

The bit-20 designated CR20 is the "Auto Flag" bit. Here the Transmitter will send continuous flags without INTRQs if the bit CR20 is "set", and the DATA command (CR15, CR14="00") is executed while not in a frame and THR is not loaded. If CR20 is not set, but the other two conditions are met, then continuous ABORTs without INTRQs will be sent until the command is changed or the THR (Transmitter Holding Register) is loaded. The purpose of this bit is to eliminate the necessity of executing a FLAG command at the beginning of a frame.

(vi-3) Command Register #3:

This register includes bits 30 through 37 and is shown on the Table below.

TABLE I-7

| COMMAND REGISTER 3 | | | | | | | |
|---|---|---|---|---|---|---|---|
| CR37 | CR36 | CR35 | CR34 | CR33 | CR32 | CR31 | CR30 |
| UNUSED | UNUSED | UNUSED | UNUSED | UNUSED | RBL2 | RBL1 | RBL0 |

As seen above, the bits 33-37 are not used, however bits CR30, CR31, CR32, are used to determine what length the Residual Byte will be. This is shown in the Table hereinbelow.

TABLE I-8

| CR32 | CR31 | CR30 | |
|---|---|---|---|
| Res2 | Res1 | Res0 | Resident Byte Length |
| 0 | 0 | 0 | no residual byte sent |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

If no Residual Byte is to be sent, then the bits CR30-CR32 must be set to "0".

To end a frame, the following three actions must be done within 5 transmit clocks following the turn-on of DRQO. This may be done however in any order, as follows:

1. load Transmitter Holding Register (THR) with the last character or the residual.
2. load CR3 with the Residual Byte length.
3. change the Transmitter Command to FCS.

Status Register:

The Status Register is organized as shown below using register bits 0-7. The Table hereinbelow will show their usage.

TABLE I-9

| STATUS REGISTER | | | | | | | |
|---|---|---|---|---|---|---|---|
| SR7 | SR6 | SR5 | SR4 | SR3 | SR2 | SR1 | SR0 |
| RI | CD | DSR | SPCL IN | RCV IDLE | AF/or IF/RES2 | ORUN/ RES1 | CRCI RES0 |

SR7 - RING INDICATOR    SR5 - DATA SET READY
SR6 - CARRIER DETECT    SR4 - SPECIAL IN
                                              MISCELLANEOUS

Miscellaneous bits here are bits 4, 5, 6, 7 which will be "set" when the signal they represent, as seen at the Data Set, is "on". "Special In" (SPCL IN) is used with the "Byte-Oriented" Line Adapter for Reverse Channel Receive, or Restraint Detected. Neither of these functions are applicable to the "Bit-Oriented" Line Adapter. Consequently, "Special In" is unused and thus SR4 will always be in the "reset" state.

Bit-3 designated SR3 is the "Receive Idle" bit. This bit is set when 15 "ones", denoting a station IDLE condition, have been received.

The bits of the Status Register designated "0→2" (SR0, SR1, SR2) are used as the "Received Error Bits/Residual Count bits. If a Received End of Message (REOM) without errors is received, then the bits SR2-SR0 indicate the number of residual bits on the last byte according to the following Table:

TABLE I-10

| RESIDUAL COUNT (BINARY VALUE OF SR2-SR0) | SPECIFIED BYTE LENGTH | | | |
|---|---|---|---|---|
| | 5 | 6 | 7 | 8 |
| 0 | NA | NA | NA | 0 |
| 1 | 1 | 1 | 1 | 1 |
| 2 | 2 | 2 | 2 | 2 |
| 3 | 3 | 3 | 3 | 3 |

TABLE I-10-continued

| RESIDUAL COUNT (BINARY VALUE OF SR2-SR0) | SPECIFIED BYTE LENGTH | | | |
|---|---|---|---|---|
| | 5 | 6 | 7 | 8 |
| 4 | 4 | 4 | 4 | 4 |
| 5 | 0 | 5 | 5 | 5 |
| 6 | NA | 0 | 6 | 6 |
| 7 | NA | NA | 0 | 7 |

For residual values other than zero, the last byte contains the residual plus a portion of the closing flag.

If a REOM with errors is received, then SR2-SR0 define the error as follows:

SR2, when "on", indicates an aborted frame or an invalid frame, that is, a frame with less than 32-bits.

SR-1, when "on", indicates an Overrun Error (DRQI not serviced) SR0 when "on" indicates a CRC error, (Cyclic Redundancy Check).

BOC Interface Control:

BOC refers to the Bit-Oriented Controller.

The following signals comprise the BOC Interface Control signals: The usual state is a logic 0 (ground) when the signal mneumonic indicates inversion and is a logic 1 (plus 5-volts) otherwise:

(i) CS refers to Chip Select
(ii) WE refers to Write Enable
(iii) RE refers to Read Enable
(iv) A0, A1, A2 refer to the Register Address, and these signals are Bit-Oriented Controller (BOC) signals as seen in the following Table where H (High) equals plus 5-volts and L (Low) equals ground as measured at the BOC.

TABLE I-11

| $\overline{A2}$ | $\overline{A1}$ | $\overline{A0}$ | REGISTER | |
|---|---|---|---|---|
| | | | READ | WRITE |
| H | H | H | CR1 | CR1 |
| H | H | L | CR2 | CR2 |
| H | L | H | CR3 | CR3 |
| H | L | L | RHR | AR |
| L | H | H | IR | THR |
| L | H | L | SR | — |

Service Requests (Interrupts):

These signals are defined as follows:

(i) DRQI—this is the Data Request Input: this signal output, when high, indicates that the Receiver Holding Register (RHR) contains valid data. The signal DRQI causes a service request to the LSP-DLP and will be reset when RHR is reset. The signal DRQI also sets bit 2 of the Interrupt Register.

(ii) DRQO—Data Request, Output: this output, when high, indicates that the Transmitter Holding Register (THR) is empty. DRQO will be reset when a character is written into the Transmitter Holding Register but will remain high between the conclusion of data and the end of the frame. To avoid generating a continuous service request during this period, the signal DRQO is logically ended with NB8/of the ACUOR register. The service request resulting from the signal DRQO can be dropped by writing a "one" bit in ACUOR (4:1) NB8. A service request resulting from a DRQI or INTRQ will not be suppressed by this action. The signal DRQO also sets bit 1 of the Interrupt Register.

(iii) INTRQ—Interrupt Request: this output, when high, indicates that there are one or more bits set in the bit positions 3 through 7 of the Interrupt Register. The signal INTRQ causes a service request to the LSP-DLP and will be reset when the Interrupt Register is read. The Interrupt Register is shown in Table I-12.

TABLE I-12

| INTERRUPT REGISTER | | | | | | | |
|---|---|---|---|---|---|---|---|
| IR7 | IR6 | IR5 | IR4 | IR3 | IR2 | IR1 | IR0 |
| REOM no err. | REOM errs. | XMIT opcom w/no errs. | XMIT opcom with underrun | DSC | DRQI | DRQO | INTRQ |

IR7 - RECEIVED END OF MESSAGE, NO ERRORS -
This bit is set when an End of Message has been detected without error.

IR6 - RECEIVED END OF MESSAGE, ERRORS -
This bit is set when an End of Message had been detected with errors. Errors include CRC, Overrun, Invalid Frame, and Aborted Frame as denoted by the Status Register.

IR5 - TRANSMIT OPERATION COMPLETE, NO ERRORS -
This bit is set when the command in CR1 has completed without error.

IR4 - TRANSMIT OPERATION COMPLETE, ERRORS -
This bit is set when the indicated command in CR1 has completed with an underrun error.

IR3 - DATA SET CHANGE -
This bit is set when Carrier Detect, Data Set Ready, or Ring Indicator change state, either from "off" to "on" or vice-versa.

IR2 - DRQI: Data Request-Input
IR1 - DRQO: Data Request-Output
IR0 - INTRQ: Interrupt Request NRZI Option:

The non-return to zero option is under program control and is in effect whenever bit NB4/of the Auto Call Unit Output Register 405, FIG. 4 (ACUOR) is in the logic 1 state. When this option is chosen the data is encoded to the NRZI format on transmission and decoded from the NRZI format on reception. In NRZI encoding, the output remains in the same state to send a binary 1 and changes state in order to send a binary 0. Since a zero bit is automatically inserted following five contiguous "one" bits anywhere between flags, a level transition is guaranteed to occur at least one every six bits.

The essential purpose of NRZI encoding is to permit "pseudo asynchronous" operation (without "start-stop" bits) in order to eliminate the need for a device such as a synchronous Data Set, to extract the receive clock from incoming data. This permits the use of direct connect devices such as those employed by Burroughs two wire direct interface. Also NRZI encoding allows the use of asynchronous Data Sets in place of the more costly synchronous data sets (in cases where the lower data rate of the asynchronous data set is acceptable).

As with all asynchronous operations, the timing clocks must be locally generated. With the Quad "Bit-Oriented" Line Adapter, FIG. 4, the clocks are generated by a Counter/Timer Chip which must be programmatically set to provide a clock rate which is 32 times the data rate.

The Quad "Bit-Oriented" Line Adapter has strap options for each adapter section. Straps are used to select between timing clocks furnished by a synchronous Data Set, when one is used (or the timing clock is generated internally if the Data Set is not used).

An additional strap provides the control signal (1×/32×) into the SDLC Controller Chip. As previously cited, a preferred synchronous Data Link Controller Chip is that manufactured by Western Digital Corp., and designated SD 1933. The 1× option should be used when operating with a "synchronous" Data Set. The 32× option should be used when operating with an "asynchronous" Data Set or when operating with direct-connect devices.

With a 1× strap setting, the SDLC controller chip (408, 410, 412, 414, FIG. 4) uses the positive transition of the receive clock as a strobe to shift in received-data and uses the negative transition of the transmit clock to shift out each bit of transmitted-data. The maximum allowable data rate is the maximum specified operating speed of the SDLC controller chip which is 1.5 MBPS (megabits per second).

With a 32× strap setting, the SDLC controller chip synchronizes itself to level transitions in the incoming data and determines the center point of the first bit by counting 16 clocks following the data transition. The center point of each subsequent bit is then established by counting 32 clocks from the center point of the receiving bit. Each level transition of the received data initializes the sequence. The maximum controller rate is approximately 47 KBPS (kilobits per second).

The following Table shows the allowable options for three kinds of interfaces.

TABLE I-13

| INTERFACE | NRZI | 32X/1X STRAP | CLOCK SOURCE |
|---|---|---|---|
| Synchronous | Not Selected* | 1X | Data Set |
| Asynchronous Data Set | Selected | 32X | Internal |
| Direct Connect | Selected | 32X | Internal |

*NRZI may be selected provided that all stations are using the NRZI format.

Go-Ahead Option:

The "Go Ahead" option is under program control and is in effect when bit CR22 of the BOC's Command Register #2 is set. The Go Ahead option is required for operation within a "loop" arrangement such as shown in the Table below.

TABLE I-14

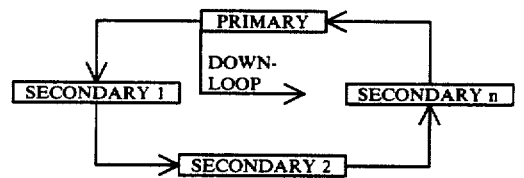

In such a system, each secondary station is a repeater for messages originating from either the primary or a lower numbered secondary station. A transmission originating from the primary is relayed from the secondary to another secondary until it returns to the primary. A secondary can also originate a transmission provided that the primary and all secondaries of lower number have relinguished the line, that is to say, they have signalled a "Go Ahead" to downstream secondaries. The "Go Ahead" consists of a "zero" followed by 7 "ones". The station relinquishing the line ends its transmission with the ending flag of the frame which is followed immediately by the "Go Ahead".

In actual practice, the primary relinquishes control of the line by following the end flag (of the last frame it is transmitting) with a single "0" bit, after which it holds the transmit line at a constant "1" level. A secondary station will see this as a "Go Ahead" and, providing it has a message to send, will suspend the repeater function and place its own transmission on the line. It will conclude the transmission by sending the "Go Ahead" pattern and then resuming the repeater function.

Whenever a secondary unit sees the "Go Ahead" pattern and wishes to transmit, it replaces the "Go Ahead" pattern by the starting flag of the frame it intends to send. This amounts to changing the eighth bit of the "Go Ahead" pattern from a "one" to a "zero". The Bit Operated Controller (BOC), when operating as a repeater, delays the data by four bits in order to obtain the time to detect the "Go Ahead" pattern and to change it to a flag if it so wishes.

The BOC (408, etc.) will generate Data Interrupts (DRQIs) on "receive" only if a match exists between the value of the address field of a frame and the value held within the Address Register.

OPERATIONS-BIT ORIENTED LINE ADAPTER (FIG. 4)

Flag Operation:

Service requests are generated by both the Timer and the BOC (Bit Oriented Controller). All service requests from all adapter sections are ORed together to drive a common line. A line named FLAG 2/(FIG. 11), which is active low, notifies the State Machine 600 that one or more Line Adapters (LA) are requesting service. The State Machine of the Line Support Processor can determine which adapters are requesting service by executing a GET OP with the variant field V/FLD (4:5)=00001. The Line Adapter (LA) does not need to be designated for the executing of this OP.

A FLAG 2/which is active as a consequence of the signal DRQO being "on", can be made inactive by writing a "one" bit in ACUOR 406 (4:1) NB 8; a FLAG 2/which is active as a result of any other service request will not be suppressed by this action.

The multiplexors 404, 406 (FIG. 4), when properly addressed, will place the state of all of the service requests associated with a designated Line Adapter onto the I/O bus 10.

Data Bus Structure:

With the exception of RAM memory $50_{m1}$, $50_{m2}$, all data which is sent to addressable components in the Line Adapter (LA) will originate from the second "Output Control Register" 38 in the State Machine 600. Likewise (with the exception of RAM), all data read by the State Machine from addressable components on the Line Adapter will go to the State Machine via the I/O bus 10.

As seen in FIG. 4, the second Output Control Register lines $17_2$ designated OCREG $20_n$ connect directly to the inputs of the Auto Call Unit Output Register 405 (ACUOR) and to the Transceiver 403.

The Auto Call Unit Output Register 405, ACUOR, is a 6-bit "D" type flip-flop register. When the clock input is enabled, data from the Second Output Register on line $17_2$ will be strobed into the Auto Call Unit Output Register 405 (ACUOR).

Data sent to both the Timer (407 et al.) and to the BOC (408 et al.) originate from the Second Output Control Register 38 in the State Machine (FIG. 6) and are sent through the quad bi-directional inverting bus driver-controller (Transceiver 403), then to the components (Timers, BOC's, Registers). Data lines for the Timer are "high" active, and for the BOC they are "low" active. Since both components share the same data bus (DAL), data to one of the components must be inverted. Thus, the Timer is used to receive the inverted data, that is, a 1 is equal to a 0 and a 0 is equal to a 1; and the Bit-Oriented Controller (BOC) receives the conventional signal format. Therefore, a "one" bit from Second Output Register 38 in the State Machine (FIG. 3) will appear as "one" bit to the BOC (active low) and as a "zero" bit to the Timer.

The Transceiver bus controller chip 403 (FIG. 4), although being a tri-state device, is never used in its third or high impedance state. It is always either driving the signal DIN to the signal DOUT or else it is driving the signal DOUT to the signal ROUT, depending on the state of RE (Read Enable) signal which originates from bit 4 of the First "Output Control Register" 37 in the State Machine of FIG. 6. When bit 4 of the First Output Register is "on", the signal RE is positive and this enables the DIN-to-DOUT direction to operation through the Transceiver 403. If bit 4 is being "off", this enables the DOUT-to-ROUT direction through the bus controller Transceiver 403.

The reading of information from a Line Adapter (LA) (except the RAM read) is performed by the decoding of GET OPs, and the read information is available on the least significant eight (8) bits of the I/O bus 10. The multiplexors 404, 406 are the source of the read information. Component Addressing: There are sixteen 8-1 multiplexors used on the Quad Line Adapter Card. Eight of these multiplexors are used for a "pair" of adapter sections. Selection of one of the four input groups allotted to each adapter section is determined by the value of the two least significant bits of the V-FLD of the GET OP, so that V-FLD (3:4) is equal to 11XX. The next following Table defines the various signals placed on the I/O bus 10 as a function of V-1 and V-0.

The output of the NOR gate drives the clock input of the 6-bit ACU Output Register 405.

Data from the Second Output Register 38 of FIG. 6 will then be strobed into the Auto Call Unit Output Register 405.

Addressing a Bit-Oriented Controller (BOC) or a Timer on a "designated" Line Adapter (LA) is the same as "chip selecting" the component. This is done with bits 0 and 1 of the First Output Control Register 37 in the State Machine (FIG. 6) along with a flip-flop called the "Designate FF" on a Line Adapter.

Each Line Adapter will AND its "Designate FF" with bits 0 and 1 to provide a UCS (BOC chip Select) or a TCS (Timer chip Select) for its Bit-Oriented Controller (BOC) or its Timer.

Thus, in the First Control Register 37, when the zero-bit is equal to 1, then the signal is used as a BOC Chip Select signal; when the First Control Register 37 has its one-bit equal to 1, then the signal is used to select the Timer Chip.

The remaining bits of the First Output Control Register 37 (FIG. 6) are used for control signals primarily for the BOC and the Timer.

Random Access Memory: (FIGS. 4, 10):

The Data-Comm Line Adapter Memory (for any line) is pointed at by the memory address lines MADDR (15:5) equal to 01110, and the DLI memory (FIG. 10) is selected when the memory address lines MADDR (15:5) is equal to 01111. The signal LARAM-SEL will go to all Line Adapter cards via the frontplane cable to select the "designated" Line Adapter RAM memory. If memory address line MADDR is 01110 or 01111 present (DLI or LA select), then a flip-flop designated SLMF $100_{sf}$ will be set equal to 1. The flip-flop output (FIG. 10) drives an open collector NAND gate B2C whose output connects to the WAIT/ frontplane

TABLE I-15

| SELECTION DECODE | V1V0 | I/O BUS LINES | | | | | | | |
|---|---|---|---|---|---|---|---|---|---|
| | | 0 | 1 | 2 | 3 | 4 | 5 | 6 | 7 |
| | 00 | INRQ | PT0 | PT1 | DRQ1 | DRQ0 | — | — | RING |
| | 01 | DATA BUS | DATA BUS | DATA BUS | DATA BUS | DATA BUS | DATA BUS | DATA BUS | DATA BUS |
| | 10 | PND | PWI | DLO | ACR | DSS | RSND/ | CTS | SPCL IN |
| | 11 | ID0 | ID1 | ID2 | ID3 | ID4 | ID5 | ID6 | ID7 |

The data bus is shared by both the Timer and the Bit-Oriented Controller (BOC) so that five components can be handled by a four input multiplexor field.

Three components on a Line Adapter (LA) may be written into (not including RAM). These components are the Automatic Calling Unit Register 405 (ACUOR), the Bit-Oriented Controllers 408, 410, 412, 414 (BOC), and the Timers 407, 409, 411, 413. Addressing these three components occurs in two distinct ways—one is the decode of the V-FLD of the PUT OPs and also the decode of bits from the First Output Control Register 37 in the State Machine (FIG. 6).

The Auto Call Unit Output Register 405 (ACUOR) is addressed when a 1 of 8 decoder chip decodes the PUT OP V-FLD (4:5) as equal to 01111 and PUT Strobe-2 is sent from the Line Support Processor. This decoding is performed only on the Single Line Adapter LA card, and is sent to other Line Adapter cards via the frontplane connector, FIG. 2. This decoded signal is received by a three input NOR gate in each Line Adapter whose other inputs are Clock and the Designate FF.

signal line to the State Machine 600 (FIG. 6). This signal (WAIT/) when low, will force the Line Support Processor to wait until the signal goes high. Using a RAM chip whose read-access time is 180 nanoseconds, requires the Line Support Processor's (LSP) State Machine Processor 600 to wait for 1 clock time; therefore, when DLI or any Line Adapt memory is selected, the slow memory flip-flop $100_{sf}$ (SLMF) will be "on" for one clock and then toggle "off".

The Quad Line Adapter card 400, FIG. 4, contains two groups of memory chips $50_{m1}$ and $50_{m2}$ whereby DC (Data Comm) lines 0 and 1 on the card share the same group of RAM chips, and Data Comm Lines 2 and 3 share the other group of RAM chips. The signal LARAMSEL (Line Adapter RAM Select) goes to all Line Adapters and then is ANDed with the appropriate designate conditions to allow the desired RAM group to be "chip selected". The division of RAM for the first or second data comm line on a Quad Line Adapter LA is handled by controlling the A-11 address pin on the RAM chip with a signal line DES0/A: and for the third and fourth line, the A-11 pin on the second group of RAM chips is controlled by a signal line DES2/A. FIG. 10 shows the DESn line which is typical for all RAMs of the various Line Adapters involved.

A "Dual" or a "Single" Line Adapter will only contain one group of memory chips and will operate the same as data comm line 0 and 1 on a "Quad" Line Adapter. Data to be written into a RAM must be placed on the I/O bus 10 by the State Machine 600; and Read data will be sent to the State Machine on the ME-MOUTnn bus 12 (nn equal 00→16).

Clear:

Two clearing methods are used on the Line Adapter: (i) Power-up Clear and (ii) Designate Clear.

Three components on a Line Adapter are cleared by the "Power Up" Clear: these are the (i) Designate flip-flop; (ii) Auto Call Output Register; (iii) the Bit-Oriented Controller (BOC).

There are two components on a Line Adapter which are cleared by the "Designate Clear": these are (i) Auto Call Output Register and (ii) the Bit-Oriented Controller (BOC).

When executing the "Designate Clear", the Line Adapters must be "designated", and the clear bit (bit 7) in the First Control Register 37 must be maintained for a minimum of one microsecond. This is required for clearing the Bit-Oriented Controller via a pin marked as the MR pin.

DATA LINK INTERFACE/LINE ADAPTER CARD (DLI/LA)

As will be seen in FIG. 2 which shows the Base Module supporting the slide-in cards, there is provided a slide-in card called the DLI/LA 700 which provides the interface between the host computer and Line Adapter. This DLI/LA card is shown in various phases by means of FIG. 7 which shows the internal data paths which connect the Distribution Card 20 (FIG. 1) and the I/O bus 10 of FIG. 7, which connects to the bus 10 of the State Machine Processor of FIG. 6; and FIG. 8 which shows the Sequencer of the DLI card; while FIG. 10 shows the addressing of a RAM memory as $550_m$ of FIG. 7 or memory $550_m$ of FIG. 10; and FIG. 9 shows the "single" Line Adapter which is on the same card with the DLI Interface.

Thus, a complete Line Support Processor may be composed of the State Machine Processor card 600 and the DLI/LA interface card 700 which, since it has one single Line Adapter, FIG. 9, can then connect and handle one external data communication line through an electrical interface, as also seen in FIG. 2.

Again, referring to FIG. 2, it may be noted that a Line Support Processor may be composed of a plurality of Line Adapters by adding in the slide-in card called the Quad Line Adapter which provides four Line Adapters and thus can handle four external data communication lines. Thus, by adding even more slide-in cards as an extra Quad Line Adapter card or an extra "Dual" Line Adapter card it is possible to build the Line Support Processor to handle up to 16 data communication lines with only one State Machine Processor 600.

Figure 7:
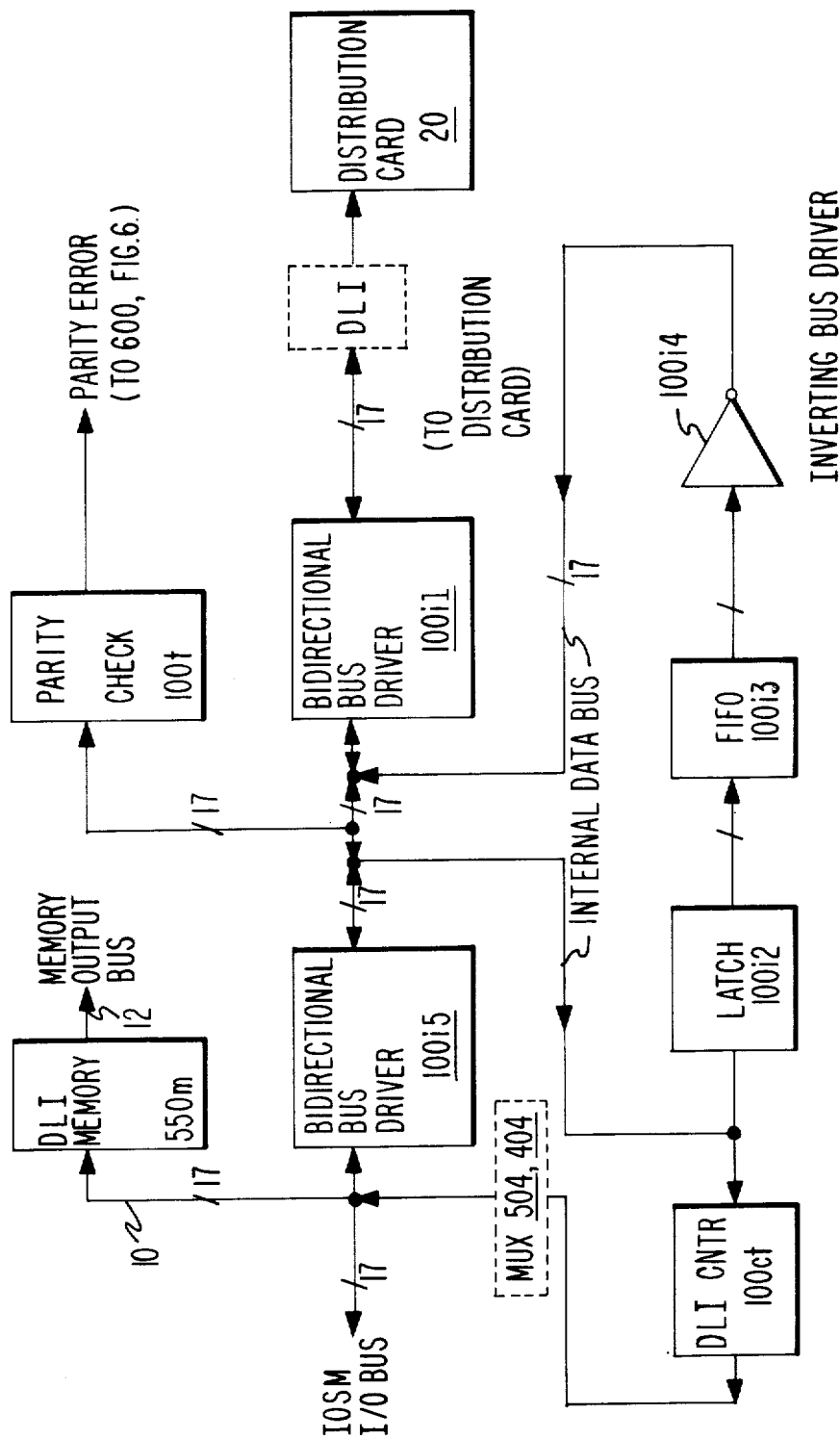
FIG. 7 is a block diagram of a portion of the DLI/LA card which shows an internal data path.

Referring to FIG. 7, which shows the internal data path of the Data Link Interface card, the I/O bus 10 from the State Machine Processor 600 connects to a DLI memory (RAM) $550_m$ which provides data output to the Memory Output bus 12 for use by the State Machine Processor.

The I/O bus 10 also connects to a bi-directional bus driver/receiver $100_{i5}$ and has a connection to a latching register $100_{i2}$ which feeds its output to a buffer designated FIFO $100_{i3}$. The output of FIFO buffer is fed to an inverting bus driver $100_{i4}$ which provides output to the internal data bus connecting to another bi-directional bus driver/receiver $100_{i1}$. The driver/receiver $100_{i1}$ connects to the Distribution Card 20 over the data link interface (DLI). A parity check circuit $100_t$ also connects to the internal data bus $10_i$.

Figure 8:
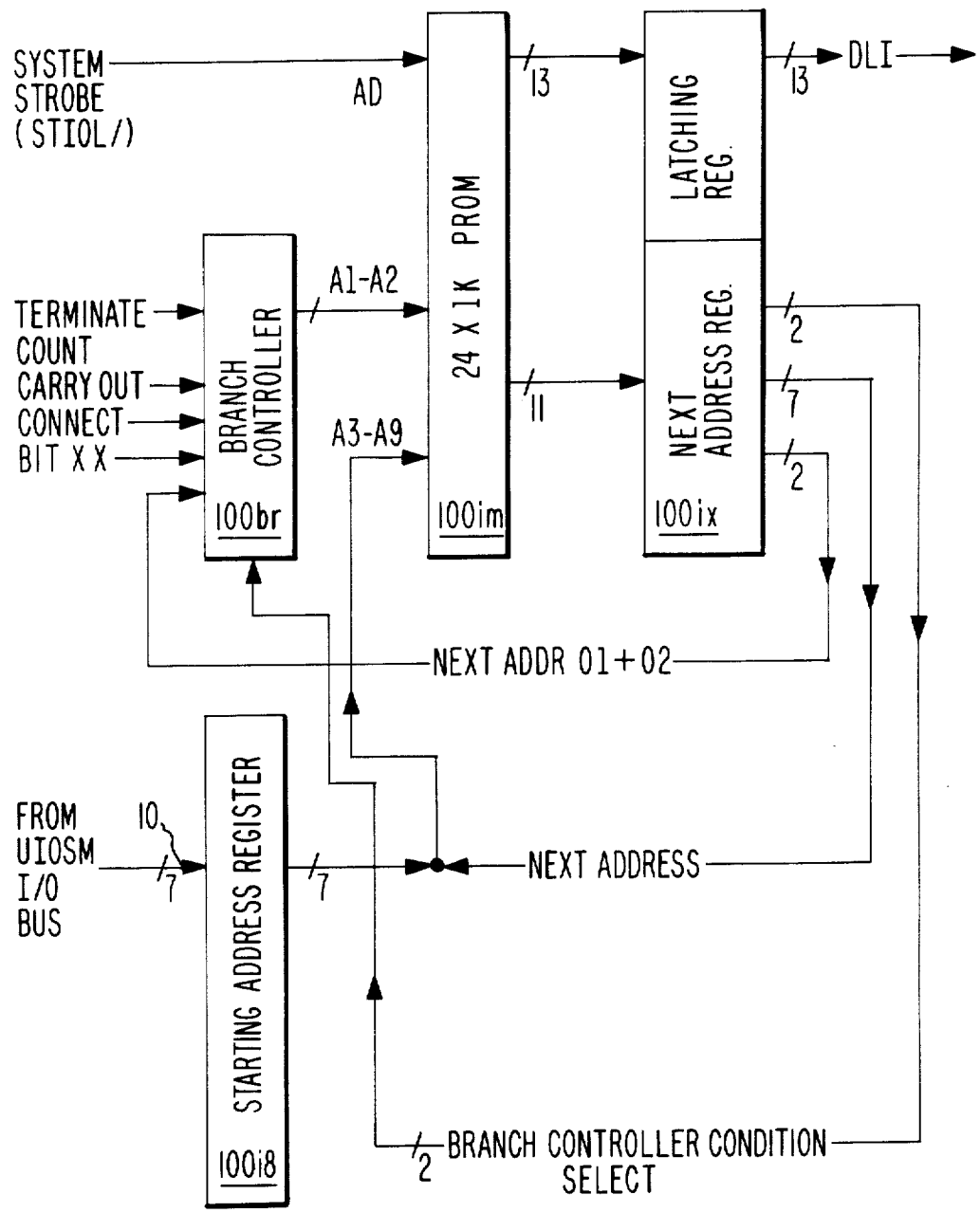
FIG. 8 is a block diagram of the DLI/LA card which shows the controller sequencing logic for operation of the interface card.

Referring to FIG. 8, the sequencing circuit for the Data Link Interface card is shown. The I/O bus 10 from the State Machine Processor provides a starting address to starting address register $100_{i8}$. The output of the starting address register is fed to the Next Address Register $100_{ix}$ and also to the PROM $100_{im}$. A Branch Controller $100_{br}$ feeds address signals A1, A2 to the PROM $100_{im}$. The output of PROM $100_{im}$ is fed to a latching register $100_{or}$ and the Next Address Register $100_{ix}$.

The PROM $100_{im}$ receives a strobe bit $A_0$ from the State Machine Processor 600. The latching register $100_{or}$ provides an output bus for control purposes to control the operation of the DLI/LA card.

FIG. 10 shows the addressing circuitry by which the State Machine Processor selects the particular RAM memory required for a particular Line Adapter.

FIG. 9 shows the "single" Line Adapter and data bus structure for the single Line Adapter which resides on the DLI card.

Referring to FIGS. 7, 8 and 10, each of which shows a portion of this card, the DLI/LA board or card is used with the State Machine Processor 600 (UIO-SM) in conjunction with the other application dependent logic elements in FIG. 2 in order to form a Line Support Processor, also called a Frame Recognition-Data Link Processor (FR-DLP). The following functions are provided by the DLI/LA card:

(a) Clock control logic;
(b) DLP backplane interface to the host system computer which obeys the MLI protocol and frees the State Machine Processor from most of the protocol details;
(c) Provision of maintenance control logic to drive and read the State Machine Processor;
(d) The "single" data communications Line Adapter for providing a serial interface;
(e) Decoding and control logic for PUTS and GETS from the State Machine Processor;
(f) Memory space for both the Line Adapter and for the DLI memory requirements (memory $550_m$ and PROM $100_{im}$).

The State Machine Processor (FIG. 6) communicates with and controls the Line Support Processor and its Line Adapters through a set of "PUT" and a set of "GET" instructions to and from various registers. Discussed hereinbelow is the naming of these registers and their functions and contents.

DLP Interface:

As seen in FIG. 1, the State Machine Processor Unit 600 controls the flow of data between the host computer 100 and the Line Support Processor 300 and also specifies various protocol sequences, detects transmission and protocol errors, and performs other tasks through the use of PUT and GET instructions to various registers on the DLI/LA card 700.

GENERAL BACKGROUND

The DLP Base Module (FIG. 2) provides the housing for the Universal Input/Output (UIO) subsystem. The Base Module provides a backplane into which various cards connect. These modules may consist of from one to six Distribution Cards for communication with various host computers, one to eight Data Link Processors (DLPs), a Maintenance Card, plus termination cards and other optional boards for specialized purposes. A typical Data Link Processor contains three logical sections which are: (1) DLP interface logic used to interface the DLP with the Distribution Card and the Maintenance Card; (2) a processing element such as the State Machine Processor; (3) additional interfaces such as Line Adapters used to connect the Data Link Processor with peripheral devices or data comm lines or additional subordinate processors.

The Distribution Card 20, FIG. 1, is used to provide a connection path between the asynchronous Host MLI lines and the synchronous DLP interface. The MLI (Message Level Interface) is an asymmetrical interface used between a Host system and its peripheral units. The Host unit initiates an I/O operation by connecting with a Data Link Processor and sending the Data Link Processor (such as the LSP-DLP) an I/O descriptor command word. The DLP then performs the specified operation, requesting data from or sending data to the Host as required, and finally the DLP sends a Result Descriptor to the Host upon completion of the operation. The Data Link Processor must be ready to accept another I/O descriptor from the Host immediately after a Result Descriptor word has been sent to the Host. I/O Descriptors are of variable length and it is the responsibility of the DLP to ensure that the proper number of words are received. Vertical and longitudinal parities are checked for all MLI transactions, but no provision other than to abort an I/O operation is made for recovery should an error be detected.

Once a Distribution Card has provided a connection between the Host and the specific Data Link Processor, the Distribution Card 20 becomes transparent to communication between the Host and the Data Link Processor. DLP communication to the Host is accomplished by a standard sequence of DLP status signals which indicate to the Host the access requirements of the DLP. When a DLP is connected to the Host, all information transfers are as indicated by the DLP status lines. Thus, transfers are considered as DLP status-driven.

The DLP interface logic of card 700 generates the DLP status in fixed sequences to control the communication between the Host and the Data Link Processor as requested by the State Machine Processor. All data transfers to and from the Host are through a buffer called a first-in-first-out buffer (FIFO), FIG. 7, which is contained within the interface data path.

Output Registers:

Three output registers, which may reside in DLI Memory $550_m$, FIG. 7, are used by the State Machine Processor (FIG. 6) to control the DLP interface sequence (FIG. 8) and its data paths. These output registers are accessed by means of executed PUT instructions by the State Machine Processor. These output registers are selectively addressed by the five I/O bus address bits known as the "external register address bus" of the UIO-SM. These five bits, derived directly from the "V" field of the State Machine Processor's PUT instruction, come from the State Machine Processor's foreplane and are used to select which register will be enabled. These instructions utilize the State Machine Processor's signal PUTSTROBE 2. Whenever this strob is used, a Wait state of one clock duration is generated. These output registers are designated (i) PUT TO FIFO REGISTER; (ii) PUT TO STARTING ADDRESS AND DLP COUNTER REGISTERS: and (iii) PUT TO CLEAR REGISTER.

(i) PUT TO FIFO REGISTER: ($100_{i3}$, FIG. 7):

A PUT or a Repeated PUT with an external register address value of "01000" will cause the FIFO to be loaded from the I/O bus 10 for subsequent transmission to the Host 100. This PUT will enable the internal data bus to receive the State Machine I/O bus data and to generate a signal LDFIFO (load or shift-in) strobe that will cause the data present on the internal data bus to be shifted into the FIFO. A WAIT signal is included in the generation of this term so as to prevent the generation of double shift in the strobes. When a transfer is requested by the Host, the State Machine Processor must first load the FIFO with the three words of the Descriptor Link followed by the message text followed by the message text longitudinal parity word (LPW). The FIFO size is limited to 64 words (128 bytes) and width of 17 bits; therefore, data transfers of less than or equal to 64 words are the maximum amounts of data transfers possible with this Data Link Processor.

(ii) PUT TO STARTING ADDRESS AND DLP COUNTER REGISTERS: ($100_{i8}$, $100_{ix}$, FIG. 8):

A PUT with an external register address value of "01001" will cause the Starting Address Register and the data transfer counter (not shown) to be loaded from the I/O bus. A starting address for a DLI transfer is an address provided by the State Machine Processor that starts a DLI sequence which could either be: read data, write data, receive I/O Descriptor, send Result Descriptor, send a recalculated LPW, send an immediate Result Descriptor, idle, and disconnect. The starting address for a DLI transfer is loaded in the Starting Address Register $100_{i8}$ from the high order I/O bus byte. When a starting address is loaded into this register, the next address register $100_{ix}$ is tri-stated and the output of the Starting Address Register will be enabled to the sequencer PROM ($100_{im}$) address bus; on the next clock edge, the Next Address Register $100_{ix}$ outputs will be enabled and the Starting Address Register outputs will be disabled. The DLP Counter will also be loaded from the low order I/O bus byte at this time. This DLP Counter is used to determine when the FIFO is empty or full during normal data transfers and also to recalculate the longitudinal parity word (LPW) for early "terminate" conditions.

(iii) PUT TO CLEAR REGISTER:

A PUT OP with an external register address value of "10010" will cause the FIFO, the DLP parity error flip-flop, the burst flip-flop and the reject starting address flip-flop to be cleared.

Input Registers:

Communication to the State Machine Processor 600 from the DLP interface 700 is accomplished via four GET instructions. These GETs can be of two different types: A GET from the internal data bus "FIFO" or GETs from the DLI/LA status registers. The DLI/LA status registers consist of eight multiplexors (not shown) that can directly drive the State Machine Processor low order byte of the I/O bus. These registers are selected by the State Machine external register address bus.

Four of these registers are used for DLI sequencer functions and the other four are used for on-board Line Adapter status registers. These four input registers consist of (i) GET FROM FIFO REGISTER; (ii) GET FROM DLI STATUS REGISTER; (iii) GET FROM DLP COUNTER REGISTER; (iv) GET FROM DLP PARITY AND REJECT ADDRESS REGISTER.

(i) GET FROM FIFO REGISTER:

A GET with an external register address of "00000" will cause FIFO data to be driven into the State Machine I/O bus. This GET will cause the internal data bus $10_i$ to drive the I/O bus 10 and in turn cause the FIFO output drivers to drive the internal data bus. Data received from the Host is in inverted form and loaded into the FIFO in this form. When the State Machine $\mp$GETs" this data, the FIFO output drivers invert the data to its positive form.

(ii) GET FROM DLI STATUS REGISTER:

A GET with an external register address of "01100" will cause the I/O bus to be driven by the DLI Status Register. This GET will drive three different groups of data onto the I/O bus. The four least significant bits (3:4) consist of the DLP status bits the DLP sends to the Host when connected. Bits four through six (6:3) hold the "programmed" status bits. These PROM terms are used by the State Machine Processor 600 to determine what happened during the DLI sequence. The programmed status bits inform the State Machine Processor that an "early terminate" occurred on a byte or a word boundary or the expected sequence occurred and the specified amount of data was transferred, and they also indicate the one special case where the DLP expected one byte and the Host terminated on a word boundary. The most significant bit is used to indicate, to the Host, that the State Machine 600 is "connected" to the LSP.

(iii) GET FROM DLP COUNTER REGISTER:

A GET with an external register address value of "01101" will cause the Data Transfer Counter value to be driven onto the I/O bus. The counter is used to keep track of how many words have been transferred to or from the Host. The Sequencer (FIG. 8) uses this counter to determine when the FIFO is either full (as in the case of Host writes), when the FIFO is empty (as in the case of Host reads), or partially empty. This then tells the Sequencer to exit the burst mode and to change status, indicating to the Host that the LPW longitudinal parity word is next, then disconnect. The State Machine Processor uses the counter value in the recalculation of the LPW when the Host terminates early in either Host reads or writes. The State Machine Processor gets the counter value and uses that value to determine how many words were sent so that it can do its recalculation.

(iv) GET FROM DLP PARITY AND REJECT ADDRESS REGISTER:

A GET with an external register address value of "01111" will cause two flip-flop outputs (reject low address and DLP parity error) to be driven onto the I/O bus. The Reject Address signal is used as a flag indicating whether an attempt to load the Starting Address and the DLP counter registers were successful or not. There are moments in the DLI protocol which demand that these requested operations not be permitted to occur. The DLP parity flip-flop (in $100_t$ of FIG. 7) is used to indicate to the State Machine Processor that the internal data bus parity checking logic has detected a vertical parity error. This parity flip-flop is clocked each time a word is loaded into the FIFO, and therefore parity can only be checked when data is shifted into the FIFO:

Clear Logic:

The clear signals are generated or received by the DLI/LA board. One signal (CLEAR/) causes: the DLP interface 700, the State Machine Processor 600 and any parity error the State Machine Processor may have detected with its parity tree, to clear. When the DLI Sequencer (FIG. 8) is cleared, both the Starting Address and the Next Address Register outputs are tri-stated. Pull-up Resistors on these address lines cause the address to be pulled high (except for the branch control outputs which go low when the controller is disabled), thus causing the address to go to "1111111001". The micro-code will hang up at this address until the State Machine Processor "PUTs" a new Starting Address.

The second clear signal (MCLR/) is a soft clear generated by the State Machine Processor.

The third clear signal, CLEAR, is another soft clear that is used to clear the Line Adapter ACUOR register 505, FIG. 5, and to master reset the USART.

CLEAR/ is PROM-generated, with the inputs and outputs of the PROM full buffered with backplane clock-edge triggered registers to prevent unwanted or spurious clear signals from being generated.

DLP Interface-Data Path Logic:

The internal data (FIG. 7) bus of the DLP interface 700 may be driven from three sources: (i) the backplane data lines (FIG. 2); (ii) the I/O bus 10, FIG. 6; and (iii) the FIFO $100_{i3}$ output, FIG. 7. There are five sinks for the data, these are: the backplane data lines, the I/O bus, the FIFO input register, the DLI counter, and a parity tree. The Table shown below indicates the source/sink combinations for the various operations performed.

TABLE D-1

| OPERATION | SOURCE | SINK(S) |
|---|---|---|
| S.M. PUT FIFO | I/O Bus | FiFo |
| S.M. GET FLFO | FiFo | I/O Bus |
| Read (data to host) | FiFo | Backplane |
| Write (data from host) | Backplane | FiFo, Parity tree |
| Send 1ST word A of descriptor | Backplane | Parity tree |
| Put DLI operation Code | I/O Bus | DLI Counter |
| Send 1ST word of B I/O Descriptor | Backplane | DLI Counter, Fifo |

There are several factors involved in the DLP data path logic; (i) when data is to be loaded into the FIFO, it is latched into a register on the leading DLP clock edge and then transferred to the FIFO on the following half-clock; (ii) all FIFO outputs are inverted. The FIFO is in the path from the inverted backplane bus and the non-inverted I/O bus and also in the return path. All data transfers between the two buses (either direction) must pass through the FIFO; (iii) although the parity tree is always connected to the internal bus, parity is only checked when (a) data is transferred from the internal data bus into the FIFO, as when data is transferred from the Host or (b) when the first word of an I/O descriptor is read and a decision must be made to load or not to load the DLI counter from the least significant byte of the word. This decision is made based upon the parity of the descriptor word. If parity is bad, then the Sequencer will immediately request the I/O descriptor LPW, after which the Descriptor Link is sent.

DLP Sequencer:

The DLP sequencer control logic (FIG. 8) consists of the State Machine Processor using the control sequences which reside in a PROM $100_{im}$, FIG. 8. There are 24 latched PROM outputs which: (1) drive the DLI interface control signals; (2) control the internal timing in data paths; and (3) provide conditional branching within the PROM code and allow the sequence to follow the DLI protocol. A simplified block diagram of the sequencer is shown in FIG. 8.

The PROM $100_{im}$ contains 1,024 words of 24 bits each and is addressed by 10 address lines (A0 through A9). While operating, seven of the address lines (A3 through A9) are allowed from the "next address" lines latched from the PROM outputs. Bits A1 and A2 (NXTAD1 and NXTAD2) are generated as "conditional branches" with the conditions selected by the two "branch control" bits. The least significant bit (bit A0) always follows the latched system strobe (STIOL/).

The Branch Controller $100_{br}$ consists of dual 4-1 multiplexors. These will select (dependent upon two PROM terms, #BCTL0 and #BCTL1) which terms comprise the sequencer address bits A1 and A2. This allows the PROMs to be addressed by a variety of input conditions, in the case of this card, such as STIOL, TERMINATE/ CONNECT, CNTCO/ (DLP Counter Carryout) BITXX (Internal Data Bus Vertical Parity Error) and two PROM generated "next address" bits.

When the two branch control bits are "00", the Sequencer (FIG. 8) will set up conditions that will cause it to branch to one of eight addresses. NXTAD2, the more significant of the two bits, will branch on the state of the DLP counter carry output (CNTCO/). This term will cause the Sequencer to branch to four of eight addresses. NXTAD1, the less significant of the two bits, will cause a branch on the state of the system terminate signal (TERM/..0). This term will narrow down the address selection to two or four possible addresses. The least significant bit, A0, is always the system strobe level (STIOL/.0). The signal STIOL/ will finally narrow down the address selection to one of two possible addresses.

When the branch control select provides inputs of "01", the Sequencer will use only the next address bits provided by the PROM $100_{im}$. Therefore, the Sequencer will only branch on the state of STIOL/. When the branch control select provides input of "10", the Sequencer will use the system terminate (TERM/.0) and STIOL/ as the branch conditions. TERM/ will select two of four possible addresses and STIOL/ will select one of the two addresses.

With a branch control select of "11" the Sequencer will branch on the states of BITXX, CONNECT/, and STIOL/. BITXX will select four of eight possible addresses; and CONNECT/ will select two of four possible addresses, with STIOL/ selecting one of two addresses.

When the State Machine Processor 600 loads a new sequence address, by issuing a PUT instruction to the PUT ADDRESS and COUNT Register, and the conditions are met which allow the State Machine Processor to change the PROM address, bits A3 through A9 are taken from the I/O bus 10, bits A1 and A2 are set to zero and the address line, A0, follows the latched system strobe.

DLI RAM Memory: ($550_m$, FIG. 7):

Other than the RAM memory provided for each Line Adapter, there are 2K by 17 bits of DLI memory provided for "scratchpad" use by the State Machine Processor 600. This is to store I/O Descriptors, Descriptor Links, and other software defined variables and parameters. This memory occupies one half of one set of RAM chips, the other half comprising "local memory" for the on-board Line Adapter. This memory, as in all Line Adapter RAM memory, is composed of slower components which require that a WAIT state be introduced in order to satisfy the memory device specifications.

DLI/Line Adapter Control Logic:

The DLI/LA card 700 provides control for all Line Adapters in a Line Support Processor including any Quad and Dual Line Adapaters. This control is implemented through the use of the State Machine Processor's output control registers, 37, 38. The Control Registers 37, 38 are physically on the State Machine Processor board 600. The clock to latch data for these two eight-bit Control Registers is generated on the DLI/LA board 700 via the State Machine Processor's execution of a PUT instruction. The variant or "V" field of the UIO/SM instruction determines the strobe to be generated as in all PUTs to the DLI sequencer.

PUTSTROBE2 is used in all of these PUTs, and whenever it is used, a State Machine "UIO-SM WAIT" state will be generated. The DLI/LA PUT Decoder decodes the "V" field (REGADDR0-4) and as far as Line Adapters are concerned, will generate three different control strobes. With a register address (V field) of 01101, the State Machine First Output Control Register 37, FIG. 6, will be clocked, latching data from the State Machine I/O bus. With a register address of 01110, the State Machine's Second Output Control Register 38 will be clocked, latching data from the State Machine I/O bus 10. With a register address of 01111, the PUT Decoder will generate a strobe to latch data in a Line Adapter's Automatic Calling unit Output Register, ACUOR, FIGS. 4, 5.

The First Output Control Register 37 (FIG. 6) on the State Machine Processor is used to generate control signals for all the Line Adapters. All Line Adapters receive and use this register for control of USART and Timer functions.

The Second Output Control Register 38 is used solely for the output of data that is written into the USART or the Timer of the Line Adapter, FIGS. 4, 5, 9. Data is written into the Register 38 and received by all of the LSP Line Adapters. When RE/(Read Enable) is high, the internal line adapter data bus will receive the data and drive it onto the bus. This register and bus are used to program Read and Write data to the USART(s) as well as the Timer(s).

The last decoded PUT, CLEAR is used to clear the Automatic Calling Unit Output Registers (ACUOR). These registers directly drive Electrical Interface (FIGS. 1, 2, 4, 5) inputs and provide signalling control of Automatic Calling Units. This ACU register is present on each Line Adapter and is selectively controlled via the "Designate" Signal.

Data received from the USART 508, 510, 512, 514, is driven onto the Line Adapter's internal data bus (FIG. 7) whenever the USART "chip select" and the RE/are true. This data is routed through the Quad bus receiver-driver $100_{ij}$ to the 8-bit status registers. This data is then driven onto the State Machine I/O bus 10 when the State Machine executes a GET instruction.

One other PUT control exists on the DLI/LA board 700, and that is for the setting of the "Designate" flip-flop (DESF, FIG. 10) for selecting a desired Line Adapter. This function is used to control the on-board Line Adapter only. PUTSTROBE1 is used to clock the "Designate flip-flop" as on all Line Adapters.

GET FLAGID (FIG. 11):

The DLI/LA board 700 generates a term that Line Adapters use to enable the State Machine Processor to read which adapter is "interrupting". This term causes each interrupting Line Adapter to drive an unique I/O bus bit (determined by its designate jumper) that will indicate to the State Machine Processor that the Adapter requires service (interrupt signal).

Configuration ID:

This GET, with a register address of "01110" will cause a jumper field to be driven onto the State Machine I/O bus 10. This configuration ID is a field-installed jumper option usually used to indicate the "unit number" of the Data Link Processor to identify it.

Line Adapter Memory Control and WAIT Logic:

Since each Line Adapter occupies the same memory address range, a method of separately addressing each Line Adapter is necessary to eliminate this conflict. The DLI/LA (FIG. 10) board generates a term, LARAMSEL (Line Adapter-RAM Select), that indicates to a selected Line Adapter that that Adapter memory is being accessed. This is seen in FIG. 10 where Comparator $100_c$ is addressed by the State Machine 600 to activate the LARAMSEL line and Designate FF (DESF) to select a RAM such as $550_m$. This LARAMSEL term is "ANDED" with the Line Adapter Designate flip-flop (DESF) outputs in order to generate memory chip selects CS/. This term is generated directly from the State Machine memory address bus 16, FIG. 6. It will go "true" when the address has bits 13 and 14 true (MADDR 13 and MADDR 14).

During all Line Adapter memory operations, a WAIT state is inserted to ensure that the access time of the RAMs are met. This "WAIT state" causes the State Machine 600 to wait "one clock" in order to meet these access times. The signal "WAIT" will occur whenever memory address bit 14 goes true. A "WAIT enable" flip-flop ($100_{sf}$, FIG. 10) is also used to ensure that the "WAIT" is removed before the next clock edge. Since the State Machine uses three clocks to write data, then WE/(Write Enable) is used to disable the continuous "waits" when writing to the Line Adapter or to the DLI memories.

Other terms that generate the "WAIT" states are PARERR/and PUTSTROBE2. Parity error is a signal the State Machine sends to the DLI/LA card in order to cause a "Halt" of the entire Data Line Processor if a parity error is detected on the State Machine memory output bus 12. This error can be caused when the State Machine internal PROM 50 fails or when a DLI memory parity error occurs.

DLI/LA Line Adapter:

The single Line Adapter described herein is that same Line Adapter used in a Quad/Dual Byte Oriented Line Adapter card, FIG. 5. This was further described in the discussion under "Byte Oriented" Line Adapter. In that case, the Branch Controller consists of dual, four-one multiplexors. These multiplexors will select (dependent upon the two PROM terms #BCTL0 and #BCTL1) which terms comprise Sequencer Address bits A1 and A2.

While a detailed disclosure and embodiment of a flexible data transfer network has been presented herein, it should be understood that the invention encompasses a broader scope of concepts as defined in the claims submitted hereinunder.

What is claimed is:

1. A data transfer network for data transfers between a main host computer and a plurality of remote data sets operating under different protocol and timing disciplines wherein said main host computer initiates I/O data transfer commands to a line support processor means having a plurality of line support processors, each one of which manages data transfers between one of said remote data sets and said main host computer, said data transfer network comprising:

(a) said main host computer connected to each one of said line support processors and including:
  (a1) main memory means for storing data to be transmitted to/received from said remote data sets and including:
    (a1a) a first dedicated memory area for storing a I/O data transfer commands for transmittal to said line support processors;
    (a1b) a second dedicated memory area for storing operational codes for transmittal to said line support processors wherein said operational codes contain information translatable, by said line support processor, into control data for selecting timing and protocol discipline for a selected line adapter;
  (a2) a main processor for selecting said I/O data transfer commands and said operational codes for communication and control of said line support processor, said processor including:
    (a2a) connection means to a distribution control circuit;
(b) a base module providing backplane connection means for slide-in circuitry cards, said base module including:
  (b1) said distribution control circuit functioning to connect and/or disconnect said host computer to/from a selected line support processor in line support processor means;
  (b2) said line support processor means functioning to execute said I/O data transfer commands by controlling a selected line adapter to a remote data set, said line support processor means including:
    (b2a) a plurality of line support processors connected to said distribution control circuit wherein each said line support processor includes:
      (B2a1) interface circuit means connecting said main host computer, via said distribution control circuit, to a plurality of line adapter means and to a state machine processor means;
      (b2a2) said state machine processor means including a state machine processor operating to translate said operational codes into control data for operating a selected line adapter in a desired timing and protocol discipline for managing data transfers between said selected line adapter and an associated said data set, said state machine processor means including:
        (i) a first auxiliary memory storage area for receiving said operational codes from said host computer;
        (ii) program memory means for enabling said state machine processor to translate said operation codes into control data for operating a selected line adapter;

(iii) said state machine processor operating to transmit said control data to said selected line adapter for selecting and managing the timing and protocol discipline for data transfers, and including:

(ie) means for selecting a particular line adapter in said plurality of line adapter means;

(iie) means for identifying the required timing and protocol discipline for said particular line adapter;

(iiie) means for generating address signals for selecting a desired control register in said particular line adapter and placing said control data therein;

(ive) means for transferring data to/from said particular line adapter;

(ve) means for selecting a group of multiplexors associated with said selected particular line adapter;

(c) said plurality of line adapter means connected to said state machine processor means and including a plurality of line adapters, wherein each line adapter includes:

(c1) a data communication line to an associated said remote data set;

(c2) a plurality of control registers holding said control data for managing data transfers according to a desired timing and protocol discipline, said control data being derived from said state machine processor means;

(d) transceiver-controller means, operating under control of said state machine processor means, for switching a data bus to connect said state machine processor to a selected line adapter or to connect said selected line adapter to a multiplexor means;

(e) said data bus connecting each of said line adapters to said transceiver-controller means;

(f) multiplexor means including:

(f1) a plurality of groups of multiplexors whereby each group of multiplexors is connected to an associated line adapter for conveying bytes of data from said remote data set to said state machine processor means for subsequent transfer to said host computer, and wherein each said group of multiplexors includes:

(f1a) coded input signal means for identifying the particular timing and protocol discipline required for the said associated line adapter.

2. The network of claim 1, wherein each of said plurality of line adapter means includes:

(a) line adapter memory means for buffering data being transferred between said state machine processor means and said remote data set; said line adapter memory means including a plurality of RAM storage means, each one of said RAM storage means being dedicated to a said plurality of line adapters.

3. The network of claim 1, wherein each one of said RAM storage means includes:

(a) memory space for receiving and storing said operational codes from said host computer.

4. The network of claim 1, wherein said state machine processor means includes:

(a) means to generate result/data for transmission to said host computer after execution of a said I/O data transfer command from said host computer.

5. An network for handling data transfer operations between a main host computer and a plurality of remote data sets, said network comprising:

(a) said main host computer being connected to a distribution control circuit means, and including:

(a1) first memory means for storing I/O data transfer commands for initiating data transfers to/from a plurality of remote data sets;

(a2) second memory means for storing operational codes for transmittal to each one of a plurality of line adapter memory means, said operational codes including control information on a variety of timing and protocol disciplines;

(a3) third memory means for storing data to be transmitted to/received from said remote data sets;

(a4) a main processor means for utilizing said first, second and third memory means for managing a plurality of line support processors;

(b) distribution control circuit means functioning to connect and disconnect said main host computer to/from a selected one of a plurality of line support processors;

(c) said line support processors operating to execute said I/O data transfer commands and for selecting the appropriate timing and protocol discipline for data transfers with each of said remote data sets, wherein each of said line support processors includes:

(c1) a data link interface circuit means connecting said distribution control circuit means to an internal processor means and to a line adapter means;

(c2) said internal processing means including an internal processor operating to translate said operational codes into control data for managing each selected line adapter to execute data transfers according to the appropriate timing and line discipline for the remote data set connected to the selected line adapter, said internal processing means including:

(c2a) auxiliary memory means for storing said operational codes;

(c2b) means for selecting a particular line adapter for data transfer operations and for identifying and enabling the said appropriate timing and protocol discipline to be used by said selected particular line adapter;

(d) said line adapter means including:

(d1) a plurality of line adapters, each of which provides a line connection to said remote data set and operates to execute data transfers between said line adapter means and said remote data set with the appropriately selected line discipline and protocol, under control of said internal processor means;

(d2) line adapter memory means for buffering data being transferred to/from said remote data set and to/from said main host computer;

(d3) switching means for connecting a selected line adapter to said internal processor or to an associated group of multiplexors in a multiplexor means;

(d4) said multiplexor means including:

(d4a) a plurality of groups of multiplexors wherein each group is connected to receive the outputs of an associated line adapter for transfer of data bytes to said line adapter memory means for subsequent handling by said internal processor;

(d4b) identification signal input means, for each group of multiplexors connected to an associated line adapter, for generating an identification signal to said internal processor means to enable said internal processor means to generate said appropriate control data for said selected line adapter;

(e) said plurality of remote data sets being connected so that each data set has its individual data communication line to an associated one of said line adapters.

* * * * *

UNITED STATES PATENT AND TRADEMARK OFFICE
CERTIFICATE OF CORRECTION

PATENT NO. : 4,631,666
DATED : December 23, 1986
INVENTOR(S) : Craig W. Harris, et al.

It is certified that error appears in the above-identified patent and that said Letters Patent is hereby corrected as shown below:

```
Col.  7, line 46, in Table B-1, change "15 bits" to
                  --16 bits--;
         line 59, before "monitored" insert --is--;
         line 67, change "SLDC" to --SDLC--.
Col.  8, line 15, change "closiong" to --closing--.
Col. 11, line 15, change "(ItemSName)'." to --(Item$Name)'.--;
         line 25, change "Proces'" to --Process'--.
Col. 13, line 42, change "65,635." to --65,535.--.
Col. 16, line 30, change "mode" to --modes--.
Col. 20, line 13, change "cann" to --can--.
Col. 29, line 16, change "start" to --state--.
Col. 30, line  8, change "Donal" to --Donald--;
         line 56, change "single" to --Single--.
Col. 33, line 45, change "502," to --503,--;
         line 66, change "equal 0" to --equals 0--.
Col. 35, line 20, change "time" to --timer--;
         line 61, in Table Y-2, change "USARTCS = Chip Select-
                  UCS" to --USARTCS = USART Chip Select-UCS--.
Col. 36, line 22, change "0001x" to --0111x--.
Col. 37, line 14, change "comonents" to --components--.
Col. 38, line 22, change "(transmitter" to --(Transmitter--.
Col. 39, line 47, change "A 32X" to --a 32X--.
Col. 43, line 55, change "enabe" to --enable--.
```

UNITED STATES PATENT AND TRADEMARK OFFICE
CERTIFICATE OF CORRECTION

PATENT NO. : 4,631,666        Page 2 of 2

DATED : December 23, 1986

INVENTOR(S) : Craig W. Harris, et al.

It is certified that error appears in the above-identified patent and that said Letters Patent is hereby corrected as shown below:

```
Col. 45, line 50, change "as" to --has--.
Col. 52, line 17, change "had" to --has--.
Col. 61, line 16, change "+GETs"" to --"GETs"--.
Col. 66, line 21, after "storing" delete "a".
```

Signed and Sealed this

Seventh Day of April, 1987

Attest:

Attesting Officer

DONALD J. QUIGG

Commissioner of Patents and Trademarks